(12) United States Patent
Dunbar et al.

(10) Patent No.: US 9,014,054 B2
(45) Date of Patent: Apr. 21, 2015

(54) LAYER TWO OVER MULTIPLE SITES

(75) Inventors: Linda Dunbar, Plano, TX (US); Susan Hares, Saline, MI (US); T. Benjamin Mack-Crane, Downers Grove, IL (US); Robert Sultan, Somers, NY (US); Peter Ashwood-Smith, Gatineau (CA); Guoli Yin, Ottawa (CA)

(73) Assignee: Futurewei Technologies, Inc., Plano, TX (US)

( * ) Notice: Subject to any disclaimer, the term of this patent is extended or adjusted under 35 U.S.C. 154(b) by 793 days.

(21) Appl. No.: 13/172,554

(22) Filed: Jun. 29, 2011

(65) Prior Publication Data

US 2012/0008528 A1 Jan. 12, 2012

Related U.S. Application Data

(60) Provisional application No. 61/449,918, filed on Mar. 7, 2011, provisional application No. 61/374,514, filed on Aug. 17, 2010, provisional application No. 61/359,736, filed on Jun. 29, 2010, provisional application No. 61/411,324, filed on Nov. 8, 2010.

(51) Int. Cl.
*H04L 12/28* (2006.01)
*H04L 29/12* (2006.01)
(Continued)

(52) U.S. Cl.
CPC ........ *H04L 29/12028* (2013.01); *H04L 12/462* (2013.01); *H04L 45/66* (2013.01); *H04L 61/103* (2013.01)

(58) Field of Classification Search
CPC ....................................................... H04L 45/02
USPC ......................................................... 370/255
See application file for complete search history.

(56) References Cited

U.S. PATENT DOCUMENTS 7,386,605 B2    6/2008  Shah
7,684,352 B2 *  3/2010  Smith et al. .................... 370/255
(Continued)

FOREIGN PATENT DOCUMENTS

EP      1538786 A2    8/2005
JP      01129550 A    5/1989
(Continued)

OTHER PUBLICATIONS

Foreign Communication From a Counterpart Application, Japanese Application No. 2012-544967, Japanese Office Action dated Aug. 20, 2013, 2 pages.

(Continued)

*Primary Examiner* — Guang Li
(74) *Attorney, Agent, or Firm* — Conley Rose, P.C.; Grant Rodolph; William H. Dietrich

(57) ABSTRACT

An apparatus comprising a service network, and a plurality of Layer 2 sites connected by the service network via a plurality of gateways, wherein the gateways are configured to map a plurality of Internet Protocol (IP) addresses of a plurality of hosts under a plurality of virtual local area networks (VLANs) in a plurality of Layer 2 sites to a plurality of addresses (e.g. MAC or others) of the corresponding gateways inform the other gateways in the other Layer 2 sites of the mapped IP addresses under each of the VLANs in the local Layer 2 sites, and forward data frames originated from the hosts in the local Layer 2 sites to the other gateways in the other Layer 2 sites when the data frames' destinations are residing in the other Layer 2 sites.

26 Claims, 31 Drawing Sheets

(51) Int. Cl.
*H04L 12/46* (2006.01)
*H04L 12/721* (2013.01)

(56) References Cited

U.S. PATENT DOCUMENTS

| | | | |
|---|---|---|---|
| 8,194,674 | B1 | 6/2012 | Pagel et al. |
| 8,259,720 | B2 | 9/2012 | Farinacci et al. |
| 8,560,663 | B2 * | 10/2013 | Baucke et al. ............... 709/223 |
| 8,576,844 | B1 * | 11/2013 | Ghosh .......................... 370/390 |
| 8,625,616 | B2 * | 1/2014 | Vobbilisetty et al. ........ 370/401 |
| 8,717,941 | B2 * | 5/2014 | Hata et al. ..................... 370/255 |
| 2003/0046390 | A1 * | 3/2003 | Ball et al. ..................... 709/224 |
| 2003/0063560 | A1 * | 4/2003 | Jenq et al. .................... 370/216 |
| 2004/0081203 | A1 * | 4/2004 | Sodder et al. ................ 370/469 |
| 2004/0088389 | A1 * | 5/2004 | Shah ............................ 709/221 |
| 2004/0202199 | A1 | 10/2004 | Fischer et al. |
| 2005/0025143 | A1 * | 2/2005 | Chen et al. ................... 370/389 |
| 2005/0243845 | A1 | 11/2005 | Higashitaniguchi et al. |
| 2007/0104192 | A1 * | 5/2007 | Yoon et al. ................... 370/389 |
| 2007/0140107 | A1 * | 6/2007 | Eckert et al. ................. 370/216 |
| 2008/0107043 | A1 * | 5/2008 | Smith et al. .................. 370/255 |
| 2008/0186968 | A1 * | 8/2008 | Farinacci et al. ............ 370/392 |
| 2008/0279184 | A1 * | 11/2008 | He ................................ 370/390 |
| 2008/0279196 | A1 * | 11/2008 | Friskney et al. ......... 370/395.53 |
| 2009/0168666 | A1 * | 7/2009 | Unbehagen et al. .......... 370/254 |
| 2009/0303880 | A1 * | 12/2009 | Maltz et al. .................. 370/235 |
| 2010/0111086 | A1 * | 5/2010 | Tremblay et al. ............ 370/390 |
| 2010/0128730 | A1 * | 5/2010 | Wang ........................ 370/395.1 |
| 2010/0172270 | A1 * | 7/2010 | Smith et al. .................. 370/255 |
| 2010/0220739 | A1 | 9/2010 | Ishiguro |
| 2010/0272107 | A1 | 10/2010 | Papp et al. |
| 2011/0310904 | A1 * | 12/2011 | Gero et al. ................... 370/401 |
| 2012/0054367 | A1 | 3/2012 | Ramakrishnan et al. |
| 2013/0058351 | A1 | 3/2013 | Casado et al. |

FOREIGN PATENT DOCUMENTS

| | | |
|---|---|---|
| JP | 11004224 A | 1/1999 |
| JP | 2005323316 A | 11/2005 |
| JP | 2005533445 A | 11/2005 |
| WO | 2004073262 A1 | 8/2004 |
| WO | 2009051179 A1 | 4/2009 |
| WO | 2009068045 A1 | 6/2009 |

OTHER PUBLICATIONS

Foreign Communication From a Counterpart Application, Japanese Application No. 2012-544967, English Translation of Japanese Office Action dated Aug. 20, 2013, 2 pages.

"Draft Standard for Local and Metropolitan Area Networks—Virtual Bridged Local Area Networks—Amendment 9: Shortest Path Bridging," IEEE P802.1aq/ D1.5™, Dec. 17, 2008, 198 pages.

"Draft Standard for Local and Metropolitan Area Networks—Virtual Bridged Local Area Networks Amendment 6: Provider Backbone Bridges," IEEE P802.1ah/D4.2™, Mar. 26, 2008, 116 pages.

"Information Technology—Telecommunication and Information Exchange Between Systems—Local and Metropolitan Area Networks—Specific Requirements—Part 3: Carrier Sense Multiple Access with Collision Detection (CSMA/CD) Access Method and Physical Layer Specifications," IEEE 802.3 ah™, 2005, 417 pages.

"IEEE Standard for Local and Metropolitan Area Networks—Virtual Bridged Local Area Networks, Amendment 7: Provider Backbone Bridges," IEEE 802.1ah™, Aug. 14, 2008, 121 pages.

Melsen, T., et al., "MAC-Forced Forwarding: A Method for Subscriber Separation on an Ethernet Access Network," RFC 4562, Jun. 2006, 14 pages.

Dunbar, L., "Directory Server Assisted TRILL Edge," draft-dunbar-trill-server-assisted-edge-00.txt, Mar. 7, 2011, 8 pages.

Perlman, P., et al., "RBridges: Base Protocol Specification," draft-ietf-trill-rbridge-protocol-12.txt, Mar. 6, 2009, 96 pages.

Perlman, R., et al., "RBridges: Base Protocol Specification," draft-ietf-trill-rbridge-protocol-16.txt, Mar. 3, 2010, 118 pages.

Shah, H., Ed., et al., "ARP Mediation for IP Interworking of Layer 2 VPN," draft-ietf-l2vpn-arp-mediation-13.txt, Feb. 27, 2010, 30 pages.

"Interport™ PBB/PBB-TE Software Solution," Afore Solutions Inc., http://www.aforesolutions.com/documents/interport/AFORE PBB-PBBTE Solution Brief.pdf Jun. 2009, 2 pages.

Greenberg, A., et al., "Towards a Next Generation Data center Architecture: Scalability and Commoditization," Proceeding of 2008 Sigcomm Conference, Aug. 22, 2008, 6 pages.

Greenberg, A., et al., "VL2: A Scalable and Flexible Data center Network," SIGCOMM '09, Aug. 17, 2009, 12 pages.

Foreign Communication From a Related Counterpart Application, PCT Application PCT/US2011/038443, International Search Report dated Oct. 7, 2011, 5 pages.

Foreign Communication From a Related Counterpart Application, PCT Application PCT/US2011/038443, Written Opinion dated Oct. 7, 2011, 5 pages.

Foreign Communication From a Related Counterpart Application—Partial International Search Report, PCT/US2011/042453, Oct. 7, 2011, 9 pages.

Office Action dated Jun. 11, 2013, 19 pages, U.S. Appl. No. 13/118,269, filed May 27, 2011.

Foreign Communication From a Counterpart Application, European Application 11738508.8, European Office Action dated Jan. 10, 2013, 4 pages.

Office Action dated Apr. 2, 2013, 6 pages, U.S. Appl. No. 13/118,269, filed May 27, 2011.

Foreign Communication From a Counterpart Application, Chinese Application No. 201180004288.4, Chinese Office Action dated Sep. 2, 2013, 5 pages.

Foreign Communication From a Counterpart Application, Japanese Application No. 2013-518676, Japanese Office Action dated Jan. 7, 2014, 4 pages.

Foreign Communication From a Counterpart Application, Japanese Application No. 2013-518676, English Translation of Japanese Office Action dated Jan. 7, 2014, 3 pages.

* cited by examiner

2600

| Bits offset | 0 - 7 | 8 - 15 |
|---|---|---|
| 0 | 2610 Hardware Type (HTYPE) ||
| 16 | 2612 Protocol Type (PTYPE) ||
| 32 | Hardware Address Length 2614 (HLEN) | Protocol Address Length 2616 (PLEN) |
| 48 | 2618 Operation (OPER) ||
| 64 | 2620 Sender Hardware Address (SHA) (first 16 bits) ||
| 80 | (next 16 bits) ||
| 96 | (last 16 bits) ||
| 112 | 2622 Sender Protocol Address (SPA) (first 16 bits) ||
| 128 | (last 16 bits) ||
| 144 | 2624 Target Hardware Address (THA) (first 16 bits) ||
| 160 | (next 16 bits) ||
| 176 | (last 16 bits) ||
| 192 | 2626 Target Protocol Address (TPA) (first 16 bits) ||
| 208 | (last 16 bits) ||
| 224 | 2628 Sender Location Address (SLA) (first 16 bits) ||
| 240 | (next 16 bits) ||
| 256 | (last 16 bits) ||
| 272 | 2630 Target Location Address (TLA) (first 16 bits) ||
| 288 | (next 16 bits) ||
| 304 | (last 16 bits) ||

Rows 0–208 bracketed as ARP Payload; rows 0–304 bracketed as Extended ARP Payload.

FIG. 26

LAYER TWO OVER MULTIPLE SITES

CROSS-REFERENCE TO RELATED APPLICATIONS

The present application claims the benefit of U.S. Provisional Patent Application Nos. 61/449,918 filed Mar. 7, 2011 by Linda Dunbar et al. and entitled "Directory Server Assisted Address Resolution," 61/374,514 filed Aug. 17, 2010 by Linda Dunbar et al. and entitled "Delegate Gateways and Proxy for Target hosts in Large Layer Two and Address Resolution with Duplicated Internet Protocol Addresses," 61/359,736 filed Jun. 29, 2010 by Linda Dunbar et al. and entitled "Layer 2 to layer 2 Over Multiple Address Domains," and 61/411,324 filed Nov. 8, 2010 by Linda Dunbar et al. and entitled "Asymmetric Network Address Encapsulation," all of which are incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communications and data networks are comprised of nodes that transport data through the network. The nodes may include routers, switches, bridges, or combinations thereof that transport the individual data packets or frames through the network. Some networks may offer data services that forward data frames from one node to another node across the network without using pre-configured routes on intermediate nodes. Other networks may forward the data frames from one node to another node across the network along pre-configured or pre-established paths.

SUMMARY

In one embodiment, the disclosure includes an apparatus comprising a service network, and a plurality of Layer 2 sites connected by the service network via a plurality of gateways, wherein the gateways are configured to map a plurality of Internet Protocol (IP) addresses of a plurality of hosts under a plurality of virtual local area networks (VLANs) in a plurality of Layer 2 sites to a plurality of addresses (which can be Media Access Control—MAC, IP, or other addresses) of the corresponding gateways, inform the other gateways in the other Layer 2 sites of the mapped IP addresses under each of the VLANs in the local Layer 2 sites, and forward data frames originated from the hosts in the local Layer 2 sites to the other gateways in the other Layer 2 sites when the data frames' destinations are residing in the other Layer 2 sites.

In another embodiment, the disclosure includes a network component comprising a receiver configured to receive via a service network a frame encapsulated using one or two layers of Ethernet headers that comprise a destination address in an outer Ethernet header that is destined to a local gateway of a local Layer 2 site from a remote host in a remote Layer 2 site, a type field that indicates if the outer Ethernet header requires decapsulation or another type field in the Ethernet header that indicates if the destination address in the Ethernet header requires translation, a logic circuit configured to translate the destination address in the Ethernet header to a Media Access Control (MAC) address of a local host based on the Ethernet payload's Internet Protocol (IP) destination address of the local host in the local Layer 2 site if the destination address requires translation, and a transmitter configured to send to another gateway of another Layer 2 site a frame originated from a local host in the local Layer 2 site connected to the other Layer 2 site via the service network when the destination host resides in the other Layer 2 site.

In yet another embodiment, the disclosure includes a method comprising receiving a frame from a first host in a first site of a Layer 2 network that is intended for a second host in a second site of the same Layer 2 network, mapping a destination address (DA) for the second host in the frame to an address (MAC, IP, or others) of a gateway that corresponds to a first Layer 2 Gateway (L2GW1) in the first site of the Layer 2 network or a second Layer 2 Gateway (L2GW2) in the second site of the Layer 2 network, using the MAC address of the gateway in the frame as a target host MAC address, and sending the frame to the gateway in the second site of the Layer 2 network via a service network connected to the first site of the Layer 2 network and the second site of the Layer 2 network.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 26 is a schematic diagram of an embodiment of an extended ARP payload.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Modern data networks, which can be Layer 2 or Layer 3 networks, provide connectivity to cloud services and virtual machines (VMs) that may need to span across multiple locations or sites. Sometimes, Layer 2 networks for data centers that connect Clusters of servers (or VMs) and storage devices have to span across multiple locations. The data center networks may also need to stay in Layer 2 level to support already deployed applications and thus save cost, e.g., in millions of dollars. Layer 2 communications between the Cluster of servers and/or storage devices include load balancing, database clustering, virtual server failure recovery, transparent operation below the network layer (Layer 3), spreading a subnet across multiple locations, and redundancy. Layer 2 communications also include a keep-alive mechanism between applications. Some applications need the same IP addresses to communicate on multiple locations, where one server may be Active and another server may be on Standby. The Active and Standby servers (in different locations) may exchange keep-alive messages between them, which may require a Layer 2 keep-alive mechanism.

Figure 1:
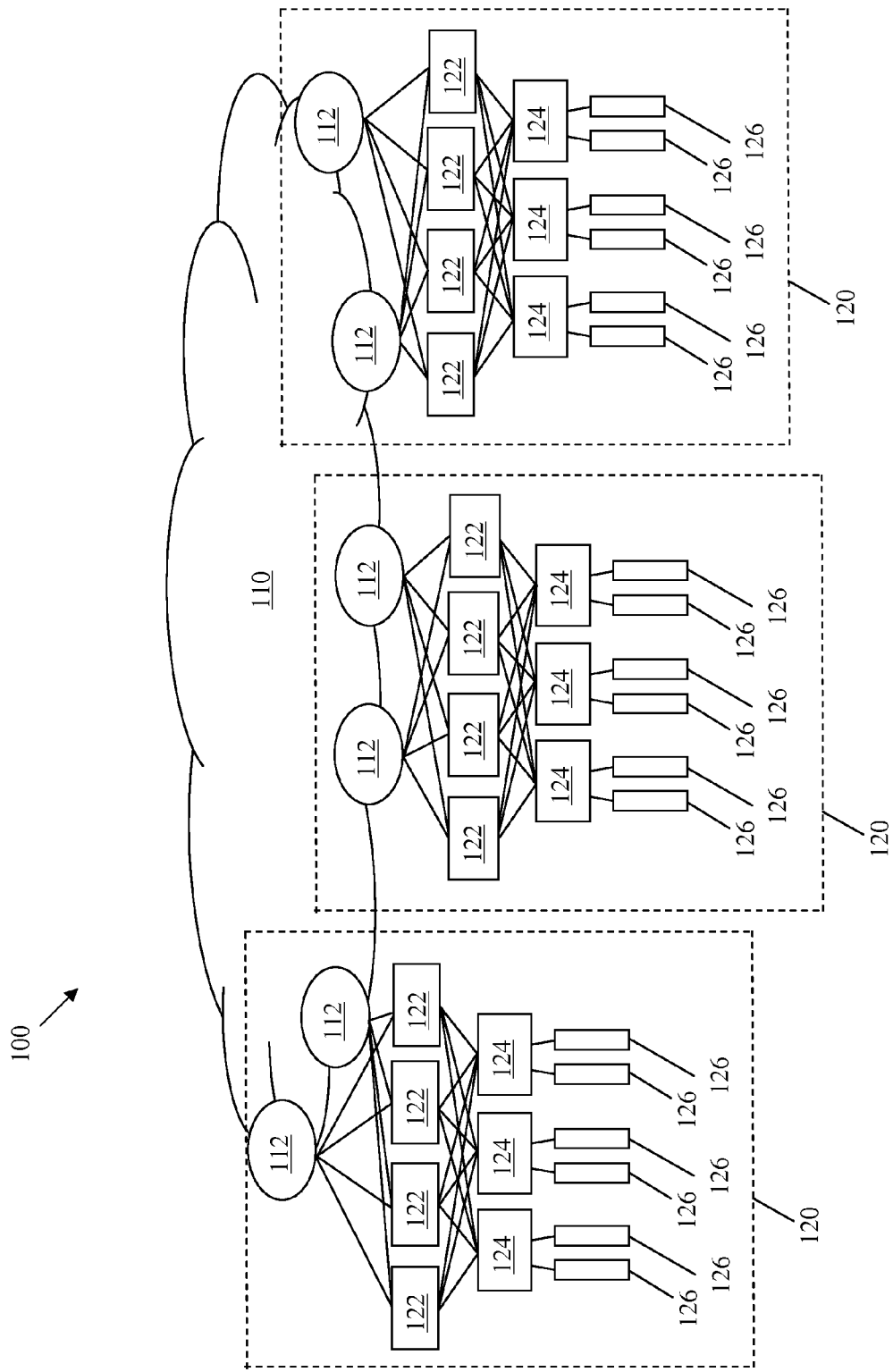
FIG. 1 is a schematic diagram of an embodiment of Virtual Private Local Area Network (LAN) Service (VPLS) interconnected LANs.

FIG. 1 illustrates an embodiment of a VPLS interconnected Local Area Networks (LANs) 100. The VPLS interconnected LANs 100 is a scalable mechanism that can be used for connecting Layer 2 networks across multiple data center (DC) locations, e.g., physical locations, to establish a unified or flat Layer 2 network. The VPLS interconnected LANs 100 may comprise a VPLS 110 and a plurality of LANs 120 that may be connected to the VPLS 110 via a plurality of edge nodes 112, such as edge routers. Each LAN 120 may comprise a plurality of Layer 2 switches 122 connected to corresponding edge nodes 112, a plurality of access switches 124 connected to corresponding Layer 2 switches, a plurality of VMs 126 connected to corresponding access switches 124. The components of the VPLS interconnected LANs 100 may be arranged as shown in FIG. 1.

The VPLS 110 may be any network that is configured to connect the LANs 120 across different locations or DCs. For instance, the VPLS 110 may comprise a Layer 3 network to interconnect the LANs 120 across different DCs. The Layer 2 switches 122 may be configured to communicate at the Open System Interconnection (OSI) model data link layer. Examples of data link protocols include Ethernet for LANs, the Point-to-Point Protocol (PPP), High-Level Data Link Control (HDLC), and Advanced Data Communication Control Protocol (ADCCP) for point-to-point connections. The access switches 124 may be configured to forward data between the Layer 2 switches 122 and the VMs 126. The VMs 126 may comprise system virtual machines that provide system platforms, e.g., operating systems (OSs) and/or process virtual machines that run programs or applications. The VMs 126 in each LAN 120 may be distributed over a plurality of processors, central processor units (CPUs), or computer systems. A plurality of VMs 126 in a LAN 120 may also share the same system resources, such as disk space, memory, processor, and/or other computing resources. The VMs 126 may be arranged on a shelf and connected to the corresponding LANs 120, e.g., via the access switches 124.

Some aspects of the VPLS interconnected LANs 100 may pose impractical or undesirable implementation issues. In one aspect, the VPLS 110 may require implementing a Wide Area Network (WAN) that supports Multiple Label Protocol Label Switching (MPLS). However, some operators do not support MPLS over WAN and thus may have difficulties in implementing VPLS interconnected LANs 100. Further, to resolve host link layer addresses, e.g., for the VMs 126 across the LANs 120, an IP version four (IPv4) ARP or IP version six (IPv6) Neighbor Discovery (ND) protocol may be needed, such as the IPv4 ARP described in the Internet Engineering Task Force (IETF) Request for Comments (RFC) 826 and IPv6 ND described by IETF RFC 4861, both of which are incorporated herein by reference. The ARP may flood requests to all the interconnected LANs 120 and thus exhaust a substantial amount of system resources (e.g., bandwidth). Such ARP flooding mechanism may suffer from scalability issues, as the number of LANs 120 and/or VMs 126 increases. The VPLS interconnected LANs 100 also need to setup mesh pseudo-wires (PWs) to connect to the LANs 120, which may require intensive configuration and state maintenance of tunnels. In some scenarios, the VPLS 110 may use a Border Gateway Protocol (BGP) to discover a LAN 120 and build a mesh PW for each LAN 120.

Optical Transport Virtualization (OTV) is another scalable mechanism that has been proposed for connecting Layer 2 networks across multiple locations or DCs to establish a flat Layer 2 network. OTV is a method proposed by Cisco that depends on IP encapsulation of Layer 2 communications. OTV may use an Intermediate System to Intermediate System (IS-IS) routing protocol to distribute MAC reachability within each location (e.g., DC) to other locations. The OTV scheme may also have some impractical or undesirable aspects. In one aspect, OTV may require maintaining a relatively large number of multicast groups by a provider core IP network. Since each LAN may have a separate overlay topology, there may be a relatively large quantity of overlay topologies that are maintained by the service provider IP network, which may pose a burden on the core network. OTV may also require that an edge node to use Internet Group Management Protocol (IGMP) to join different multicast groups in the IP domain. If each edge node is connected to a plurality of VLANs, the edge node may need to participate in multiple IGMP groups.

In OTV, edge devices, such as a gateway at each location, may be IP hosts that are one hop away from each other, which may not require implementing a link state protocol among the edge devices to exchange reachability information. However, the link state may also be used to authenticate a peer, which may be needed in OTV if the peer joins a VLAN by sending an IGMP version 3 (IGMPv3) report. Alternatively, OTV may use a BGP authentication method. However, the BGP authentication timing may be different than the IS-IS authentication timing. For example, BGP may be tuned for seconds performance and IS-IS may be tuned for sub-second performance. Further, the IS-IS protocol may not be suitable for handling a substantially large numbers of hosts and VMs, e.g., tens of thousands, in each location in the OTV system. OTV may also be unsuitable for supporting tens of thousands of closed user groups.

Disclosed herein are systems and methods for providing a scalable mechanism to connect a plurality of Layer 2 networks at a plurality of different locations to obtain a flat or single Layer 2 network. The scalable mechanism may resolve some of the aspects or challenges for obtaining a flat Layer 2 network that spans across multiple locations. The scalable mechanism may facilitate topology discovery across the locations by supporting scalable address resolution for applications and allowing network switches to maintain a plurality of addresses associated with all or a plurality of hosts across the locations. The scalable mechanism may also facilitate forwarding traffic across the different locations and broadcasting traffic, e.g., for unknown host addresses, and support multicast groups.

The methods include a border control mechanism to scale a relatively large flat Layer 2 over multiple locations. As such, applications, servers, and/or VMs may not be aware of a virtual Layer 2 network that comprises multiple Layer 2 networks interconnected by another network, such as a Layer 3, a Layer 2.5, or a Layer 2 network. The Layer 2 networks may be located in different or separate physical locations, multiple floors of one location, or multiple rows interconnected by Layer 3. A protocol independent address resolution mechanism may also be used and may be suitable to handle a relatively large virtual Layer 2 network and/or a substantially large number of Layer 2 networks over multiple locations.

Figure 2:
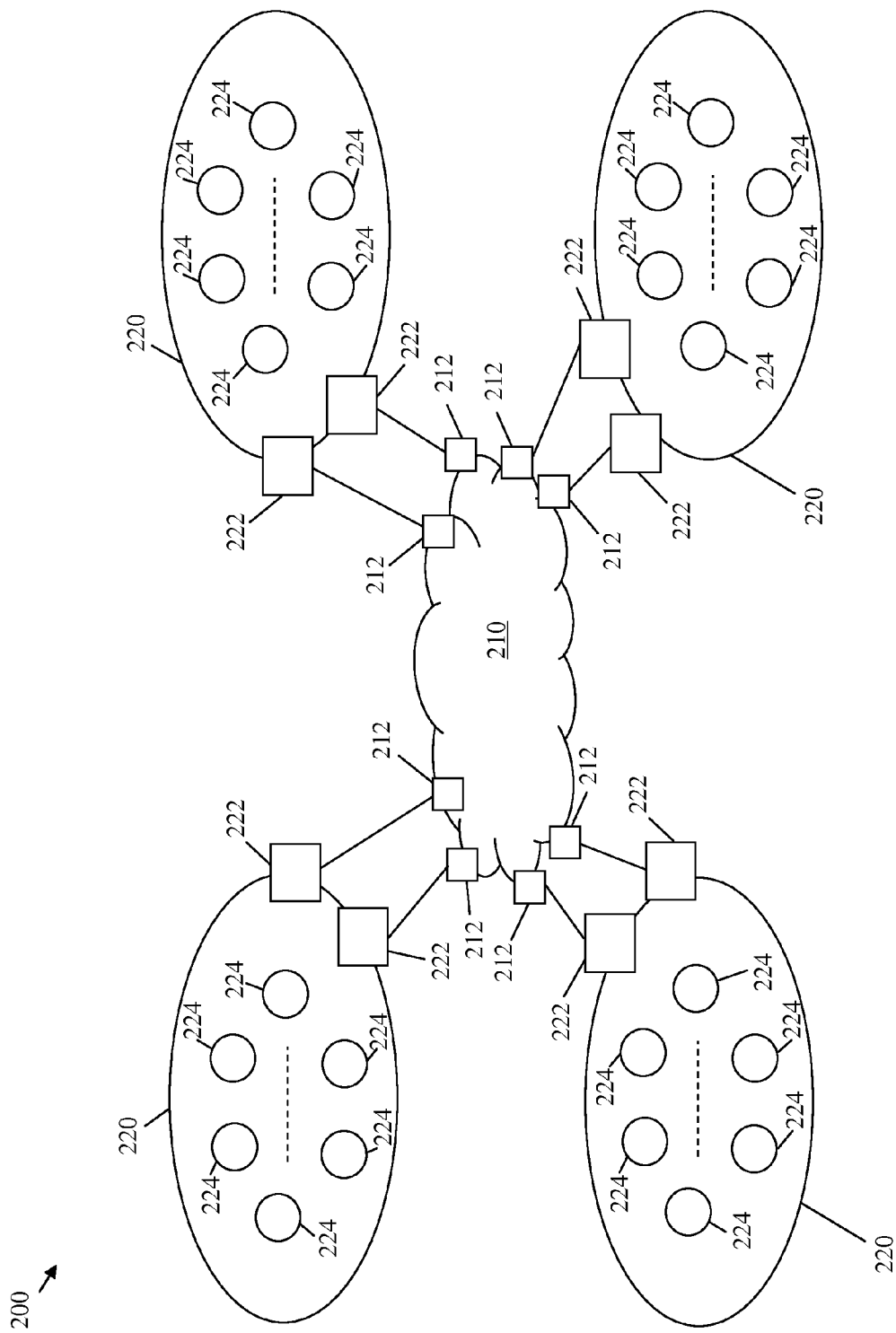
FIG. 2 is a schematic diagram of an embodiment of a virtual Layer 2 network.

FIG. 2 illustrates an embodiment of a virtual Layer 2 network 200 across different DC or physical locations. The virtual Layer 2 network 200 may be a scalable mechanism for connecting Layer 2 networks across multiple locations, e.g., geographical locations or DCs, or multiple sites within one data center, to establish a unified or flat Layer 2 network. The virtual Layer 2 network 200 may comprise a service network 210 and a plurality of Layer 2 networks 220 that may be connected to the service network 210 via a plurality of edge nodes 212, such as edge routers. The service network 210 may refer herein to an interconnecting network, such as a service provider network, a core network, a Layer 3 network, a Layer 2 or 2.5 network, or any other network that connects or interconnects components in multiple sites. Each Layer 2 network 220 may comprise a plurality of L2GWs 222 connected to corresponding edge nodes 212, and a plurality of intermediate switches 224 that may be connected to the L2GWs 222. The components of virtual Layer 2 network 200 may be arranged as shown in FIG. 2. The intermediate switches 224 may also be connected to a plurality of hosts and/or VMs (not shown).

The service network 210 may be any network established to interconnect the Layer 2 networks 220, such as a service provider network. For example, the service network 210 may be a Layer 2, Layer 2.5, or Layer 3 network, such as a virtual private network (VPN). The service network 210 may not be aware of all the addresses, e.g., MAC addresses, behind the L2GWs 222. The L2GWs 222 may be border nodes in each DC location and have Layer 2 interfaces to communicate internally in the DC locations. The L2GWs 222 and the intermediate switches 224 may communicate with the hosts and/or VMs in the same locations within the same Layer 2 networks 220 using the corresponding MAC addresses of the hosts. However, the L2GWs 222 and the intermediate switches 224 may not need to be aware of the MAC addresses of the hosts/VMs in the other Layer 2 networks 220. Instead, a host in one Layer 2 network 220 can use the address of a L2GW 222 of another Layer 2 network 220 (in another location or site) as the destination address to communicate with a target host in the other Layer 2 network. When a frame (e.g., an Ethernet frame) arrives at the L2GW 222 of the target site, e.g., the other Layer 2 network, the destination address of the target host may be translated by the L2GWs 222 based on the IP address carried in the payload of the frame, e.g., using a network address translation (NAT) table or a MAC address translation (MAT) table, as described below.

In an embodiment, each L2GW 222 may maintain the addresses of all the hosts/VMs within the same Layer 2 network 220 of the L2GW 222 in a local IP addresses information table (Local-IPAddrTable). The L2GW 222 may also be configured to implement a proxy ARP function, as described below. Additionally, the L2GW 222 may maintain a MAC forwarding table, which may comprise the MAC addresses for non-IP applications. The MAC addresses may comprise the MAC addresses of the hosts/VMs and the intermediate switches 224 within the same location, e.g., the same Layer 2 network 220.

The L2GW 222 may inform its peers (e.g., other L2GWs 222) in other locations (e.g., other Layer 2 networks 220) of all the active VLANs and all the IP addresses of the local hosts under each VLAN in its location. If there are non-IP applications within the domain, the L2GW 222 may also inform its peers of the MAC addresses and VLANs of those non-IP applications. A Layer 2 site or Layer 2 network 220 may have many VLANs enabled on the L2GWs' 222 ports and the intermediate switches' 224 ports for the sake of operation convenience. Thus, a VM or host belonging to any of the enabled VLANs may be moved in without additional configuration. A VALN that is active in a site (or Layer 2 network 220) may have hosts belonging to this VLAN that resided within this site. The L2GWs 222 across the different locations may obtain the host IP addresses of all the other locations, even if the L2GWs 222 may only keep the address information for the VLANs that are active in their local sites (e.g., in a remote IP Address Information Table for each L2GW 222). If there are no hosts in the local domain that belong to VLAN identifier (VID) for the VLAN, then there may be no need to keep the remote hosts information for this VID, since there may be no communications for this VID to be targeted to local domain. The terms VLAN and VID are used herein interchangeably to refer to an established VLAN, even though a VLAN may be assigned multiple VIDs (e.g., as described in IEEE 802.1Q). Hence, each L2GW 222 may map each group of IP addresses that belongs to a location (e.g., on of the Layer 2 networks 220) to the MAC address of the corresponding L2GW 222 that belongs to the same location. The L2GW 222 also sends update of the address information to the peers when there is a change in its Local-IPAddrTable to update the information in the other peers. This may allow updating the address information and mapping in each L2GW 222 in an incremental manner.

Figure 3:
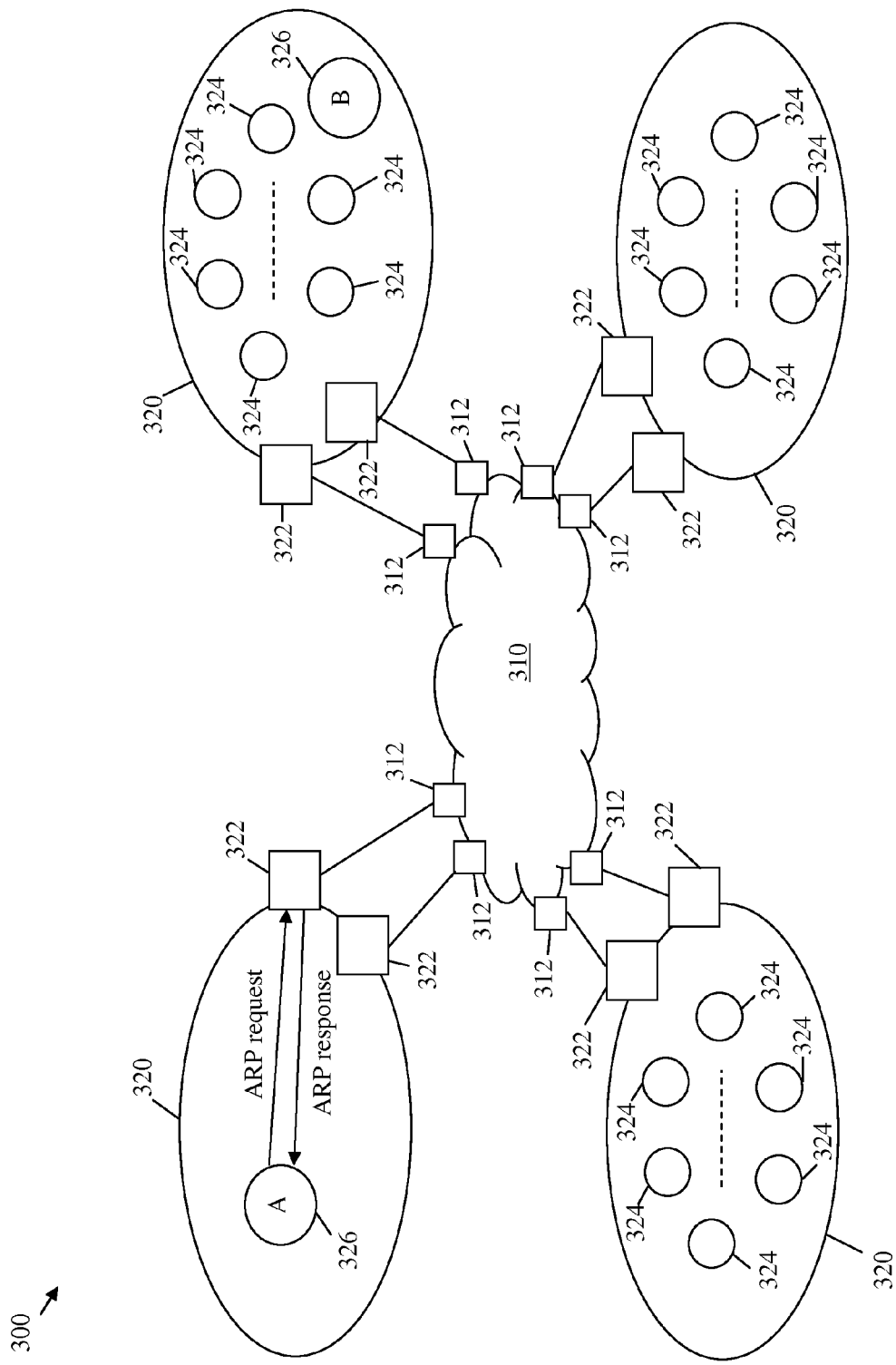
FIG. 3 is a schematic diagram of an embodiment of a border control mechanism.

FIG. 3 illustrates an embodiment of a border control mechanism 300. The border control mechanism 300 may be a scalable mechanism for establishing a flat or virtual Layer 2 network across multiple sites, locations or DCs. The virtual Layer 2 network may comprise a service network 310 and a plurality of Layer 2 networks 320 that may be connected to the service network 310 via a plurality of edge nodes 312, such as edge routers. Each Layer 2 network 220 may comprise a plurality of L2GWs 322 connected to corresponding edge nodes 312, and a plurality of intermediate switches 324 that may be connected to the L2GWs 322. The intermediate switches 324 may also be connected (or reachable) to hosts 326, e.g., instantiated on a VM or a server. The components of virtual Layer 2 network may be arranged as shown in FIG. 2 and may be similar to the corresponding components of the virtual Layer 2 network 200.

Based on the border control mechanism 300, each L2GW 322 may maintain the IP addresses of hosts in all the locations belonging to the VLANs which are active in its corresponding local Layer 2 site, e.g., corresponding the Layer 2 network 320. Each L2GW 322 may also be aware of the MAC addresses of the peer L2GWs 322 in the other locations. However, the L2GW 322 may not maintain the MAC addresses of the hosts in the other locations, which may substantially reduce the size of data exchanged (and stored) among the L2GWs 322, since IP addresses may be summarized (e.g., 10.1.1.x may represent 255 hosts) while MAC addresses may not be summarized. The IP addresses maintained at the L2GW 322 may be mapped to the MAC addresses of the corresponding L2GWs 322 of the same locations. Specifically, each set of host IP addresses that belong to each location or Layer 2 network 300 may be mapped to the MAC address of the L2GW 322 in that location. However, the L2GWs 322 may exchange, across different locations, a plurality of MAC addresses for nodes that run non-IP applications.

To support address resolution across the different locations of the virtual Layer 2 network, an ARP (or ND) request may be sent from a first host 326 (host A) and be intercepted by the corresponding local L2GW 322 in a first location or Layer 2 network 320. The host A may send the ARP request to obtain the MAC address of a second host 326 (host B) in a second location or Layer 2 network 320. If the local L2GW 322 has an entry for the host B belonging to the same VLAN as host A, e.g., the IP address of the host B, the local L2GW 322 may respond to the ARP/ND request by sending its own MAC address to the host A. Alternatively, the local L2GW 322 may send the corresponding L2GW's MAC address (where host B resides) in the ARP/ND response to host A. If the local L2GW 322 does not maintain or store an entry for the host B for the VLAN, the local L2GW 322 may assume that the host B does not exist. For example, the L2GWs 322 may update their peers with their local host IP addresses and their corresponding VLAN(s) on a regular or periodic basis. It is possible that some L2GWs 322 may not have received updates for the IP addresses of newly configured hosts in other locations for some VLANs. In such case, no response is sent back and the requesting entity (host A) may send multiple ARP/ND requests for the target host.

In an embodiment, the L2GW 222 may send out a plurality of aggregated IP addresses of the local hosts under each VLAN to the other L2GW 222 in the other Layer 2 sites. The number of entries in the aggregated addresses may be substantially smaller than the corresponding number of entries in the Local-IPAddrTable of the L2GW 222. in some embodiments, the L2GW 222 may send out requests to all other L2GWs 222 in other Layer 2 sites to solicit IP addresses (in aggregated form) under a single VLAN (or any of the VLANs) in the remote sites. This may be useful when a host belonging to a VLAN that was not active is added to the local site of the L2GW 222.

Table 1 illustrates an example of mapping host addresses to the corresponding L2GW's MAC addresses and VLAN according to the border control mechanism 300. A plurality of L2GW MAC addresses (e.g., L2GW1 MAC and L2GW2 MAC) may be mapped to a plurality of corresponding host addresses. Each L2GW MAC address may be mapped to a plurality of host IP (or MAC) addresses in a plurality of VLANs (e.g., VLAN#, VLAN-x, . . . ) that may be associated with the same location or DC. Each VLAN may also comprise a plurality of virtual private groups (VPGs) (or Closed User Groups) of hosts. A VPG may be a cluster of hosts and/or VMs that belong to a Layer 2 domain (or L2 domain) and may communicate with each other via Layer 2. A Layer 2 domain may be used herein to refer to a sub-location or sub-site in a Layer 2 network. When a Layer 2 network spans across multiple sites or locations, each site may be referred to herein as a Layer 2 domain. The terms Layer 2 domain, Layer 2 site, and Layer 2 district may be used herein interchangeably. The terms domain, site, and district may also be used herein interchangeably. The hosts in the VPG may also have multicast groups established among them. The hosts/VMs within a VPG may span across multiple physical locations. Under many cases, one VLAN may be dedicated to one customer, e.g., there may be only one VPG per VLAN. As such, there may be no need to have the VPG column (or attribute) in the table under in such cases.

For example, VLAN# may comprise a plurality of hosts in multiple VPGs, including G-x1, G-x2, . . . . And each VPG may comprise a plurality of hosts. For IP applications, the hosts IP addresses in each VLAN may be mapped to the corresponding L2GW MAC address in the same location, such as in the case of VLAN# and VLAN-x . . . ). IP Addresses may be summarized to reduce the amount of entries in the table. For non-IP applications, the hosts MAC addresses in each VLAN may be mapped to the corresponding L2GW MAC address in the same location for the VLAN, such as in the case of VLAN-x1. In some cases, there may be only one VPG for each VLAN, and hence the VPG column in Table 1 may not be needed.

TABLE 1

Border Control Mechanism

| L2GW | VLAN | VPG | Host |
|---|---|---|---|
| L2GW1 MAC | VLAN# | G-x1 | All IP hosts in this group |
| | | G-x2 | All IP hosts in this group |
| | VLAN-x | . . . | |
| | | G-xj | |

TABLE 1-continued

Border Control Mechanism

| L2GW | VLAN | VPG | Host |
|---|---|---|---|
| | VLAN-x1 | G-j1 | MAC (switches and/or nodes without IP addresses) |
| | | | MAC |
| | | G-j2 | MAC |
| L2GW2 MAC | | | |

Figure 4:
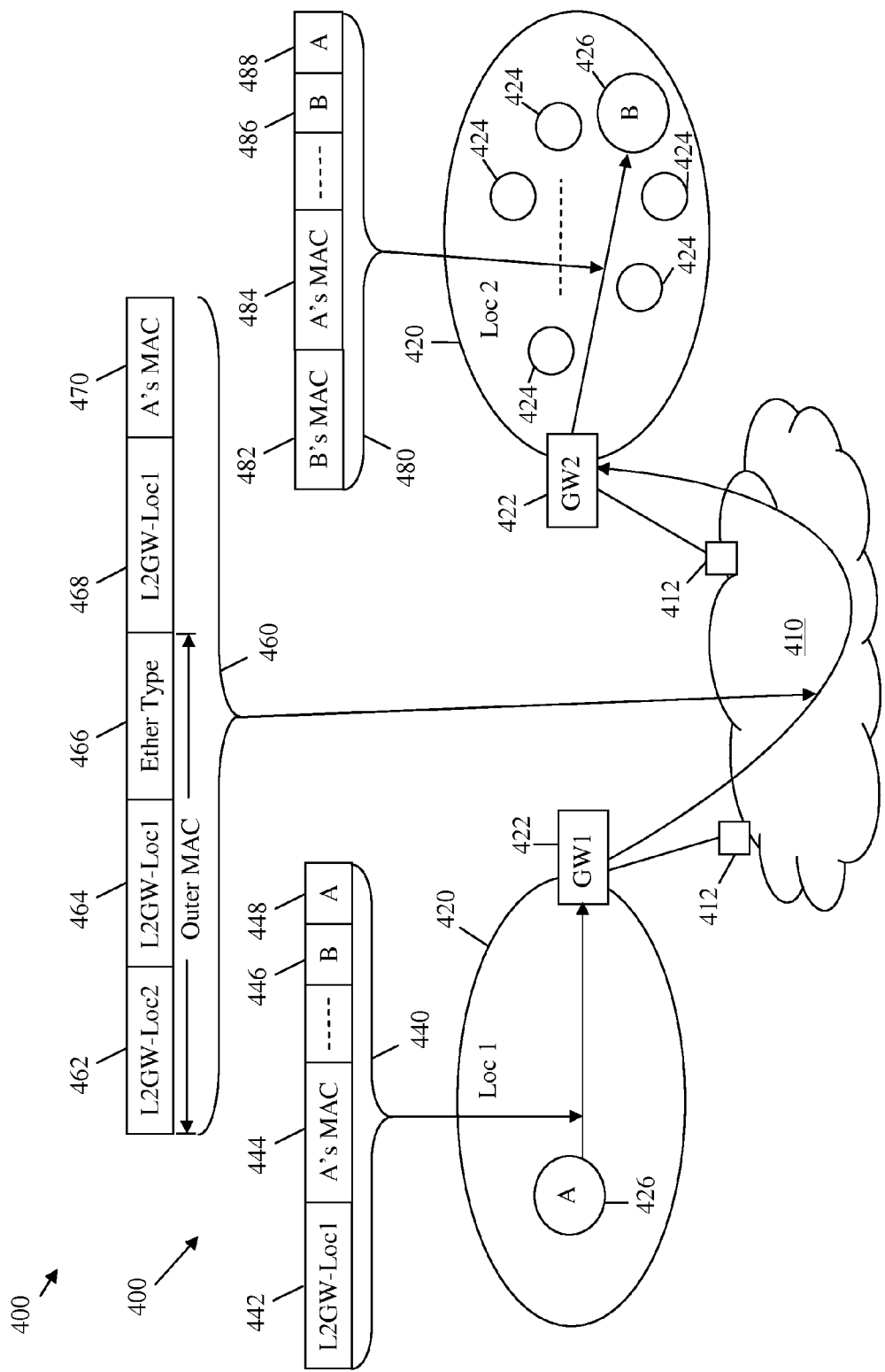
FIG. 4 is a schematic diagram of an embodiment of a data frame forwarding scheme.

FIG. 4 illustrates an embodiment of a data frame forwarding scheme 400 that may be used in a virtual Layer 2 network across multiple locations or DCs. The virtual Layer 2 network may comprise a service network 410 and a plurality of Layer 2 networks 420 that may be connected to the service network 410 via a plurality of edge nodes 412, such as edge routers. Each Layer 2 network 420 may comprise a plurality of L2GWs 422 connected to corresponding edge nodes 412, and a plurality of intermediate switches 424 that may be connected to the L2GWs 422. The intermediate switches 424 may also be connected to hosts 426, e.g., VMs. The components of virtual Layer 2 network may be arranged as shown in FIG. 4 and may be similar to the corresponding components of the virtual Layer 2 network 200.

Based on the data frame forwarding scheme 400, the L2GWs 422 may support the Institute of Electrical and Electronics Engineers (IEEE) 802.1ah standard for MAC-in-MAC, which is incorporated herein by reference, using an Ether Type field to indicate that an inner frame needs MAC address translation. For instance, a first L2GW 422 (GW1) may receive a frame 440, e.g., an Ethernet frame, from a first host 426 (host A) in a first location (Loc 1). The frame 440 may be intended for a second host 426 (host B) in a second location (Loc 2). The frame 440 may comprise a MAC destination address (MAC-DA) 442 for GW1 (L2GW-Loc1), a MAC source address (MAC-SA) 444 for host A (A's MAC), an IP destination address (IP-DA) 446 for host B (B), an IP source address (IP-SA) 448 for host A (A), and payload. GW1 may then add an outer MAC header to the frame 440 to obtain an inner frame 460. The outer MAC header may comprise a MAC-DA 462 for GW2 (L2GW-Loc2), a MAC-SA 464 for GW1 (L2GW-Loc1), and an Ether Type 466 that indicates that the inner frame 460 needs MAC address translation. The inner frame 460 may also comprise a MAC-DA 468 for GW1 (L2GW-Loc1) and a MAC-SA 470 for host A (A's MAC). The inner frame 460 may then be forwarded in the service network 410 to GW2, which may process the outer MAC header to translate the MAC addresses of the frame. As such, GW2 may obtain a second frame 480, which may comprise a MAC-DA 482 for host B (B's MAC), a MAC-SA 484 for host A (A's MAC), an IP-DA 486 for host B (B), an IP-SA 488 for host A (A), and payload. The second frame 480 may then be forwarded to host B in Loc 2.

The data frame forwarding scheme 400 may be simpler to implement than Cisco's OTV scheme which requires encapsulating an outer IP header. Additionally, many Ethernet chips support IEEE 802.1ah. A service instance-tag (I-TAG), such as specified in 802.1ah, may be used to differentiate between different VPGs. Thus, an I-TAG field may also be used in the data frame forwarding scheme 400 to separate between multiple VPGs of the provider domain, e.g., in the service network 410. GW2 may perform the MAC translation scheme described above using a MAT, which may be similar to using a NAT for translating a public IP into a private IP. Unlike the NAT scheme that is based on a Transmission Control Protocol (TCP) session, the MAT scheme may be based on using an inner IP address to find the MAC address.

Figure 5:
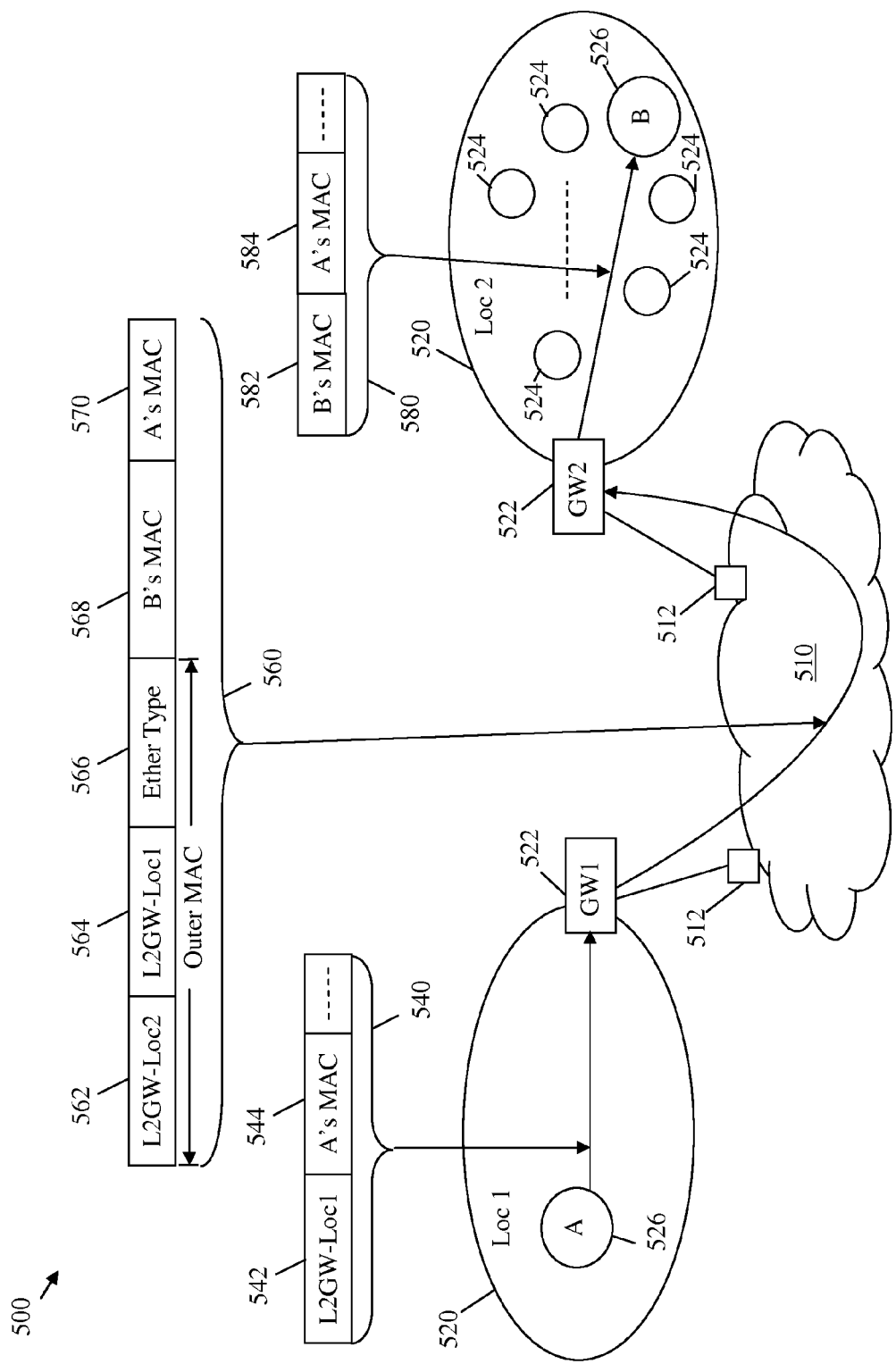
FIG. 5 is a schematic diagram of another embodiment of a data frame forwarding scheme.

FIG. 5 illustrates an embodiment of another data frame forwarding scheme 500 for non-IP applications. The data frame forwarding scheme 500 may use MAC addresses of non-IP hosts or hosts that implement non-IP applications instead of IP addresses to forward frames between the hosts in different locations in a virtual Layer 2 network. The virtual Layer 2 network may comprise a service network 510 and a plurality of Layer 2 networks 520 that may be connected to the service network 510 via a plurality of edge nodes 512, such as edge routers. Each Layer 2 network 520 may comprise a plurality of L2GWs 522 connected to corresponding edge nodes 512, and a plurality of intermediate switches 524 that may be connected to the L2GWs 522. The intermediate switches 524 may also be connected to hosts 526, e.g., VMs. The components of virtual Layer 2 network may be arranged as shown in FIG. 5 and may be similar to the corresponding components of the virtual Layer 2 network 200.

Based on the data frame forwarding scheme 500, the L2GWs 522 may support IEEE 802.1ah for MAC-in-MAC. For instance, a first L2GW 520 (GW1) may receive a frame 540, e.g., an Ethernet frame, from a first host 526 (host A) in a first location (Loc 1). The frame 540 may be intended or destined for a second host 526 (host B) in a second location (Loc 2). The frame 540 may comprise a MAC-DA 542 for GW1 (L2GW-Loc1), a MAC-SA 544 for host A (A's MAC), and payload. GW1 may then add outer MAC header to the frame 540 to obtain an inner frame 560. The outer MAC header may comprise a MAC-DA 562 for GW2 (L2GW-Loc2), a MAC-SA 564 for GW1 (L2GW-Loc1), and an Ether Type 566 that indicates that the inner frame 560 is a MAC-in-MAC frame. The inner field 560 may also comprise a MAC-DA 568 for host B (B's MAC) and a MAC-SA 570 for host A (A's MAC). The inner frame 560 may then be forwarded in the service network 510 to GW2, which may process the inner frame 560 to obtain a second frame 580. The second frame 580 may comprise a MAC-DA 582 for host B (B's MAC) and a MAC-SA 584 for host A (A's MAC), and payload. The second frame 580 may then be forwarded to host B in Loc 2.

The data frame forwarding scheme 500 may be simpler to implement than Cisco's OTV scheme which requires encapsulating outer IP header. Additionally, many Ethernet chips support IEEE 802.1ah. An I-TAG, as described in 802.1ah, may be used to differentiate between different VPGs. Thus, an I-TAG field may also be used in the data frame forwarding scheme 500 to separate between multiple VPGs of the provider domain, e.g., in the service network 510. GW2 may process the second frame 580, as described above, without performing a MAC translation scheme.

Figure 6:
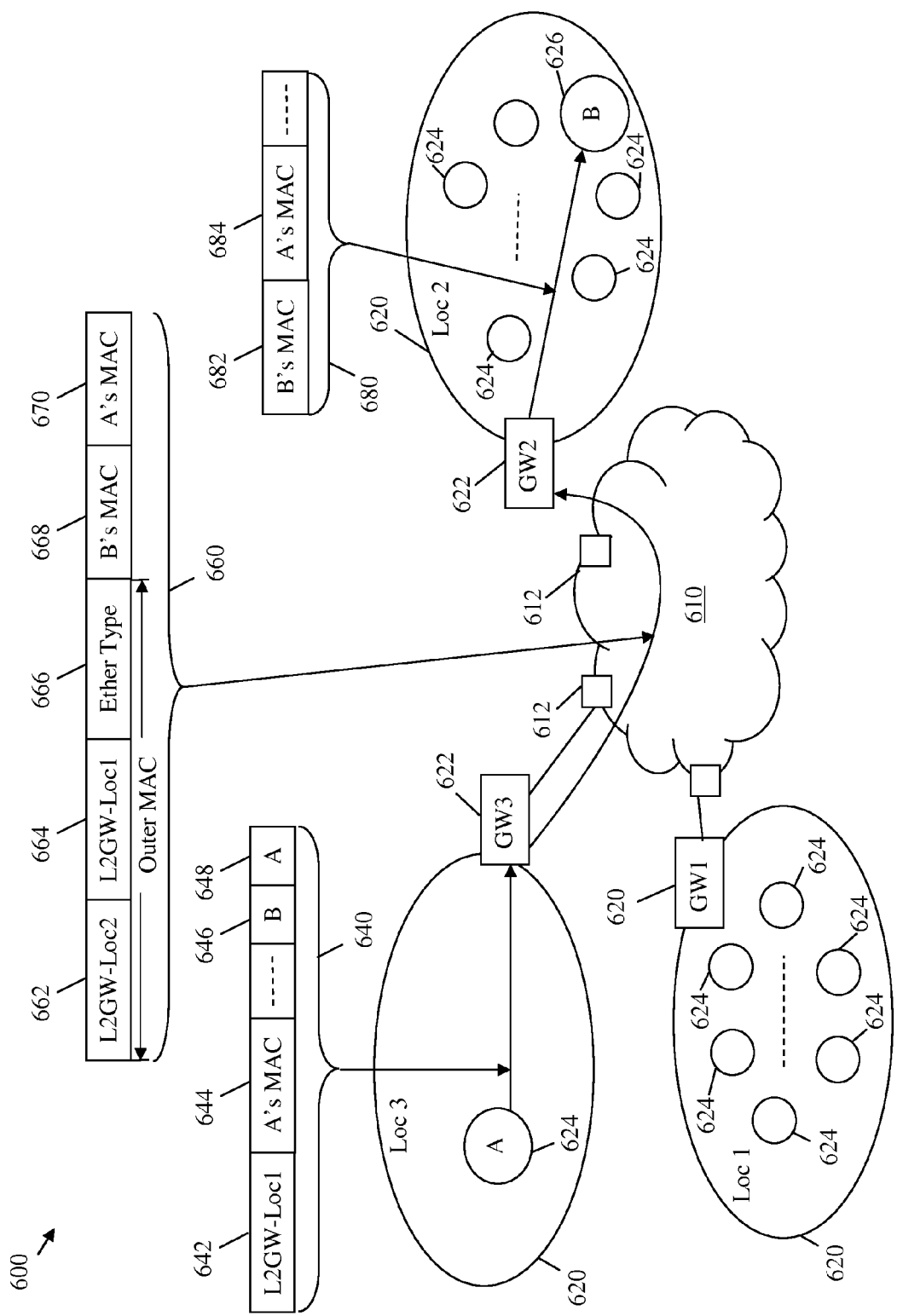
FIG. 6 is a schematic diagram of another embodiment of a data frame forwarding scheme.

FIG. 6 illustrates an embodiment of another data frame forwarding scheme 600 that may be used in a virtual Layer 2 network across multiple locations. The data frame forwarding scheme 600 may be used to forward frames from a host that moves from a previous location to a new location in the virtual Layer 2 network and maintains the same learned MAC address for a second host. The virtual Layer 2 network may comprise a service network 610 and a plurality of Layer 2 networks 620 that may be connected to the service network 610 via a plurality of edge nodes 612, such as edge routers. Each Layer 2 network 620 may comprise a plurality of L2GWs 622 connected to corresponding edge nodes 612, and a plurality of intermediate switches 624 that may be connected to the L2GWs 622. The intermediate switches 624 may also be connected to hosts 626, e.g., VMs. The components of virtual Layer 2 network may be arranged as shown in FIG. 6 and may be similar to the corresponding components of the virtual Layer 2 network 200.

When a first host 626 (host A) moves from a previous location (Loc 1) to a new location (Loc 3), host A may still use the same learned MAC address for a second host 626 (host B). According to the data frame forwarding scheme 600, a L2GW 622 of Loc 3 (GW3) may support 802.1ah MAC-in-MAC using an Ether Type field to indicate that an inner frame needs MAC address translation. GW3 may implement a data frame forwarding scheme similar to the data frame forwarding scheme 400 to send data to a second L2GW 622 of Loc 2 (GW2) using GW2's MAC address in an outer MAC header. Thus, GW2 may decapsulate the outer MAC header and perform MAC address translation, as described above (for the data frame forwarding scheme 400).

For instance, GW3 may receive a frame 640, e.g., an Ethernet frame, from host A after moving to Loc 3. The frame 640 may be intended for host B in Loc 2. The frame 640 may comprise a MAC-DA 642 for a previous L2GW 622 (GW1) of Loc 1 (L2GW-Loc1), a MAC-SA 644 for host A (A's MAC), an IP-DA 646 for host B (B), an IP-SA 648 for host A (A), and payload. GW3 may then add an outer MAC header to the frame 640 to obtain an inner frame 660. The outer MAC header may comprise a MAC-DA 662 for GW2 (L2GW-Loc2), a MAC-SA 664 for GW1 (L2GW-Loc1), and an Ether Type 666 that indicates that the inner frame 660 needs MAC address translation. The inner frame 660 may also comprise a MAC-DA 668 for host B (B's MAC) and a MAC-SA 670 for host A (A's MAC). The inner frame 660 may then be forwarded in the service network 610 to GW2, which may process the outer MAC header to translate the MAC addresses of the frame. As such, GW2 may obtain a second frame 680, which may comprise a MAC-DA 682 for host B (B's MAC), a MAC-SA 684 for host A (A's MAC), and payload. The second frame 680 may then be forwarded to host B in Loc 2.

Further, host B may move from Loc 2 to another location, e.g., Loc 4 (not shown). If GW2 has learned that host B has moved from Loc 2 to Loc 4, then GW2 may use the MAC address of another L2GW 622 in Loc 4 (GW4) as a MAC-DA in an outer MAC header, as described above. If GW2 has not learned that host B has moved from Loc 2 to Loc 4, then the frame may be forwarded by GW2 without the outer MAC header. As such, the frame may be lost, e.g., in the service network 610. The frame may be lost temporarily until the frame is resent by GW2 after host B announces its new location to GW2 or Loc 2.

Figure 7:
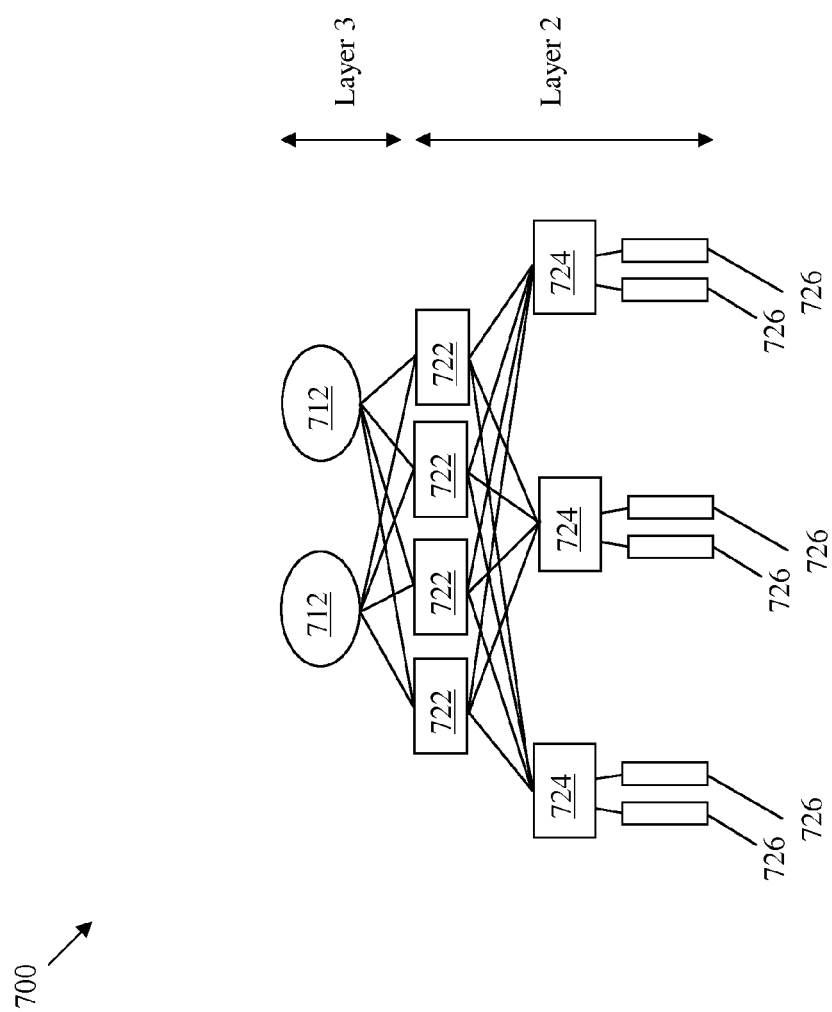
FIG. 7 is a schematic diagram of an embodiment of interconnected Layer 2 sites.

FIG. 7 illustrates an embodiment of interconnected Layer 2 sites (or districts) 700 that may implement a similar border control mechanism as the virtual Layer 2 networks above. The interconnected Layer 2 sites 700 may comprise a plurality of L2GWs 722 connected by a plurality of border or edge nodes 712. The edge nodes, e.g., edge routers, may belong to a service network, e.g., a Layer 3 network. The interconnected Layer 2 sites 700 may also comprise a plurality of intermediate switches 724 connected to the L2GWs 722, and a plurality of VMs 726 connected to the intermediate switches 724. The L2GWs 722, intermediate switches 724, and VMs 726 may support multiple subsets that correspond to a plurality of Layer 2 (L2) address domains. The components of the interconnected Layer 2 sites 700 may be arranged as shown in FIG. 7 and may be similar to the corresponding components of the virtual Layer 2 network 200.

Each L2 address domain may use a border control mechanism, such as the border control mechanism 300, where the intermediate switches 724 and VMs 726 within each Layer 2 domain may be aware of local MAC addresses but not the MAC addresses and VLAN for hosts, servers, and/or VMs 726 in the other L2 address domains. However, the hosts, servers, and/or VMs 726 may communicate with each other as in a single flat Layer 2 network without being aware of the different Layer 2 domains. The Layer 2 domains may be interconnected to each other via the border or edge nodes 712, which may be interconnected over a core network or service provider network (not shown). The L2 address domains may be located in one DC site or at a plurality of geographic sites. The architecture of the interconnected Layer 2 sites 700 across the multiple sites (locations) may also be referred to herein as a Layer 2 extension over multiple sites interconnected by a service network (Layer 3, 2.5, 2 or other networks), pseudo Layer 2 networks over sites interconnected by a service network, virtual Layer 2, or pseudo Layer 2 networks.

Figure 8:
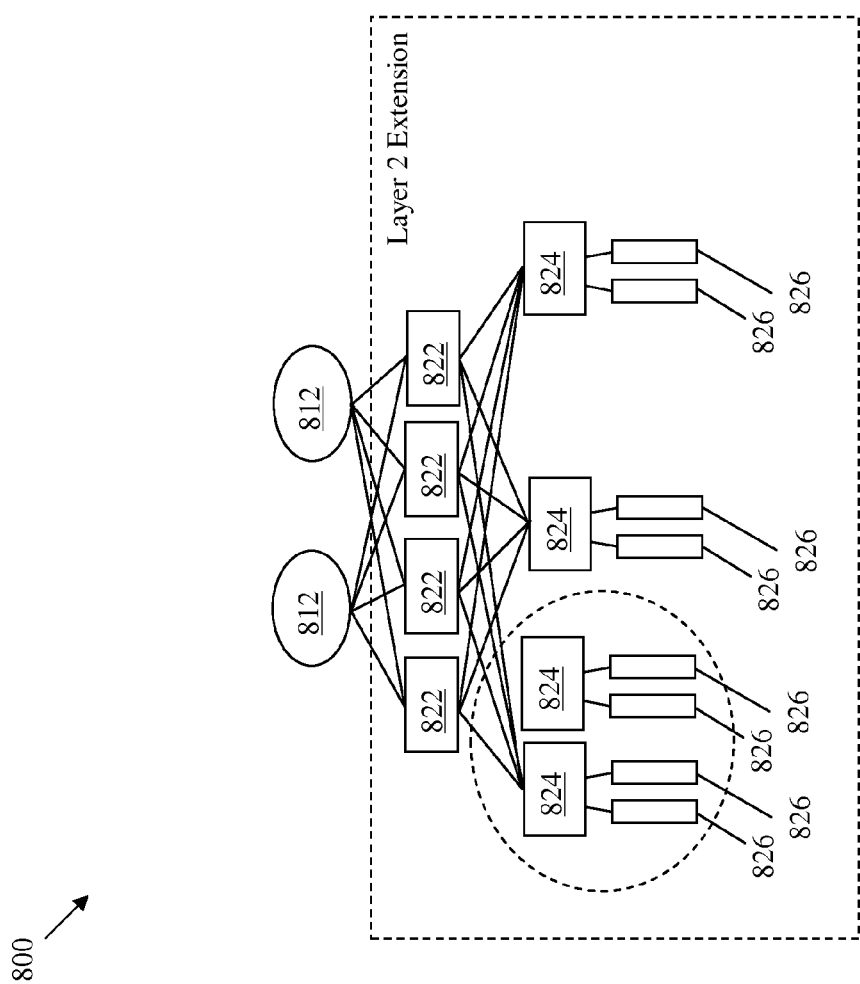
FIG. 8 is a schematic diagram of an embodiment of a Layer 2 extension over multiple address domains.

FIG. 8 illustrates one embodiment of a Layer 2 extension 800 over multiple sites interconnected by a service network. The Layer 2 extension 800 may comprise a plurality of L2GWs 822 connected to a plurality of border or edge nodes 812, which may belong to a service provider or core network (not shown). The Layer 2 extension 800 may also comprise a plurality of intermediate switches 824 connected to the L2GWs 822, and a plurality of hosts/servers/VMs 826 connected to the intermediate switches 824. The intermediate switches 824 and hosts/servers/VMs 826 may be separated or arranged into a plurality of L2 address domains. For example, one of the L2 sites is indicated by the dashed line circle in FIG. 8. The L2GWs 822, intermediate switches 824, and hosts/servers/VMs 826 may correspond to a Layer 2 network at one or multiple DC locations. The components of the Layer 2 extension 800 may be arranged as shown in FIG. 8 and may be similar to the corresponding components of the virtual Layer 2 network 200.

Figure 9:
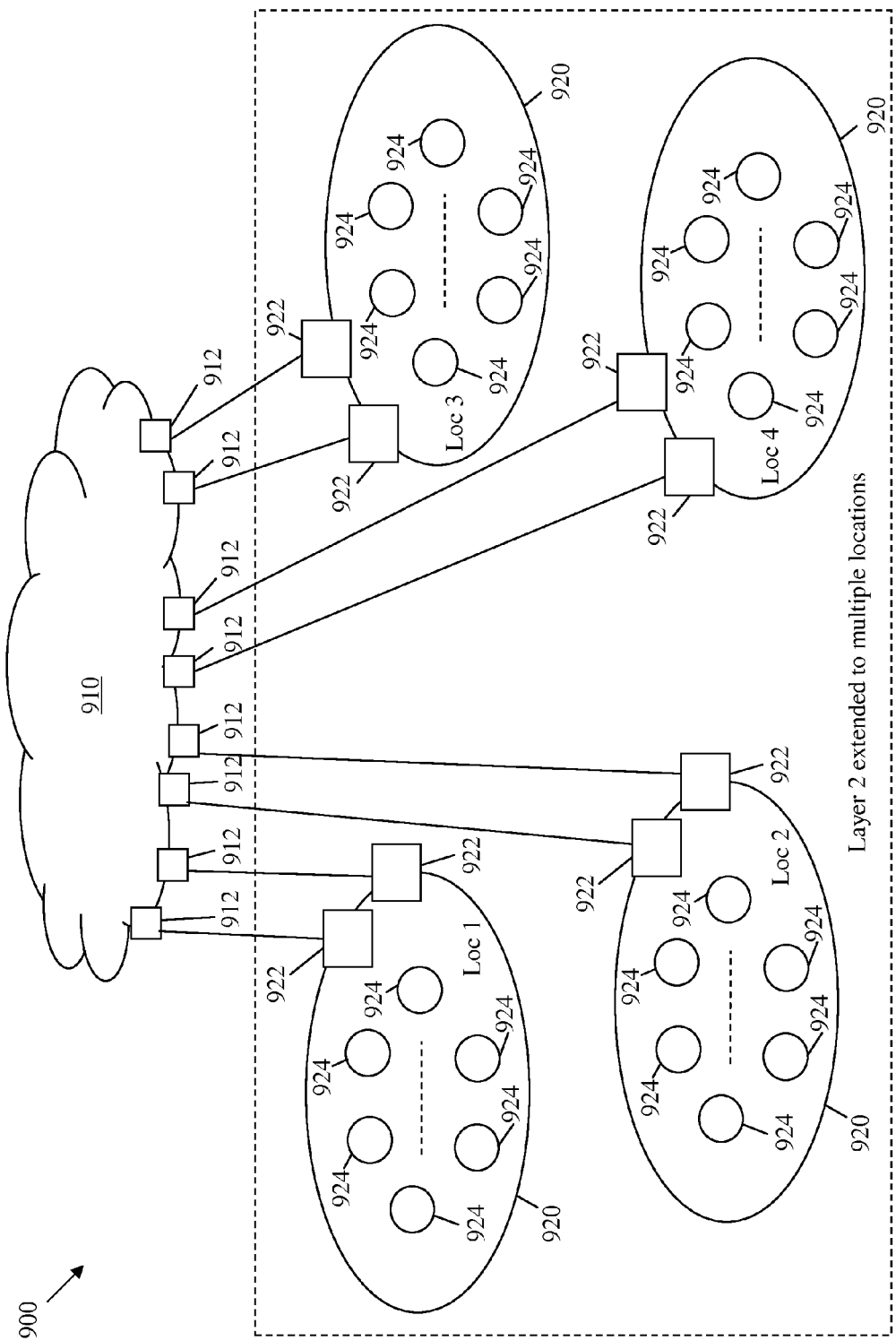
FIG. 9 is a schematic diagram of an embodiment of pseudo Layer 2 networks over multiple address domains.

FIG. 9 is a schematic diagram of an embodiment of pseudo Layer 2 networks 900 over multiple locations. The pseudo Layer 2 networks 900 may be a mechanism for connecting Layer 2 across multiple locations, e.g., geographical locations or DCs, to establish one flat Layer 2 network. The pseudo Layer 2 networks 900 may comprise a service provider or core network 910 and a plurality of Layer 2 network domains 920 that may be connected to the service provider or core network 910 via a plurality of edge nodes 912, such as edge routers. Each Layer 2 site 920 may be located at a different DC site (or floor, or zone) or location and may comprise a plurality of L2GWs 922 connected to corresponding edge nodes 912, and a plurality of intermediate switches 924 connected to corresponding L2GWs 922. The intermediate switches 924 may also be connected to a plurality of hosts/servers/VMs (not shown). The components of the pseudo Layer 2 networks 900 may be arranged as shown in FIG. 9 and may be similar to the corresponding components of the virtual Layer 2 network 200.

Figure 10:
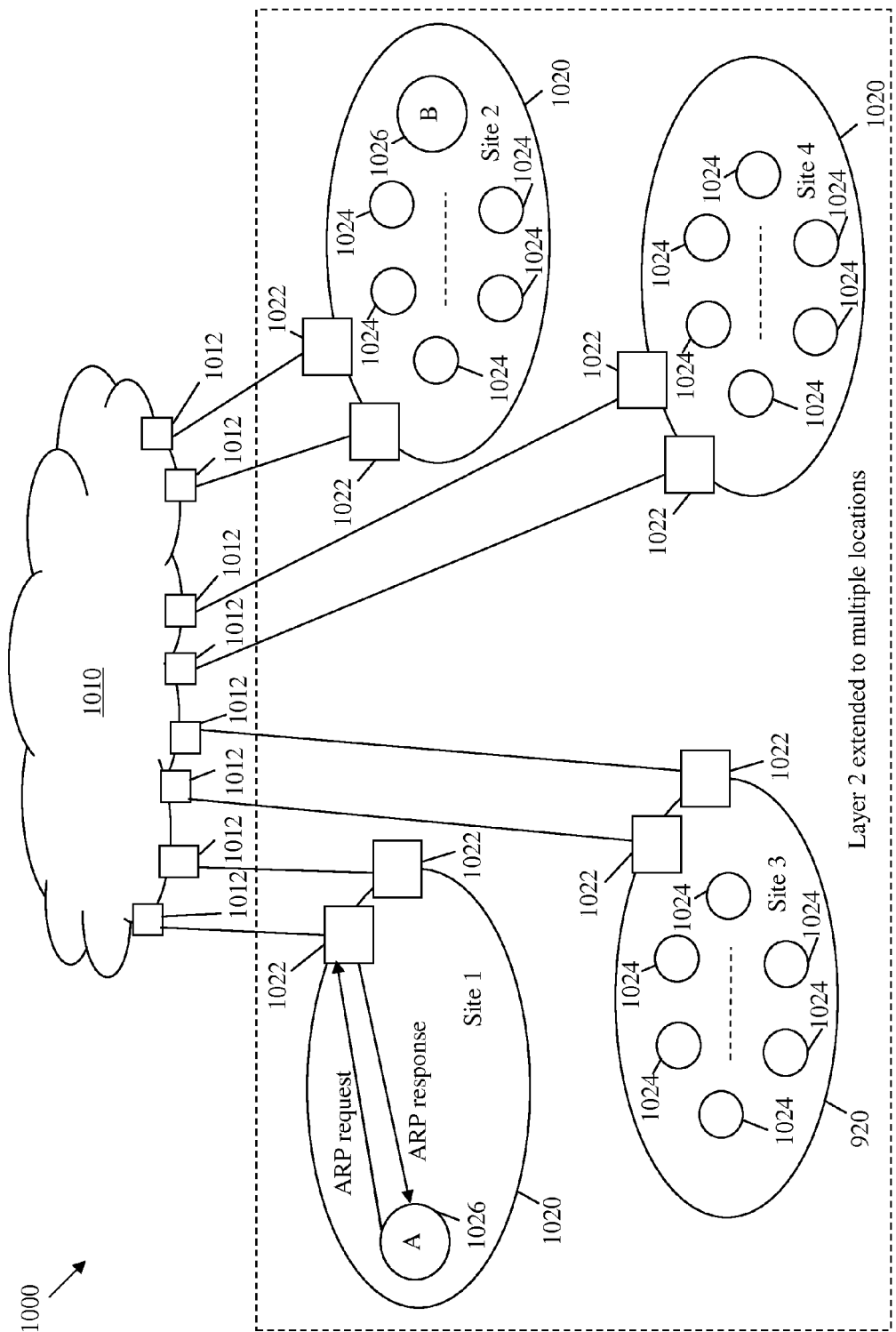
FIG. 10 is a schematic diagram of an embodiment of a domain address restriction mechanism.

FIG. 10 illustrates an embodiment of a domain address restriction mechanism 1000. The domain address restriction mechanism 1000 may be used in pseudo Layer 2 networks over multiple sites to handle address resolution between the different Layer 2 sites. The pseudo Layer 2 networks over multiple sites may comprise a service network 1010 and a plurality of Layer 2 network sites 1020 that may be connected to the service network 1010 via a plurality of edge nodes 1012. The Layer 2 sites 1020 may be located at the same or different DC sites and may comprise a plurality of L2GWs 1022 connected to corresponding edge nodes 1012, and a plurality of intermediate switches 1024 connected to corresponding L2GWs 1022. The intermediate switches 1024 may also be connected to a plurality of hosts/servers/VMs 1026. The components of the pseudo Layer 2 networks may be arranged as shown in FIG. 10 and may be similar to the corresponding components of the virtual Layer 2 network 200.

Specifically, a MAC address of a L2GW 1022 in one Layer 2 site 1020 may be used as a proxy for all or a plurality of the hosts outside this local site. In a first option (option 1), a MAC address for a local L2GW 1022 in the Layer 2 sites 1020 may be used as the proxy for hosts in the other Layer 2 network sites 1020. In this scenario, only addresses of local hosts may be learned by the intermediate switches 1024 and hosts/servers/VMs 1026 in the same local Layer 2 sites 1020. The MAC addresses of external L2GWs 1022 in other Layer 2 sites 1020 may not be exposed to the local Layer 2 sites 1020.

Alternatively, in a second option (option 2), the MAC addresses of L2GWs 1022 in a remote Layer 2 site 1020 may be used as a proxy for all hosts residing in the corresponding site. Under this option, the MAC addresses of external L2GWs 1022 in other Layer 2 sites 1020 may be learned in each Layer 2 site 1020. In this option, the MAC addresses of remote L2GWs 1022 that correspond to the Layer 2 site 1020, where a target host resides, may be returned in response to local host's ARP/ND requests, e.g., when a host intends to communicate with an host in an remote Layer 2 site 1020 and requests the address of the external host. Option 2 may have some advantages over option 1 in some situations.

According to the domain address restriction mechanism 1000, each L2GW 1022 may be aware of all the hosts addresses in the same local Layer 2 site 1020 of the L2GW 1022, e.g., using a reverse ARP scheme or other methods. Each L2GW 1022 may also inform other L2GWs 1022 in other Layer 2 sites 1020 of the hosts IP addresses and the corresponding VLANs (or VIDs).

To resolve addresses within one Layer 2 across the different sites, an ARP/ND request may be sent from a first host 1026 (host A) to a corresponding local L2GW 1022 in a first site (Site 1). The host A may send the ARP/ND request to obtain the MAC address of a second host 1026 (host B) in a second site (Site 2). If the local L2GW 1022 has an entry for the host B for the VLAN, e.g., the IP address of the host B under the same VLAN, the local L2GW 1022 may respond to the ARP request by sending its own MAC address (option 1) or the MAC address of a second L2GW 1022 associated with host B in Site 2 (option 2) to the host A. The ARP/ND request sent from one site, e.g., Site 1, may be intercepted by local L2GW 1022, and may not be forwarded (by the local L2GW 1022) to another site. If the local L2GW 1022 does not comprise an entry for host B under the same VLAN, the local L2GW 1022 may assume that host B does not exist and may not send a response to host A. The L2GWs 1022 of each site may send updates of their local hosts' IP addresses and their corresponding VLAN on a regular or periodic basis to their peer L2GWs 1022. It is possible that some L2GWs 1022 may not have received the IP addresses of newly configured hosts in other locations. Typically, host A may send ARP/ND request repetitively if no response is received.

Figure 11:
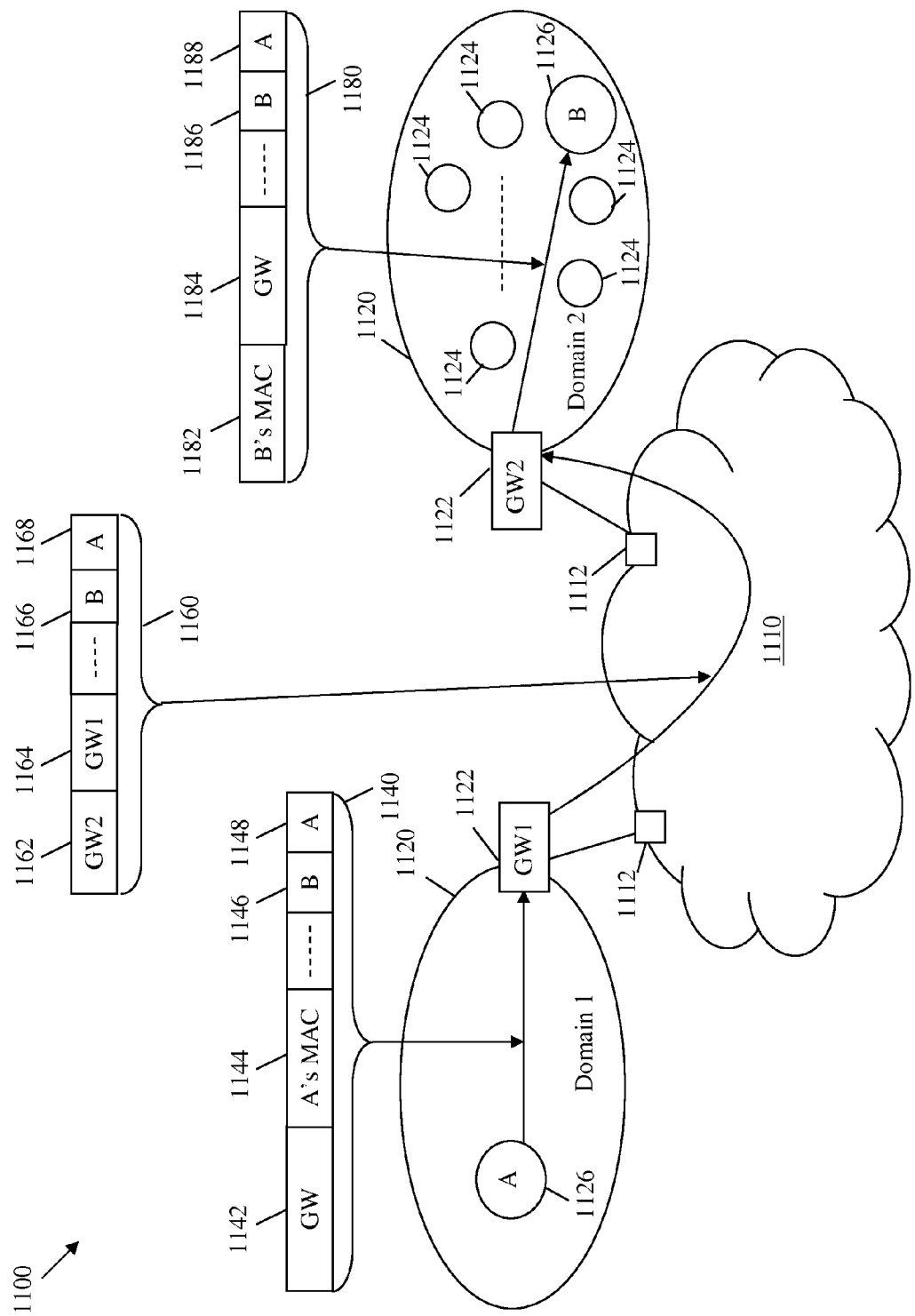
FIG. 11 is a schematic diagram of another embodiment of a data frame forwarding scheme.

FIG. 11 illustrates an embodiment of a data frame forwarding scheme 1100 that may be used to forward messages or frames within one pseudo Layer 2 networks over multiple sites. The pseudo Layer 2 network over multiple sites may comprise a service provider or core network 1110 and a plurality of Layer 2 network domains 1120 that may be connected by the service provider or core network 1110 via a plurality of edge nodes 1112. The Layer 2 network domains 1120 may be located at one or more DC sites or locations and may comprise a plurality of L2GWs 1122 connected to corresponding edge nodes 1112, and a plurality of intermediate switches 1124 connected to corresponding L2GWs 1122. The intermediate switches 1124 may also be connected to a plurality of hosts/servers/VMs 1126. The components of the pseudo Layer 2 networks may be arranged as shown in FIG. 11 and may be similar to the corresponding components of the virtual Layer 2 network 200.

Based on the data frame forwarding scheme 1100, a first L2GW 1022 (GW1) may receive a first frame 1140, e.g., an Ethernet frame, from a first host 1126 (host A) in a first address domain 1120 (domain 1). The first frame 1140 may be intended for a second host 1126 (host B) in a second address domain 1120 (domain 2). The first frame 1140 may comprise a MAC-DA 1142 for a L2GW 1122 (GW). Host A may obtain the MAC address of GW in an ARP response from GW1 in return to an ARP request for host B. GW may correspond to GW1 in domain 1 (according to option 1) or to a second L2GW 1122 (GW2) in domain 2 (according to option 2). The first frame 1140 may also comprise a MAC-SA 1144 for host A (A's MAC), an IP-DA 1146 for host B (B), an IP-SA 1148 for host A (A), and payload.

Based on option 1, GW1 may receive the first frame 1140, look up the VID/destination IP address of host B (e.g., as indicated by IP-DA 1146 for host B), and replace the MAC-DA 1142 for GW in the first frame 1140 with a MAC-DA 1162 for GW2 in an inner frame 1160. GW1 may also replace the MAC-SA 1144 for host A (A's MAC) in the first frame 1140 with a MAC-SA 1164 for GW1 in the inner frame 1160. The inner frame 1160 may also comprise an IP-DA 1166 for host B (B), an IP-SA 1168 for host A (A), and payload. GW1 may send the inner frame 1160 to domain 2 via the service provider or core network 1110. Based on option 2, GW1 may filter out all data frames intended for GW2 or any other external L2GW 1122, for instance based on an access list, replace the source addresses of the data frames (MAC-SA 1144 for host A or A's MAC) with GW1's own MAC address, and then forward the data frames based on the destination MAC.

GW2 may receive the inner frame 1160 and process the inner frame 1160 to translate the MAC addresses of the frame. Based on option 1, GW2 may receive the inner frame 1160, look up the VID/destination IP address of host B (e.g., as indicated by IP-DA 1166 for host B), and replace the MAC-DA 1162 for GW2 in the inner frame 1160 with a MAC-DA 1182 for host B (B's MAC) in a second frame 1180. GW2 may also replace the MAC-SA 1164 for GW1 in the inner frame 1160 with a MAC-SA 1184 for GW2 in the second frame 1180. The second frame 1180 may also comprise an IP-DA 1186 for host B (B), an IP-SA 1188 for host A (A), and payload. GW2 may then send the second frame 1180 to the destination host B. Based on option 2, GW2 may only look up the VID/destination IP address of host B (e.g., as indicated by IP-DA 1166 for host B), and replace the MAC-DA 1162 for GW2 with a MAC-DA 1182 for host B (B's MAC) in the second frame 1180. However, GW2 may keep the MAC-SA 1164 for.

As described above, GW2 may perform MAC address translation using the IP-DA 1166 for host B in the inner frame 1160 to find a corresponding MAC-DA 1182 for host B (B's MAC) in a second frame 1180. This MAC translation step may require about the same amount of work as a NAT scheme, e.g., for translating public IP address to private IP address. The MAC address translation in the data frame forwarding scheme 1100 may be based on using the host IP address to find the corresponding MAC address, while the NAT scheme is based on a TCP session.

Figure 12:
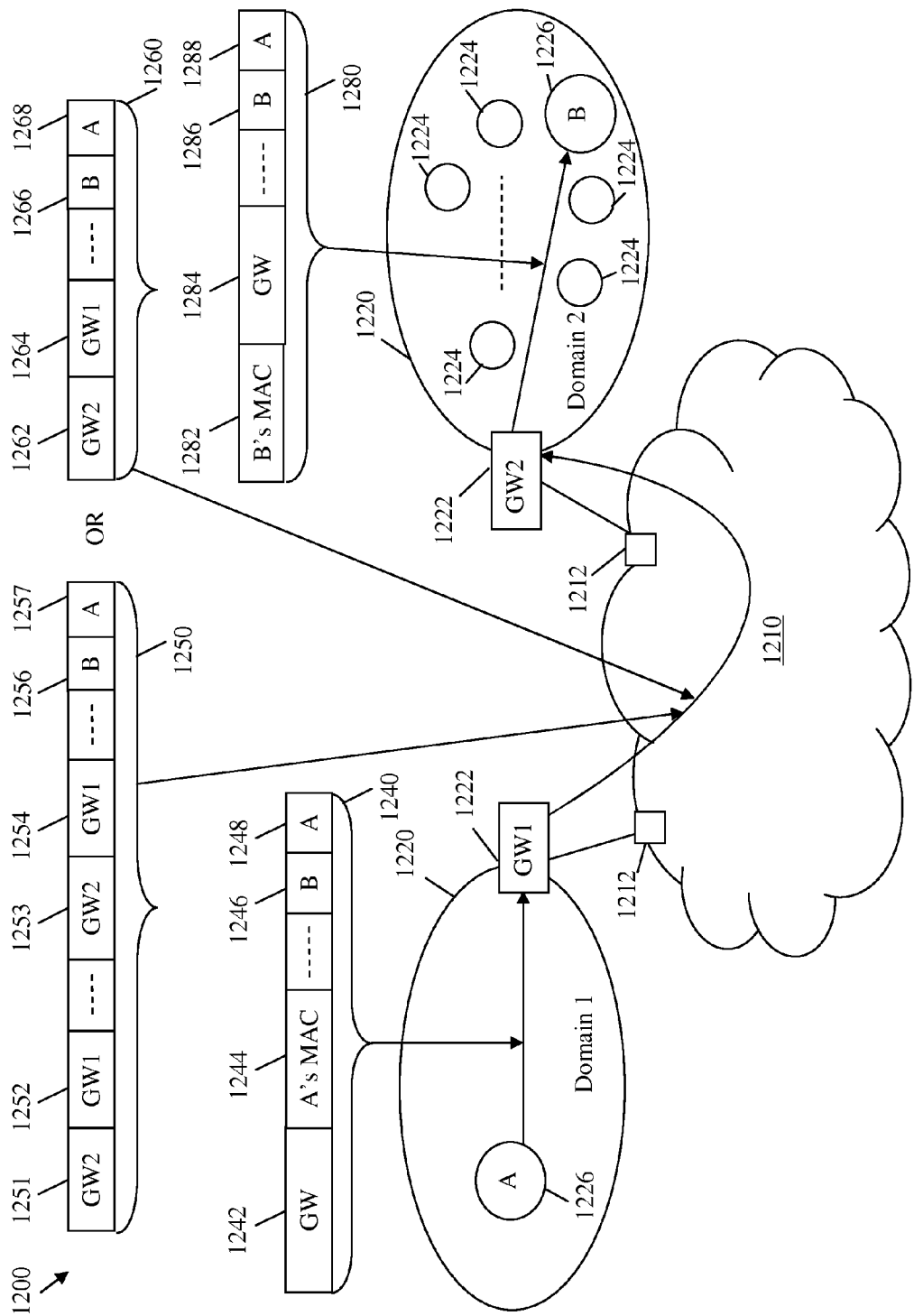
FIG. 12 is a schematic diagram of another embodiment of a data frame forwarding scheme.

FIG. 12 illustrates an embodiment of another data frame forwarding scheme 1200 that may be used to forward messages or frames between pseudo Layer 2 networks over multiple address domains. Specifically, the pseudo Layer 2 networks may be interconnected via an IP/MPLS network. The pseudo Layer 2 networks over the address domains may comprise an IP/MPLS network 1210 and a plurality of Layer 2 network domains 1220 that may be connected to the IP/MPLS network 1210 via a plurality of edge nodes 1212. The IP/MPLS network 210 may provide an IP service to support an inter domain between the address domains, e.g., the Layer 2 network domains 1220. The Layer 2 network domains 1220 may be located at one or more DC sites or locations and may comprise a plurality of L2GWs 1222 connected to corresponding edge nodes 1212, and a plurality of intermediate switches 1224 connected to corresponding L2GWs 1222. The intermediate switches 1224 may also be connected to a plurality of hosts/servers/VMs 1226. The components of the pseudo Layer 2 networks may be arranged as shown in FIG. 12 and may be similar to the corresponding components of the virtual Layer 2 network 200.

Based on the data frame forwarding scheme 1200, a first L2GW 1022 (GW1) may receive a first frame 1240, e.g., an Ethernet frame, from a first host 1226 (host A) in a first address domain (domain 1). The first frame 1240 may be intended for a second host 1226 (host B) in a second address domain (domain 2). The first frame 1240 may comprise a MAC-DA 1242 for a L2GW 1222 (GW). Host A may obtain the MAC address of GW in an ARP response from GW1 in return to an ARP request for host B. GW may correspond to GW1 in domain 1 (according to option 1) or to a second L2GW 1222 (or GW2) in domain 2 (according to option 2). The first frame 1240 may also comprise a MAC-SA 1244 for host A (A's MAC), an IP-DA 1246 for host B (B), an IP-SA 1248 for host A (A), and payload.

GW1 may receive the first frame 1240 and process the frame based one of two options. In a first option, GW1 may receive the first frame 1240 and add an IP header to obtain an inner frame 1250. The IP header may comprise an IP-DA 1251 for GW2 and an IP-SA 1252 for GW1. GW1 may also process the first frame 1240 similar to the data frame forwarding scheme 1100 to obtain in the inner frame 1250 a MAC-DA 1253 for GW2, a MAC-SA 1254 for GW1, an IP-DA 1256 for host B (B), and an IP-SA 1257 for host (A). GW1 may send the inner frame 1250 to GW2 via the IP/MPLS network 1210. GW2 may receive the inner frame 1250 and process the inner frame 1250 similar to the data frame forwarding scheme 1100 to obtain a second frame 1280 that comprises a MAC-DA 1282 for host B (B's MAC), a MAC-SA 1284 for GW1 (according to option 1) or GW2 (according to options 2), an IP-DA 1286 for host B (B), an IP-SA 1288 for host A (A), and payload. GW2 may then forward the second frame 1250 to host B.

In a second option, GW1 may receive the first frame 1240 and replace the MAC-DA 1242 for GW in the first frame 1240 with an IP-DA 1262 for GW2 in an inner frame 1260. GW1 may also replace the MAC-SA 1244 for host A (A's MAC) in the first frame 1240 with an IP-SA 1264 for GW1 in the inner frame 1260. The inner frame 1260 may also comprise an IP-DA 1266 for host B (B), an IP-SA 1268 for host A (A), and payload. GW1 may send the inner frame 1260 to GW2 via the IP/MPLS network 1210. GW2 may receive the inner frame 1260 and replace the IP-DA 1162 for GW2 in the inner frame 1260 with a MAC-DA 1282 for host B (B's MAC) in a second frame 1280. GW2 may also replace the IP-SA 1264 for GW1 in the inner frame 1260 with a MAC-SA 1284 for GW2 (according to option 1) or GW1 (according to options 2) in the second frame 1280. The second frame 1280 may also comprise an IP-DA 1286 for host B (B), an IP-SA 1288 for host A (A), and payload. GW2 may then forward the second frame 1250 to host B.

In the above pseudo Layer 2 extension or networks across multiple domains, each L2GW may be configured for IP-MAC mapping of all the hosts in each VLAN in the L2GW's corresponding address domain. Each L2GW may also send IP addresses of all the hosts in each VLAN in the corresponding address domain to other L2GWs in other address domains on a regular or periodic basis. Thus, the L2GWs in the address domains may obtain IP addresses of hosts under each VLAN for all the address domains of the pseudo Layer 2 network. The MAC addresses of the hosts in each address domain may not be sent by the local L2GW to the L2GWs of the other address domains, which may substantially reduce the size of data exchanged between the L2GWs. However, the L2GWs of different address domains may exchange among them the MAC addresses corresponding to non-IP applications, e.g., if the number of non-IP applications is relatively small. A BGP or similar method may be used to exchange the address information, including updates, between the L2GWs across the address domains.

Table 2 illustrates an example of mapping host addresses to the corresponding L2GW's MAC addresses in pseudo Layer 2 networks. A plurality of L2GW MAC addresses (e.g., GW-A MAC and GW-B MAC) may be mapped to a plurality of corresponding host addresses. Each L2GW MAC address may be mapped to a plurality of host IP (or MAC) addresses in a plurality of VLANs (e.g., VID-1, VID-2, VID-n, . . . ), which may be in the same address domain.

TABLE 2

| IP-MAC Mapping | | |
|---|---|---|
| L2GW | VLAN | Host |
| GW-A MAC | VID-1 | IP addresses of all hosts in this VLAN (IP Prefix) |
| | | MAC addresses (non-IP applications) |
| | VID-2 | IP addresses of all hosts in this VLAN (IP Prefix) |
| | | MAC addresses (non-IP applications) |
| | VID-n | IP addresses of all hosts in this VLAN (IP Prefix) |
| | | MAC addresses (non-IP applications) |
| GW-B MAC | | |

The pseudo Layer 2 extension or networks schemes above may restrict the MAC addresses of an address domain from being learned by any switches/servers/VMs in another address domain. The schemes may also provide a scalable mechanism to connect substantially large Layer 2 networks in multiple locations. In relatively large Layer 2 networks that span across multiple address domains, the schemes may limit the number of MAC addresses that may be learned by any switch in the pseudo Layer 2 networks, where each switch may only learn the MAC addresses of the local address domain of the switch. The scheme may also provide reachability discovery across multiple address domains using scalable address resolution across the address domains. Additionally, the schemes may facilitate forwarding between address domains and the broadcast for unknown addresses, and support multicast groups.

Figure 13:
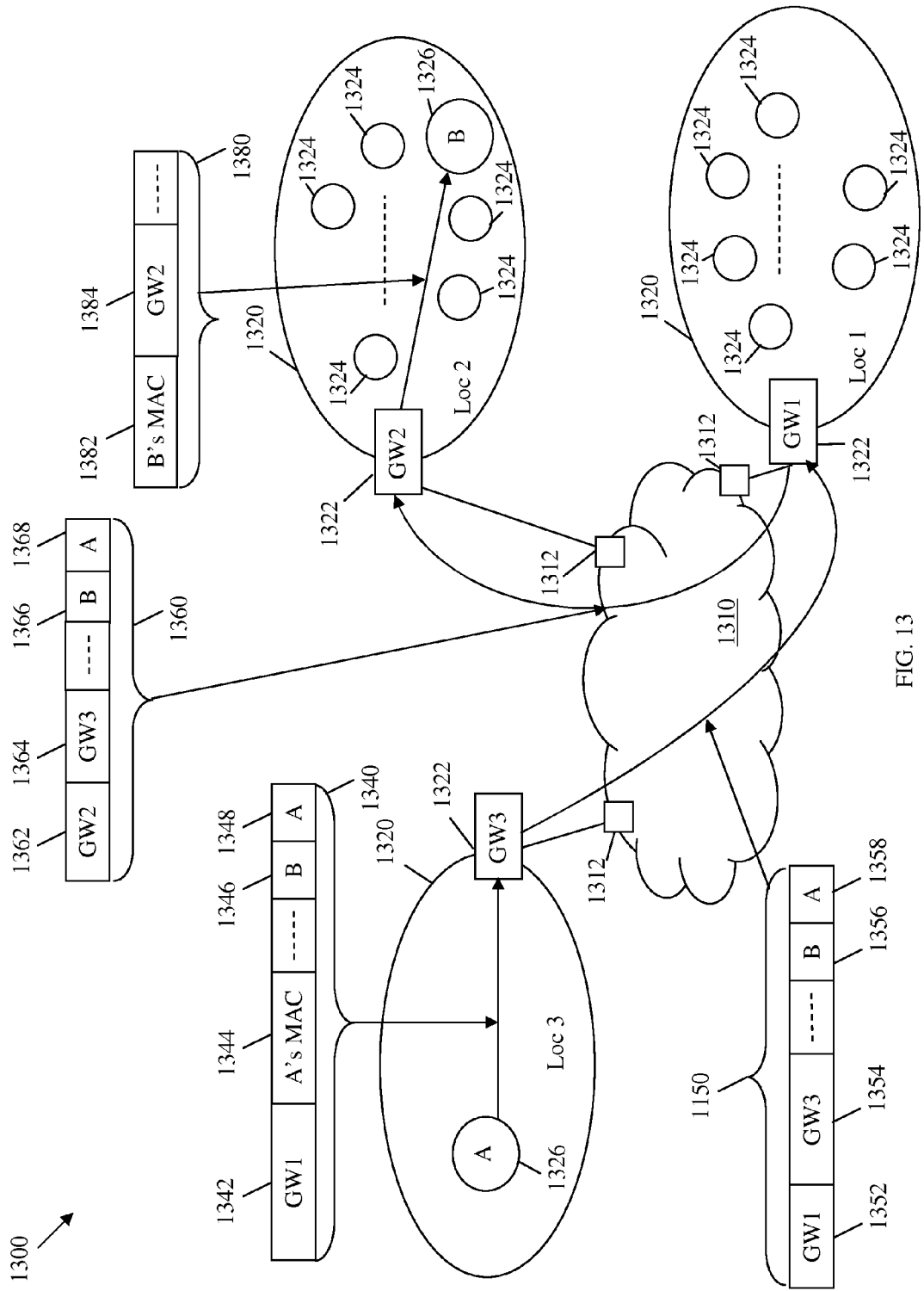
FIG. 13 is a schematic diagram of another embodiment of a data frame forwarding scheme.

FIG. 13 illustrates an embodiment of another data frame forwarding scheme 1300 that may be used to forward messages or frames between pseudo Layer 2 networks over multiple address domains and locations. The data frame forwarding scheme 1300 may be based on option 1 described above and may be used to forward frames from a host that moves from a previous location to a new location in the pseudo Layer 2 networks and maintains the same learned MAC address for a second host. The pseudo Layer 2 networks may comprise a service provider or core network 1310 and a plurality of Layer 2 network domains 1320 that may be connected to the service provider or core network 1310 via a plurality of edge nodes 1112. The Layer 2 network domains 1320 may be located at multiple DC sites or locations and may comprise a plurality of L2GWs 1322 connected to corresponding edge nodes 1312, and a plurality of intermediate switches 1324 connected to corresponding L2GWs 1322. The intermediate switches 1324 may also be connected to a plurality of hosts/servers/VMs 1326. The components of the pseudo Layer 2 networks may be arranged as shown in FIG. 13 and may be similar to the corresponding components of the virtual Layer 2 network 200.

Based on the data frame forwarding scheme 1300, GW3 may receive a first frame 1340, e.g., an Ethernet frame, from a first host 1326 (host A) after moving from Loc 1 to Loc 3. The frame 1340 may be intended for a second host 1326 (host B) in Loc 2. The first frame 1340 may comprise a MAC-DA 1342 for GW1 in Loc 1, a MAC-SA 1344 for host A (A's MAC), an IP-DA 1346 for host B (B), an IP-SA 1348 for host A (A), and payload. GW3 may process the first frame 1340 and replace the MAC-SA 1344 for host A (A's MAC) in the first frame 1340 with a MAC-SA 1354 for GW3 in a first inner frame 1350, e.g., similar to the data frame forwarding scheme 1100. The first inner frame 1350 may also comprise a MAC-DA 1352 for GW1, an IP-DA 1356 for host B (B), an IP-SA 1358 for host A (A), and payload. GW3 may send the first inner frame 1350 to Loc 1 via the service provider or core network 1310.

GW1 may receive the first inner frame 1350, look up the VID/destination IP address of host B (e.g., as indicated by IP-DA 1356 for host B), and replace the MAC-DA 1352 for GW1 in the first frame 1340 with a MAC-DA 1362 for GW2 in a second inner frame 1360. The second inner frame 1360 may also comprise a MAC-SA 1364 for GW3, an IP-DA 1366 for host B (B), an IP-SA 1368 for host A (A), and payload. GW1 may send the second inner frame 1360 to Loc 2 via the service provider or core network 1310.

GW2 may receive the second inner frame 1360 and process the second inner frame 1360 to translate the MAC addresses of the frame. GW2 may receive the second inner frame 1360, look up the VID/destination IP address of host B (e.g., as indicated by IP-DA 1366 for host B), and replace the MAC-DA 1362 for GW2 in the inner frame 1360 with a MAC-DA 1382 for host B (B's MAC) in a second frame 1380. GW2 may also replace the MAC-SA 1364 for GW3 in the second inner frame 1360 with a MAC-SA 1384 for GW2. GW2 may then send the second frame 1380 to the destination host B.

Further, host B may move from Loc 2 to another location, e.g., Loc 4 (not shown). If GW2 has learned that host B has moved from Loc 2 to Loc 4, then GW2 may send updates to its peers (other L2GWs 1322 in other locations). When a L2GW 1322 in Loc 4 (GW4) learns that host B is added to its domain, GW4 may also update its peers. As such, each L2GW 1322 may have updated address information about host B. If a L2GW 1322 has not learned that host B has moved from Loc 2 to Loc 4, then the L2GW 1322 may still send a frame intended for host B from local hosts to Loc 2. In turn, GW2 may receive and forward the frame in Loc 2, where the frame is lost since host B has moved from Loc 2. The frame may be lost temporarily until the frame is resent by the L2GW 1322 after host B announces its new location to the L2GW 1322.

Figure 14:
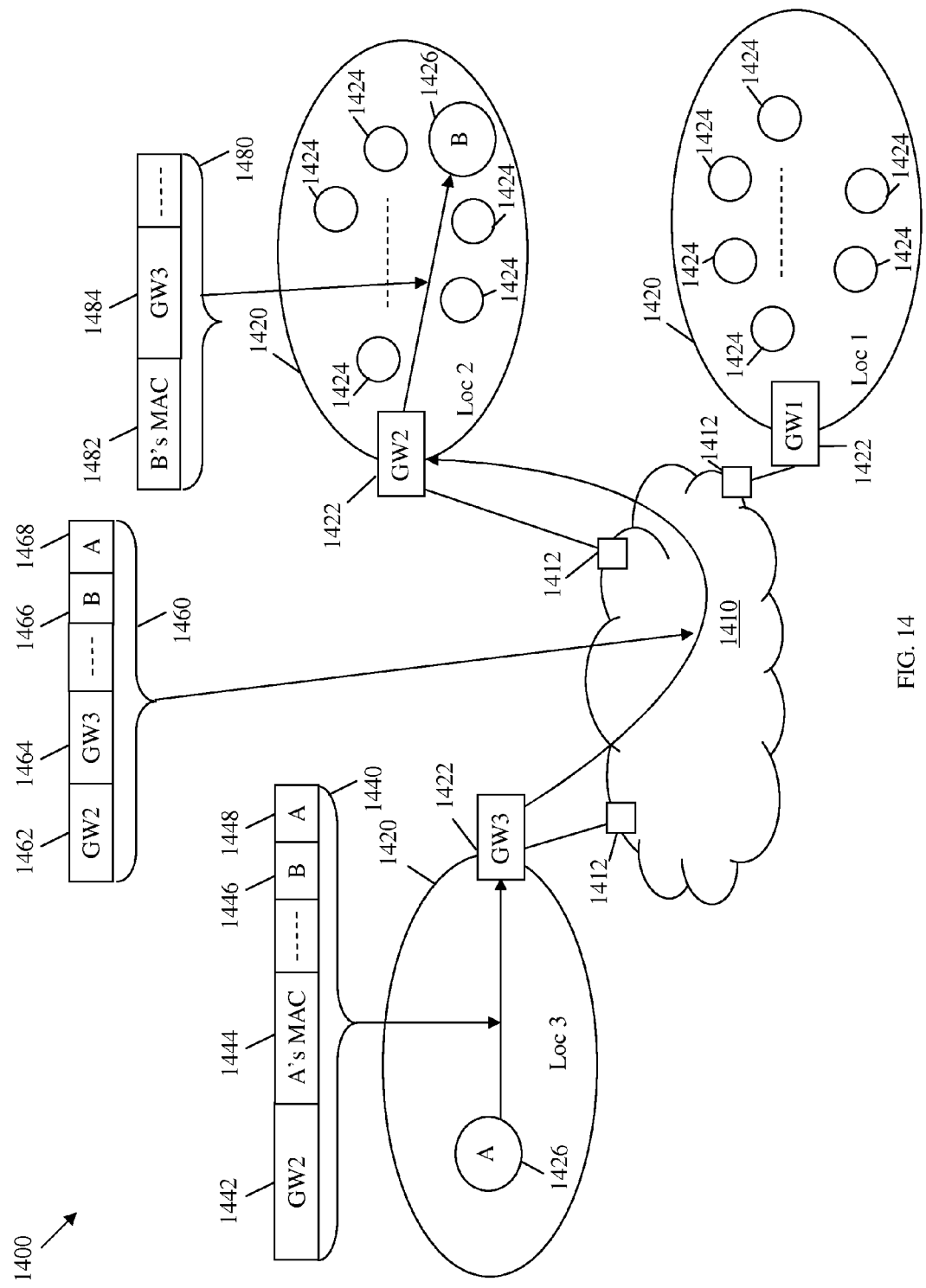
FIG. 14 is a schematic diagram of another embodiment of a data frame forwarding scheme.

FIG. 14 illustrates an embodiment of another data frame forwarding scheme 1400 that may be used to forward messages or frames between pseudo Layer 2 networks over multiple sites or domains. The data frame forwarding scheme 1400 may be based on option 2 described above and may be used to forward frames from a host that moves from a previous location to a new location in the pseudo Layer 2 networks and maintains the same learned MAC address for a second host. The pseudo Layer 2 networks may comprise a service network 1410 and a plurality of Layer 2 network domains 1420 that may be connected by the service network 1410 via a plurality of edge nodes 1412. The Layer 2 network domains 1420 may be located at multiple DC sites or locations and may comprise a plurality of L2GWs 1422 connected to corresponding edge nodes 1412, and a plurality of intermediate switches 1424 connected (directly or indirectly) to corresponding L2GWs 1422. The intermediate switches 1424 may also be connected (directly or indirectly) to a plurality of hosts/servers/VMs 1426. The components of the pseudo Layer 2 networks may be arranged as shown in FIG. 14 and may be similar to the corresponding components of the virtual Layer 2 network 200.

Based on the data frame forwarding scheme 1400, GW3 may receive a first frame 1440, e.g., an Ethernet frame, from a first host 1426 (host A) after moving from Loc 1 to Loc 3. The frame 1440 may be intended for a second host 1426 (host B) in Loc 2. The first frame 1340 may comprise a MAC-DA 1442 for GW2 in Loc 2, a MAC-SA 1444 for host A (A's MAC), an IP-DA 1446 for host B (B), an IP-SA 1448 for host A (A), and payload. GW3 may process the first frame 1440 and replace the MAC-SA 1444 for host A (A's MAC) in the first frame 1440 with a MAC-SA 1464 for GW3 in an inner frame 1460, e.g., similar to the data frame forwarding scheme 1100. The inner frame 1460 may also comprise a MAC-DA 1462 for GW2, an IP-DA 1466 for host B (B), an IP-SA 1468 for host A (A), and payload. GW3 may send the inner frame 1460 to Loc 2 via the service provider or core network 1410.

GW2 may receive the inner frame 1460 and process the inner frame 1460 to translate the MAC addresses of the frame. GW2 may receive the inner frame 1460, look up the VID/destination IP address of host B (e.g., as indicated by IP-DA 1466 for host B), and replace the MAC-DA 1462 for GW2 in the inner frame 1460 with a MAC-DA 1482 for host B (B's MAC) in a second frame 1480. The inner frame 1460 may also a MAC-SA 1484 for GW3. GW2 may then send the second frame 1480 to the destination host B.

Further, host B may move from Loc 2 to another location, e.g., Loc 4 (not shown). If GW2 has learned that host B has moved from Loc 2 to Loc 4, then GW2 may send updates to its peers (other L2GWs 1322 in other locations). When a L2GW 1322 in Loc 4 (GW4) learns that host B is added to its domain, GW4 may also update its peers. As such, each L2GW 1322 may have updated address information about host B. If a L2GW 13222 has not learned that host B has moved from Loc 2 to Loc 4, then the L2GW 1322 may still send a frame intended for host B from local hosts to Loc 2. In turn, GW2 may receive and forward the frame in Loc 2, where the frame is lost since host B has moved from Loc 2. The frame may be lost temporarily until the frame is resent by the L2GW 1322 after host B announces its new location to the L2GW 1322.

The pseudo Layer 2 extension or networks described above may support address resolution in each address domain and may use a mechanism to keep the L2GWs currently updated with IP addresses of all the hosts in their domains/locations. Address resolution and IP address updating may be implemented in one of two scenarios. The first scenario corresponds to when a host or VM is configured to send gratuitous ARP messages upon being added or after moving to a network. The second scenario corresponds to when a host or VM that is added to or has moved to a network does not send ARP announcements. The two scenarios may be handled as described in the virtual Layer 2 networks above.

The virtual Layer 2 networks and similarly the pseudo Layer 2 networks described above may support address resolution in each location/domain and a mechanism to keep each L2GW currently updated with IP addresses of its local hosts in its location/domain. In one scenario, when a host or a VM is added to the network, the host or VM may send an ARP announcement, such as a gratuitous ARP message, to its Layer 2 network or local area. In another scenario, the host or VM added to the network may not send an ARP announcement.

In the first scenario, a new VM in a Layer 2 network or location/domain may send a gratuitous ARP message to a L2GW. When the L2GW receives the gratuitous ARP message, the L2GW may update its local IPAddrTable but may not forward the gratuitous ARP message to other locations/domains or Layer 2 networks. Additionally, the L2GW may use a timer for each entry in the IPAddrTable to handle the case of shutting down or removing a host from a location/domain. If the timer of an entry is about to expire, the L2GW may send an ARP (e.g., via uni-cast) to the host of the entry. Sending the ARP as a uni-cast message instead of broadcasting the ARP may avoid flooding the local Layer 2 domain of the host and the L2GW. When a host moves from a first location to a second location, a L2GW may receive an update message from the first location and/or the second location. If the L2GW detects that the host exists in both the first location and the second location, the L2GW may send a local ARP message in the first location to verify that the host does not exist anymore in the first location. Upon determining that the host is no longer present in the first location, for example if not response to the ARP message is detected, the L2GW may update its local IPAddrTable accordingly. If the L2GW receives a response for the ARP message for its own location, then a MAC multi-homing mechanism of BGP may be used.

In the second scenario, the new host in a location may not send an ARP announcement. In this case, when an application (e.g., at a host) needs to resolve the MAC address for an IP host, the application may send out an ARP request that may be broadcasted in the location. The ARP request may be intercepted by a L2GW (or a Top-of-Rack (ToR) switch), e.g., by implementing a proxy ARP function. In a relatively large DC, the L2GW may not be able to process all the ARP requests. Instead, a plurality of L2GW delegates (e.g., ToR switches) may intercept the ARP announcements. The L2GW may push down the IP addresses (e.g., a summary of IP addresses) that are learned from other locations to its corresponding delegates (ToR switches). The delegates may then intercept the ARP requests from hosts or local servers. If an IP address in the ARP request from a host or server is present in the IPAddrTable of the L2GW, the L2GW may return an ARP response with the L2GW's MAC address to the host or server, without forwarding the broadcasted ARP request any further. For non-IP applications, e.g., applications that run directly over Ethernet without IP, the applications may use MAC addresses as DAs when sending data. The non-IP applications may not send an ARP message prior to sending the data frames. The data frames may be forwarded using unknown flooding or Multiple MAC registration Protocol (MMRP).

In one scenario, an application (e.g., on a host) may send a gratuitous ARP message upon joining one of the interconnected Layer 2 networks in one location to obtain a MAC address for a targeted IP address. When the L2GW or its delegate (e.g., ToR switch) may receive the ARP request and check its IP host table. If the IP address is found in the table, the L2GW may send an ARP reply to the application. The L2GW may send its MAC address in the reply if the targeted IP address corresponds to an IP host in another location. If the IP address is not found, no reply may be sent from the L2GW, which may maintain the current or last updated IP addresses of the hosts in all locations. In relatively large DCs, multiple L2GWs may be used, e.g., in the same location, where each L2GW may handle a subset of VLANs. As such, each L2GW may need to maintain a subset of IP addresses that comprise the IP addresses of the hosts in the corresponding VLAN.

In the case of substantially large DCs, e.g., that comprise tens of thousands of VMs, it may be difficult for a single node to handle all the ARP requests and/or gratuitous ARP messages. In this case, several schemes may be considered. For instance, a plurality of nodes or L2GWs may be used to handle different subsets of VLANs within a DC, as described above. Additionally or alternatively, multiple delegates may be assigned for a L2GW in each location. For instance, a plurality of ToR switches or access switches may be used. Each L2GW's delegate may be responsible for intercepting gratuitous ARP messages on its corresponding downlinks or in the form of a Port Binding Protocol. The delegates may send a consolidated address list (AddressList) to their L2GWs. The L2GW may also push down its learned IP address lists from other locations to its delegates. If there are multiple L2GWs in a location that are responsible for different subsets of VLANS, the delegates may need to send a plurality of consolidated messages that comprise each the AddressLists in the VLANs associated with the corresponding L2GWs.

In comparison to Cisco's OTV scheme, using the virtual Layer 2 network described above may substantially reduce the size of forwarding tables on intermediate switches in each location. The switches in one location may not need to learn MAC addresses of IP hosts in other locations, e.g., assuming that the majority of hosts run IP applications. This scheme may also substantially reduce the size of the address information exchanged among the L2GWs. For example, a subnet that may comprise thousands of VMs may be mapped to a L2GW MAC address. The hierarchical Layer 2 scheme of the virtual Layer 2 network may use 802.1ah standard, which may be supported by commercial Ethernet chip sets, while Cisco's scheme uses proprietary IP encapsulation. Both schemes may use peer location gateway device (L2GW) address as outer destination address. The hierarchical Layer 2 scheme may also use address translation, which may be supported by current IP gateways. However, the hierarchical Layer 2 scheme may use MAC address translation instead of IP address translation. The MAC address translation may need carrier grade NAT implementation that can perform address translation for tens of thousands of addresses.

In an embodiment, a VLAN may span across multiple locations. Thus, a multicast group may also span across multiple locations. Specifically, the multicast group may span across a subset of locations in the virtual Layer 2 network. For example, if there are about ten locations in the virtual Layer 2 network, the multicast group may only span across three of the ten locations. A multicast group within one service instance may be configured by a network administrator system (NMS) or may be automatically established in Layer 2 using MMRP. Since L2GW supports 802.1ah, the L2GW may have a built-in component to map client multicast groups to proper multicast groups in the core network. In a worst case scenario, the L2GW may replicate the multicast data frames to all the locations of the service instance. For example, according to Microsoft research data, about one out of four traffic may go to a different location. Thus, the replication by L2GW may be simpler than implementing a complicated mechanism in the Provider core.

The virtual Layer 2 network may support broadcast traffic, such as for ARP requests and/or Dynamic Host Configuration Protocol (DHCP) requests. The broadcast traffic may be supported by creating multiple ARP delegates, such as ToR switches, in each location. The broadcast traffic may also be supported by adding a new component to the Port Binding Protocol for the delegates to maintain current updates of all the IP hosts from the servers. Additionally, the L2GW may push down on a periodic or regular basis all the learned host IP addresses from other locations.

In some instances, the L2GW may receive unknown DAs. The L2GW may keep current updates of all the hosts (or applications) in its location and periodically or regularly push its address information to all the peers (other L2GWs in other locations). If the L2GW receives a frame comprising an unknown DA, the L2GW may broadcast the frame to the other locations. To avoid attacks on the network, a limit may be imposed on the maximum number of times the L2GW may forward or broadcast a received unknown DA. The L2GW may be configured to learn the addresses of the intermediate switches in another location to avoid mistaking an intermediate switch address for an unknown address before sending the address to the other location. Although there may be tens of thousands of VMs in each DC location, the number of switches in each DC may be limited, such as the number of ToR or access switches, end of row or aggregation switches, and/or core switches. The L2GW may learn the MAC addresses of all the intermediate switches in a location ahead of time, e.g., via a Bridge Protocol Data Unit (BPDU) from each switch. Messages may not be sent directly to the intermediate switches, except for management system or Operations, Administration, and Maintenance (OAM) messages. An intermediate switch that expects or is configured to receive NMS/OAM messages may allow other switches in the location to learn its MAC address by sending an autonomous message to NMS or a MMRP announcement.

In some embodiments, the L2GWs may use BGP, e.g., instead of IS-IS, for exchanging address information. A plurality of options may be used for controlling Layer 2 (L2) communications. For instance, forwarding options may include Layer 2 only forwarding with MAC and MAC, Layer 2 forwarding over MPLS, and Layer 2 forwarding in Layer 3 network. Options of Layer 2 control plane may include Layer 2 IS-IS mesh control, Layer 2.5 MPLS static control, Label Distribution Protocol (LDP), Resource Reservation Protocol (RSVP)-Traffic Engineering (TE) using Interior Gateway Protocol (IGP) Constraint-based Shortest Path First (CSFP), and BGP discovery. Some VLAN mapping issues may also be considered, such as the VLAN-MAC mapping required for uniqueness and whether Network Bridged VLANs (e.g., VLANs-4K) may be too small for a DC. Table 3 illustrates a plurality of control plane options that may be used for Layer 2 control plane. The options may be based on IEEE 802.1ah, IEEE 802.1q, and IEEE 802.1aq, all of which are incorporated herein by reference. Table 4 illustrates some of the advantages and disadvantages (pros and cons) of the control plane options in Table 2.

TABLE 3

Layer 2 Control Lane Options

| Transport | L2 control plane | MPLS control plane | IGP-OSPF/IS-IS | BGP |
|---|---|---|---|---|
| L2 Provider Backbone Bridge (PBB) | 802.1q 802.1ah | Not applicable | Pass IP-MAC mapping | Internal BGP (IBGP) mesh External BGP (EBGP) mesh |
| VPLS (MPLS) | MAC learning interaction with L2 | LDP for domain RSVP-TE MPLS static | IGP for CSPF | BGP auto-discovery of end points VPLS ARP Mediation |
| L2 over IP | L2 only with DC (802.1aq) | Not applicable | Peer validation Peer connectivity Pass IP-MAC mapping Explicit multithreading (XMT) | Peer validation Peer path connectivity IP-Mapping distribution |

TABLE 4

Control plane options

| Transport | L2 control plane | MPLS control plane | IGP-Open Shortest Path First (OSPF)/IS-IS | BGP |
|---|---|---|---|---|
| L2 PBB | No Layer 3 configuration | VPLS is done | Pros: IS-IS pass MAC address Multithread (MT)-VPN | Pros: BGP policy BGP auto-discovery used for the L2 PBB to VPLS mapping |

TABLE 4-continued

Control plane options

| Transport | L2 control plane | MPLS control plane | IGP-Open Shortest Path First (OSPF)/IS-IS | BGP |
|---|---|---|---|---|
| VPLS (MPLS) | MAC learning interaction with L2 | Pros: Done Cons: Code overhead, multicast not efficient | ->VLAN Cons: efficiency for IP mapping Pros: CSPF for IS-IS/OSPF Fast peer convergence MT topology Cons: not efficient with A) large number of peers B) large number of IP-MAC mappings | BGP efficient for large number of peers and I-MAC mappings Multiple VLANs Pros: Same as above Cons: BGP inter-domain MPLS interaction with MPLS Layer 3 (L3) VPN |
| L2 over IP | Limited to only DC | Not applicable | Peer validation Peer connectivity IP to MAC mapping XMT | Peer validation Peer path connectivity IP-Mapping distribution |

There may be a plurality of differences between Cisco's OTV and the BGP that may be supported in the virtual Layer 2 network. For instance, OTV basic aspects may include OTV multicast groups, OTV IS-IS usage, which may require MT-IS-IS, and OTV forwarding. Additionally, BGP may support BGP-MAC mapping and IP overlay, such as for DC multicast group. BGP-MAC mapping may also use MT-BGP. Further, IBGP may be supported by MT-IS-IS and using IS-IS for peer topology (e.g., Label Switched Path Verification (LSVP)).

In the virtual Layer 2 network above, the number of applications within one Layer 2 network (or DC) may increase substantially, e.g., over time. Thus, a mechanism may be needed to avoid issues associated with substantially large Layer 2 networks. These issues may include unpredictable behavior of servers/hosts and their applications. For example, the servers/hosts may correspond to different vendors, where some may be configured to send ARP messages and others may be configured to broadcast messages. Further, typical lower cost Layer 2 switches may not have sophisticated features to block broadcast data frames of have policy implemented to limit flooding and broadcast. Hosts or applications may also age out MAC addresses to target IP mapping frequently, e.g., in about minutes. A host may also frequently send out gratuitous ARP messages, such as when the host performs a switch over (from active to standby) or when the host has a software glitch. In some cases, the Layer 2 network components are divided into smaller subgroups to confine broadcast into a smaller number of nodes.

Figure 15:
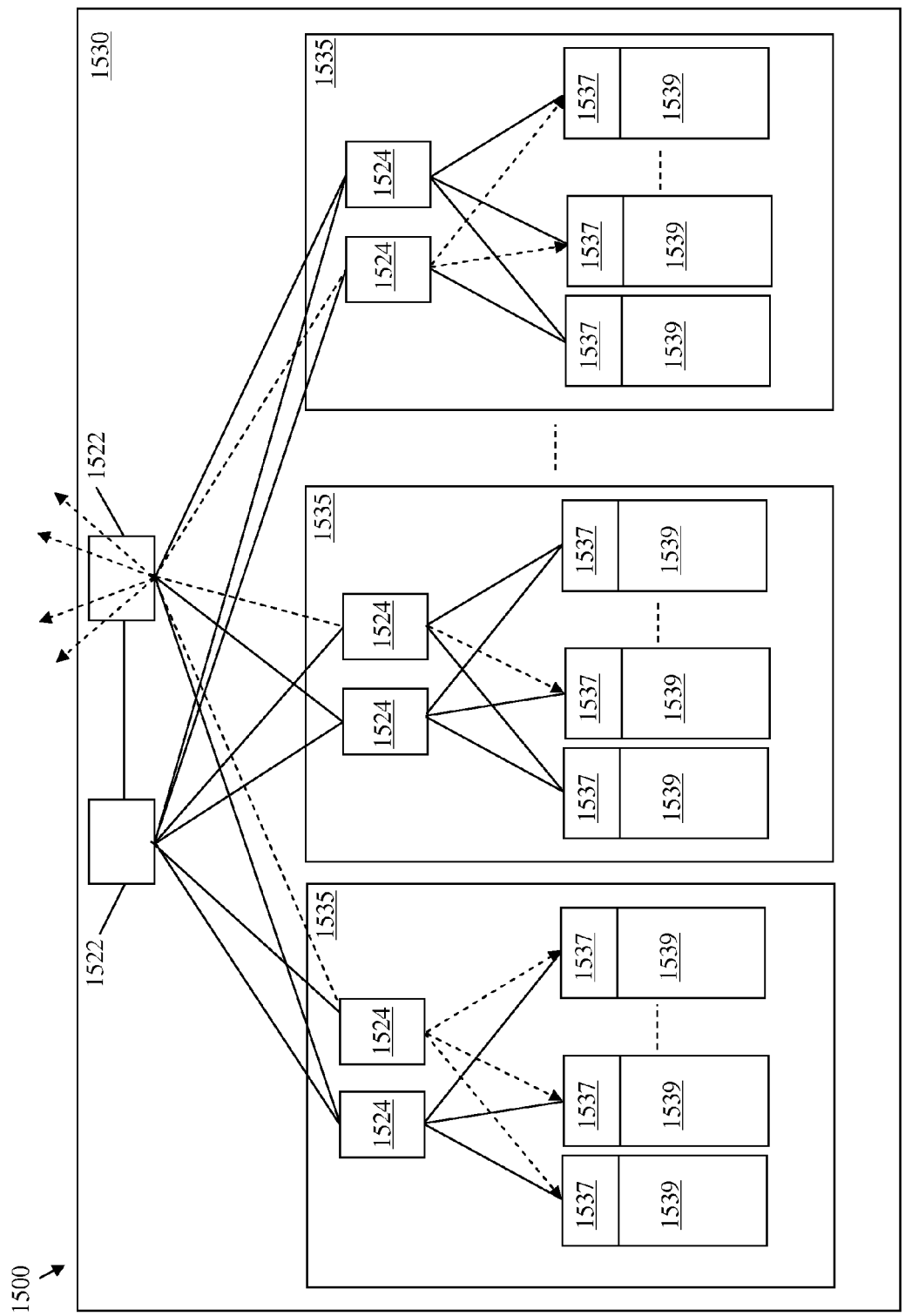
FIG. 15 is a schematic diagram of an embodiment of a broadcast scheme.

FIG. 15 illustrates an embodiment of a typical broadcast scheme 1500 that may be used in a Layer 2 network/domain, e.g., a VLAN, which may be part of the virtual Layer 2 networks or the pseudo Layer 2 networks above. The Layer 2 network/domain or VLAN may comprise a plurality of access switches (ASs) 1522 located in a Pod 1530, e.g., in a DC. The VLAN may also comprise a plurality of closed user groups (CUGs) 1535 connected to the ASs 1522. Each CUG 1535 may comprise a plurality of End-of-Row (EoR) switches 1524 connected to the ASs 1522, a plurality of ToR switches 1537 connected to the EoR switches 1524, and a plurality of servers/VMs 1539 connected to the ToR switches 1537. The ASs 1522 may be connected to a plurality of Pods (not shown) in other DCs that may correspond to other Layer 2 networks/ domains of the virtual Layer 2 networks or the pseudo Layer 2 networks. The components of the Layer 2 network/domain or the Pod 1530 may be arranged as shown in FIG. 15.

The typical broadcast scheme 1500 may suffer from broadcast scalability issues. For instance, frames with unknown DAs may be flooded within the Pod 1530 to all the end systems in the VLAN. For example, the frames with unknown DAs may be flooded to all or plurality of servers/VMs 1539 in the ASs 1522 in the CUGs 1535, as indicated by the dashed arrows in FIG. 15. The frames with unknown addresses may also be flooded in the opposite direction, via an AS 1522, to a plurality of other Pods (in other DCs) in the core, which may be associated with the same service as the Pod 1530. The frames may be further flooded to a plurality of VMs in the other Pods, which may reach thousands of VMs. Such broadcast scheme for unknown DAs may not be efficient in relatively large networks, e.g., that comprise many DCs.

Figure 16:
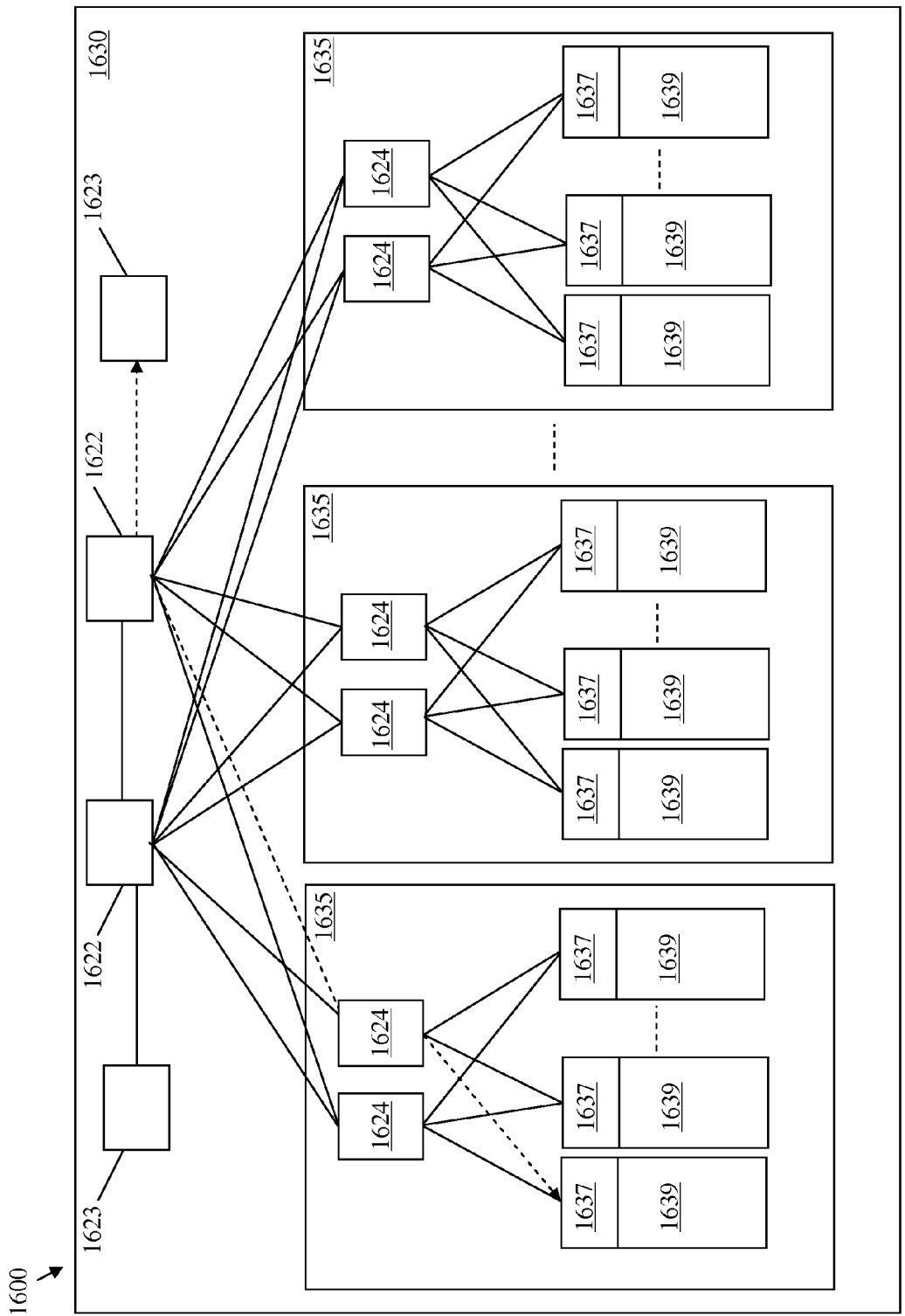
FIG. 16 is a schematic diagram of another embodiment of a broadcast scheme.

FIG. 16 illustrates an embodiment of another broadcast scheme 1600 that may be used in a Layer 2 network/domain, e.g., a VLAN, which may be part of the virtual Layer 2 networks or the pseudo Layer 2 networks above. The broadcast scheme 1600 may be more controlled and thus more scalable and efficient than the broadcast scheme 1500. The Layer 2 network/domain or VLAN may comprise a plurality of ASs 1622 located in a Pod 1630, e.g., in a DC. The VLAN may also comprise a plurality of CUGs 1635 connected to the ASs 1622. Each CUG 1635 may comprise a plurality of EoR switches 1624 connected to the ASs 1622, a plurality of ToR switches 1637 connected to the EoR switches 1624, and a plurality of servers/VMs 1639 connected to the ToR switches 1637. The ASs 1622 may be connected to a plurality of Pods (not shown) in other DCs that may correspond to other Layer 2 networks/domains of the virtual Layer 2 networks or the pseudo Layer 2 networks. The components of the Layer 2 network/domain or the Pod 1630 may be arranged as shown in FIG. 16.

To control or limit the broadcast scope of the broadcast scheme 1600, frames with unknown DAs may only be flooded within the Pod 1530 to a single root, for instance to one server/VM 1639 that may be designated as a broadcast server or to an AS 1622. The frames may be flooded to the root using a rooted-multipoint (RMP) VLAN configuration, e.g., a push VLAN tag for RMP VLAN that is rooted at a broadcast server. However, the flooded frame may not be forwarded to all the other servers, e.g., that are not broadcast servers, which may save link resources and server processing of extraneous frames. Additionally, the forwarded frames may not be forwarded to the core, e.g., to other Pods or DCs.

In some embodiments, the broadcast server may hosts a proxy ARP server, a DHCP server, and/or other specific function servers, e.g., for improving efficiency, scalability, and/or security. For instance, the broadcast server may be configured to provide security in DCs that only allow selected broadcast services. If no known service is selected, data frames with unknown DAs may be flooded from the broadcasts server on a first or original VLAN. The broadcast scheme 1600 may be used to handle cases where customer applications are allowed to use Layer 2 broadcast. A data rate limiter may also be used to protect against broadcast storms, e.g., avoid substantial broadcast traffic.

As described above, when introducing server virtualization in DCs, the number of hosts in a DC may increase substantially, e.g., over time. Using server virtualization, each physical server, which may originally host an end-station, may become capable of hosting hundreds of end-stations or VMs. The VMs may be added, deleted, and/or moved flexibly between servers, which may improve performance and utilization of the servers. This capability may be used as a building block for cloud computing services, e.g., to offer client controlled virtual subnets and virtual hosts. The client control virtual subnets offered by cloud computing services may allow clients to define their own subnets with corresponding IP addresses and policies.

The rapid growth of virtual hosts may substantially impact networks and servers. For instance, one resulting issue may be handling frequent ARP requests, such as ARP IP version 4 (IPv4) requests, or neighbor discovery (ND) requests, such as ND IP version 6 (IPv6) requests from hosts. The hosts in a DC may send out such requests frequently due caches or entries that may age in about few minutes. In the case of tens of thousands of hosts in a DC, which may have different MAC addresses, the amount of ARP or ND messages or requests per second may reach more than about 1,000 to 10,000 requests per second. This rate or frequency of requests may impose substantial computational burden on the hosts. Another issue associated with a substantially large number of virtual hosts in a DC may be existing duplicated IP addresses within one VLAN, which may affect the ARP or ND scheme from working properly. Some load balancing techniques may also require multiple hosts which serve the same application to use the same IP address but with different MAC addresses. Some cloud computing services may allow users to use their own subnets with IP addresses and self defined policies among the subnets. As such, it may not be possible to designate a VLAN per each client since the maximum number of available VLANS may be about 4095 in some systems while there may be hundreds of thousands of client subnets. In this scenario, there may be duplicated IP addresses in different client subnets that end up in one VLAN.

In an embodiment, a scalable address resolution mechanism that may be used in substantially large Layer 2 networks, which may comprise a single VLAN that includes a substantial number of hosts, such as VMs and/or end-stations. Additionally, a mechanism is described for proper address resolution in a VLAN with duplicated IP addresses. The mechanism may be used for both ARP IPv4 addresses and ND IPv6 addresses.

Figure 17:
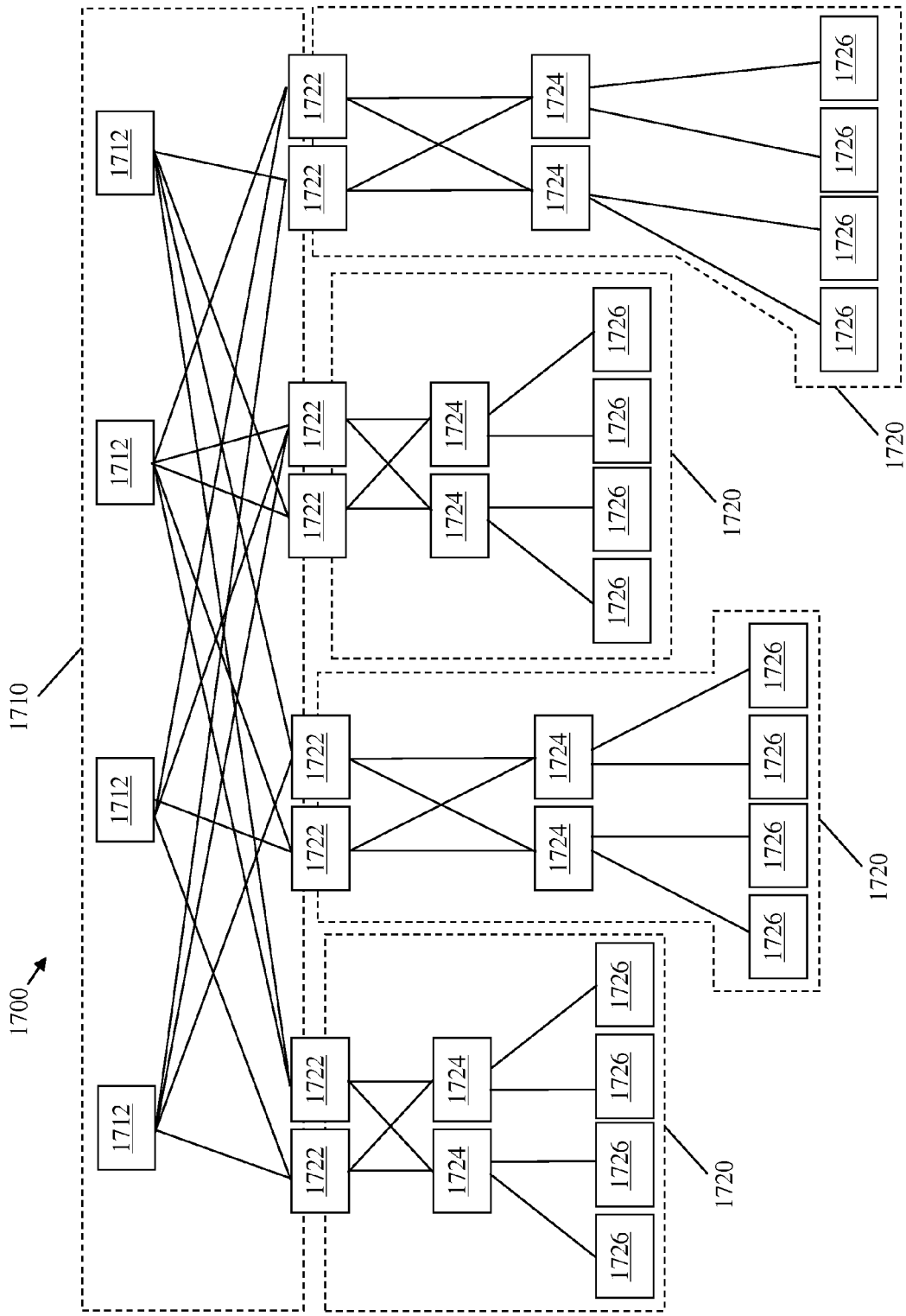
FIG. 17 is a schematic diagram of an embodiment of interconnected network districts.

FIG. 17 illustrates an embodiment of interconnected network districts 1700 in a bridged Layer 2 network, e.g., an Ethernet. The bridged Layer 2 network may comprise a plurality of core bridges 1712 in a core district 1710, which may be connected to a plurality of districts 1720. The Layer 2 bridged network may also comprise a plurality of DBBs 1722 that may be part of the core district 1710 and the districts 1720, and thus may interconnect the core district 1710 and the districts 1720. Each district 1720 may also comprise a plurality of intermediate switches 1724 connected to corresponding DBBs 1722, and a plurality of end-stations 1726, e.g., servers/VMs, connected to corresponding intermediate switches 1724. The components of the interconnected network districts 1700 may be arranged as shown in FIG. 17.

Figure 18:
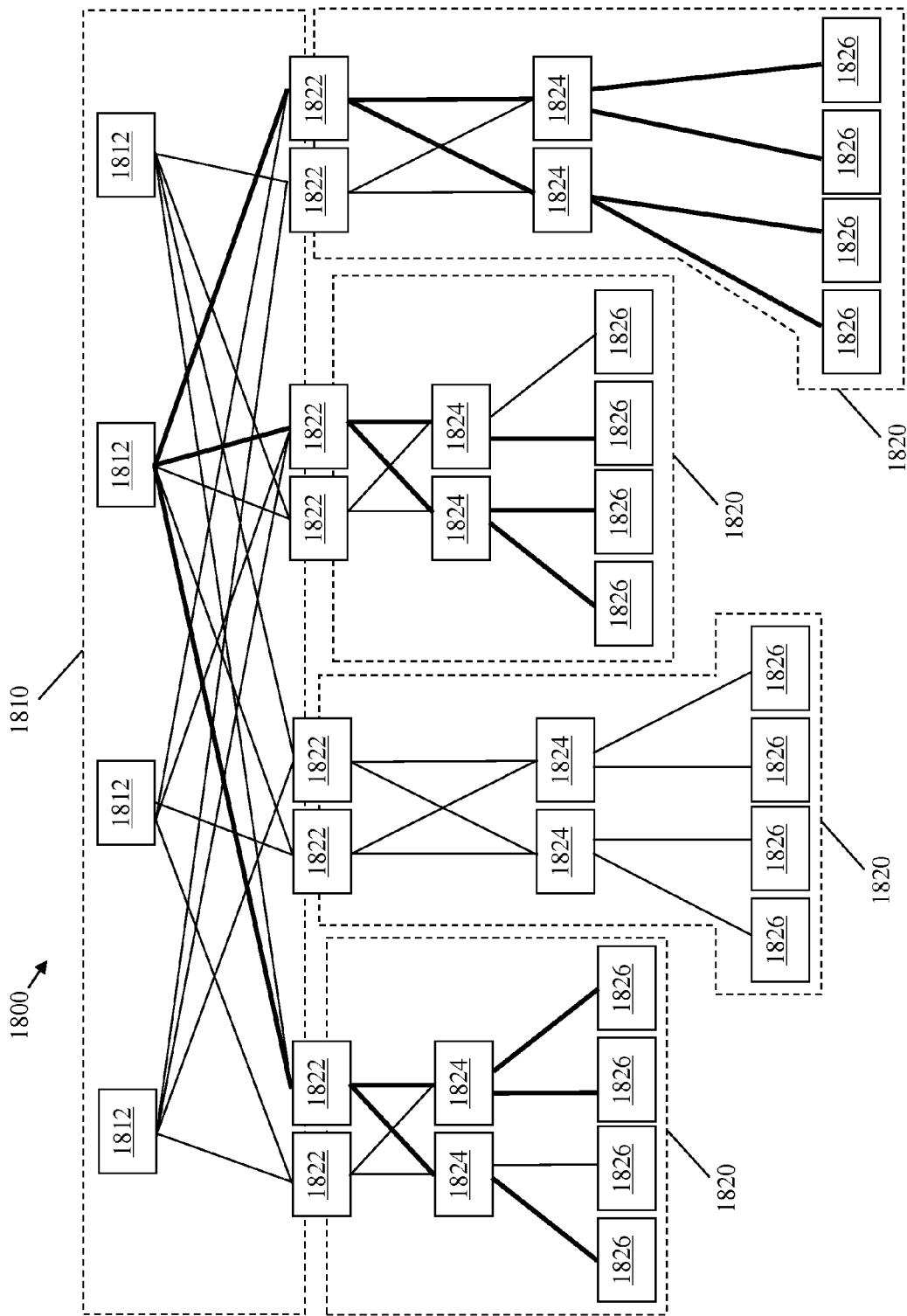
FIG. 18 is a schematic diagram of another embodiment of interconnected network districts.

FIG. 18 illustrates another embodiment of interconnected network districts 1800 that may be configured similar to the interconnected network districts 1700. The interconnected network districts 1800 may comprise a plurality of core bridges 1812 and a plurality of DBBs 1822 (e.g., ToR switches) or district boundary switches in a core district 1810. The interconnected network districts 1800 may also comprise a plurality of intermediate switches 1824 and a plurality of end-stations 1826, e.g., servers/VMs, in a plurality of districts 1820. The districts 1820 may also comprise the DBBs 1822 that connected the districts 1820 to the core district 1810. The components of the interconnected network districts 1800 may be arranged as shown in FIG. 18. A VLAN may be established in the interconnected network districts 1800, as indicated by the bold solid lines in FIG. 18. The VLAN may be associated with a VID and may be established between one of the core bridges 1812 in the core bridge 1810, a subset of the DBBs 1822 in the districts 1820, and a subset of intermediate switches 1824 and servers/VMs 1826 in the districts 1820.

The DBBs 1822 in districts 1820 may be aware and maintain a <MAC,VID> pair for each end-station 1826 in the districts 1820. This address information may be communicated by the end-stations 1826 to the corresponding DBBs 1822 in the corresponding districts 1820 via Edge Virtual Bridging (EVB) Virtual Station Interface (VSI) Discovery and Configuration Protocol (VDP). The DBB 1822 may also register this information with the other DBBs 1822, e.g., via MMRP. Alternatively, the address information may be communicated by the end-stations 1826 to their DBBs 1822 using gratuitous ARP messages or by sending configuration messages from a NMS.

In an embodiment, a scalable address resolution mechanism may be implemented to support a VLAN that comprise a relatively large number of hosts in the interconnected network districts 1800. Specifically, the MAC address of a DBB 1822 in one district 1820 and the VID of the VLAN may be used as a response to an ARP request for the district's host addresses from other districts 1820. In some cases, a DS may be configured to obtain summarized address information for the end-stations 1826 in a district 1820 when the DS may not be capable of handling a relatively large number of messages for individual end-stations 1826 or hosts. In such cases, the DBB 1822 in a district 1820 may terminate all gratuitous ARP messages for the districts hosts or snoop all the gratuitous ARP messages sent from its district 1920, and send out instead a gratuitous group announcement, e.g., that summarizes the hosts address information for the DS. The DBB may send its own gratuitous ARP announcement to announce all the host IP addresses in its district 1820 to other districts 1820.

Further, the DBB 1822 in a district 1820 may serve as an ARP proxy by sending its own MAC address to other districts 1820, e.g., via a core bridge 1812 in the core district 1810. The core bridges 1812 may only be aware of the MAC addresses of the DBBs 1822 in the districts 1820 but not the MAC addresses of the intermediate switches 1824 and end-stations 1826 or hosts, which makes this scheme more scalable. For instance, when a first end-station 1826 in a first district 1820 sends an ARP request for the address of a second end-station 1826 in a second district 1820, the MAC address of a DBB 1822 of the second district 1820 may be returned in response to the first end-station 1826.

Figure 19:
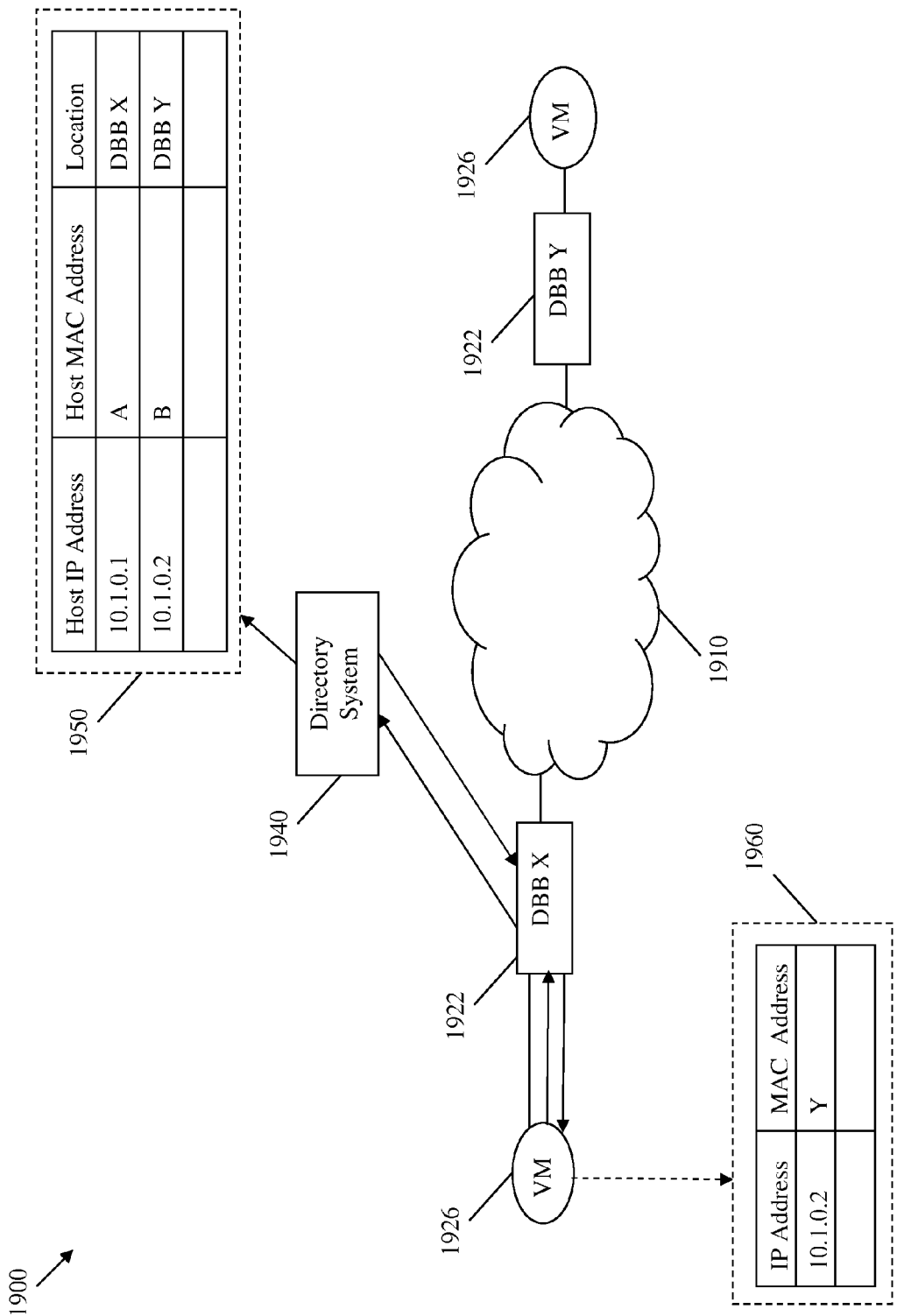
FIG. 19 is a schematic diagram of an embodiment of an Address Resolution Protocol (ARP) proxy scheme.

FIG. 19 illustrates an embodiment of ARP proxy scheme 1900 that may be used in a Layer 2 bridged network, e.g., for the interconnected network districts 1800. The Layer 2 bridged network may comprise a core district 1910, a plurality of DBBs 1922 or district boundary switches connected to the core district 1910, and a plurality of end-stations 1926 (e.g., VMs) connected to corresponding DBBs 1922 in their districts. The Layer 2 bridged network may also comprise a DS 1940 that may be connected to the DBBs 1922, e.g., via the core district 1910. The DBBs 1922 and end-stations 1926 may belong to a VLAN established in the Layer 2 bridged network and associated with a VID. The components of the Layer 2 bridged network may be arranged as shown in FIG. 19.

Based on the ARP proxy scheme 1900, a first DBB 1922 (DBB X) may intercept an ARP request from a first end-station 1926 in its local district. The ARP request may be for a MAC address for a second end-station 1926 in another district. The ARP request may comprise the IP DA (10.1.0.2) of the second end-station 1926, and the IP source address (SA) (10.1.0.1) and MAC SA (A) of the first end-station 1926. The first end-station 1926 may maintain the IP addresses of the other end-stations 1922 in a VM ARP table 1960. DBB X may send a DS query to obtain a MAC address for the second end-station 1926 from the DS 1940. The DS query may comprise the IP address (10.1.0.2) of the second end-station 1926, and the IP SA (10.1.0.1) and MAC SA (A) of the first end-station 1926. The DS 1940 may maintain the IP addresses, MAC addresses, and information about the associated DBBs 1922 or locations of the end-stations 1926 (hosts) in a DS address table 1950.

The DS 1940 may then return to DBB X a DS response that comprises the IP address (10.1.0.2) of the second end-station 1926 and the MAC address (Y) of a second DBB 1926 (DBB Y) associated with the second end-station 1926 in the other district, as indicated in the DS address table 1950. In turn, DBB X may send an ARP response to the first end-station 1926 that comprises the IP DA (10.1.0.1) and MAC DA (A) of the first end-station 1926, the IP SA (10.1.0.2) of the second end-station 1926, and the MAC address of DBB Y (Y). The first end-station 1926 may then associate the MAC address of DBB Y (Y) with the IP address (10.1.0.2) of the second end-station 1926 in the VM ARP table 1960. The first end-station 1926 may use the MAC address of DBB Y as the DA to forward frames that are intended for the second end-station 1926.

In the ARP proxy scheme 1900, the DBBs 1922 may only need to maintain the MAC addresses of the other DBBs 1922 in the districts without the MAC and IP addresses of the hosts in the districts. Since the DAs in the data frames sent to the DBBs 1922 only correspond to DBBs MAC addresses, as described above, the DBBs 1922 may not need to be aware of the other addresses, which makes this scheme more scalable.

Figure 20:
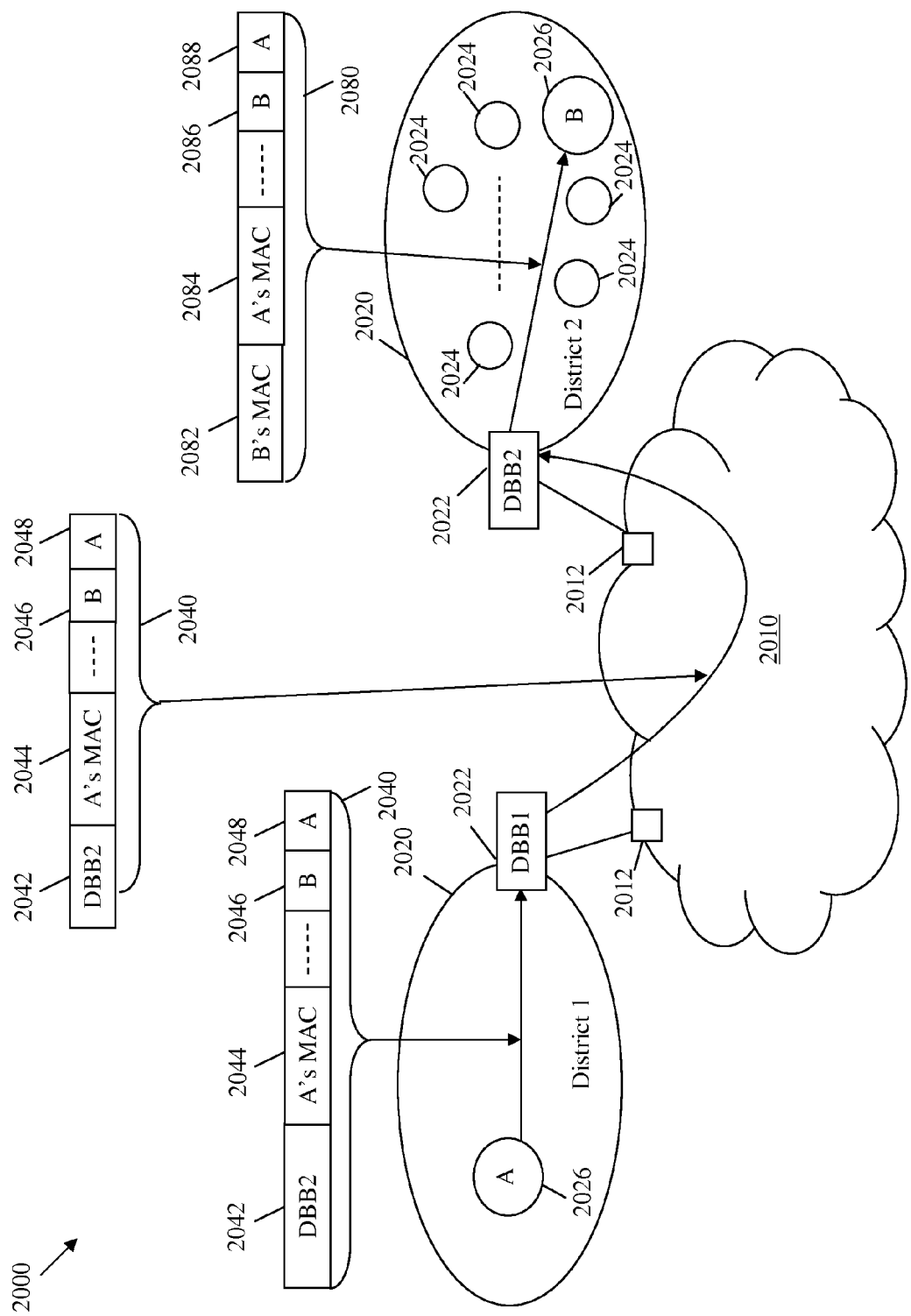
FIG. 20 is a schematic diagram of another embodiment of a data frame forwarding scheme.

FIG. 20 illustrates an embodiment of a data frame forwarding scheme 2000 that may be used in a Layer 2 bridged network, e.g., for the interconnected network districts 1800. The Layer 2 bridged network may comprise a core district 2010, a plurality of DBBs 2022 or district boundary switches in a plurality of districts 2020 connected to the core district 2010, and a plurality of intermediate switches 2024 and end-stations 2026 (e.g., VMs) connected to corresponding DBBs 2022 in their districts 2020. Some of the DBBs 2022, intermediate switches 2024, and end-stations 2026 across the districts 2020 may belong to a VLAN established in the Layer 2 bridged network and associated with a VID. The components of the Layer 2 bridged network may be arranged as shown in FIG. 20.

The data frame forwarding scheme 2000 may be based on MAT at the DBBs 2022, which may be similar to IP NAT. The MAT may comprise using inner IP DAs and ARP tables to find corresponding MAC DAs. For instance, a first DBB 2022 (DBB1) may receive a frame 2040, e.g., an Ethernet frame, from a first end-station 2026 (host A) in a first district (district 1). The frame 2040 may be intended for a second end-station 2026 (host B) in a second district (district 2). The frame 2040 may comprise a MAC-DA 2042 for a second DBB in district 2 (DBB2), a MAC-SA 2044 for host A (A's MAC), an IP-DA 2046 for host B (B), an IP-SA 2048 for host A (A), and payload. DBB1 may forward the frame 2040 to district 2 via the core district 2010. A second DBB 2022 (DBB2) in district 2 may receive the frame 2040 and replace the MAC-DA 2042 for DBB2 (DBB2) in the frame 2040 with a MAC-DA 2082 for host B (B's MAC) in a second frame 2080. DBB2 may determine B's MAC based on the IP-DA 2046 for host B (B) and a corresponding entry in its ARP table. The second frame may also comprise a MAC-SA 2084 for host A (A's MAC), an IP-DA 2086 for host B (B), an IP-SA 2088 for host A (A), and payload. DBB2 may send the second frame 2080 to host B in district 2. Since the SAs in the received frames at district 2 are not changed, the data frame forwarding scheme 2000 may not affect implemented DHCP in the network.

In the network above, the core bridges or switches of the core district, e.g., the core bridges 1812 in the core district 1810, may only need to maintain the MAC addresses of the DBBs in the districts without the MAC and IP addresses of the hosts in the districts. Since the DAs in the data frames forwarded through the core district may only correspond to DBBs MAC addresses, as described above, the core bridges may not need to be aware of the other addresses. The MAC addresses of the DBBs may be maintained in the core bridges' forwarding databases (FDBs). The core bridges or switches may learn the topology of all the DBBs via a link state based protocol. For example, the DBBs may send out link state advertisements (LSAs), e.g., using IEEE 802.1aq, Transparent Interconnect of Lots of Links (TRILL), or IP based core. If Spanning Tree Protocol (STP) is used among the core bridges, MAC address learning may be disabled at the core bridges. In this case, the DBBs may register themselves with the core bridges.

In an embodiment, the DBBs may act as ARP proxies, as described above, if a DS is not used. Gratuitous ARP messages may be sent by the end-stations to announce their own MAC addresses. Gratuitous group announcements may also be sent by the DBBs to announce their own MAC addresses and the IP addresses for all the hosts within their local districts. The gratuitous group announcements may be used to announce the MAC and IP addresses to the other DBBs in the other districts. The announced MAC addresses and IP addresses may be used in the other DBBS to translate DBB MAC DAs in received frames according to host IP DAs. A gratuitous group ARP may be sent by a DBB to announce a subset of host IP addresses for each VLAN associated with the DBB. The gratuitous group ARP may comprise a mapping of subsets of host IP addresses to a plurality of VLANs for the DBB.

Table 5 illustrates an example of mapping host IP addresses to the corresponding DBB MAC addresses in the interconnected districts. The mapping may be sent in a gratuitous group ARP by a DBB to announce its host IP addresses for each VLAN associated with the DBB. A DBB MAC address (DBB-MAC) may be mapped to a plurality of corresponding host IP addresses. Each DBB MAC address may be mapped to a plurality of host IP addresses in a plurality of VLANs (e.g., VID-1, VID-2, VID-n, . . . ), which may be in the same or different districts.

TABLE 5

Information carried by Gratuitous Group ARP

| DBB | VLAN | Host |
| --- | --- | --- |
| DBB-MAC | VID-1 | IP addresses of all hosts in this VLAN (IP Prefix) |
|  | VID-2 | IP addresses of all hosts in this VLAN (IP Prefix) |
|  | VID-n | IP addresses of all hosts in this VLAN (IP Prefix) |

In some situations, multiple hosts in the interconnected districts may have the same IP addresses and may be associated with the same VLAN (or VID). For instance, a virtual subnet of a cloud computing service may allow clients to name their own private IP addresses. The number of virtual subnets offered by a cloud computing service may substantially exceed the total number of allowed VLANs (e.g., about 4095 VLANs). As such, a plurality of virtual hosts (e.g., VM or virtual end-stations) may use be allowed to have the same IP addresses but with different MAC addresses. In other instances, multiple end-stations may serve the same application using the same IP addresses but different MAC addresses.

In an embodiment, a DBB may be assigned a plurality of MAC addresses, referred to herein as delegate MAC addresses, e.g., to differentiate between different hosts that use the same (duplicated) IP address. The DBB may also be associated with a plurality of VLANs. Further, each VLAN on the DBB may be associated with a plurality of subnets or virtual subnets, e.g., that comprise different subsets of hosts within the VLAN. The virtual subnets may be associated with a plurality of subnet identifiers (IDs). If the number of duplicated IP addresses for the hosts is substantially less than the number of virtual subnets of the VLAN, then the number of delegate MAC addresses for the DBB may also be substantially less.

Figure 21:
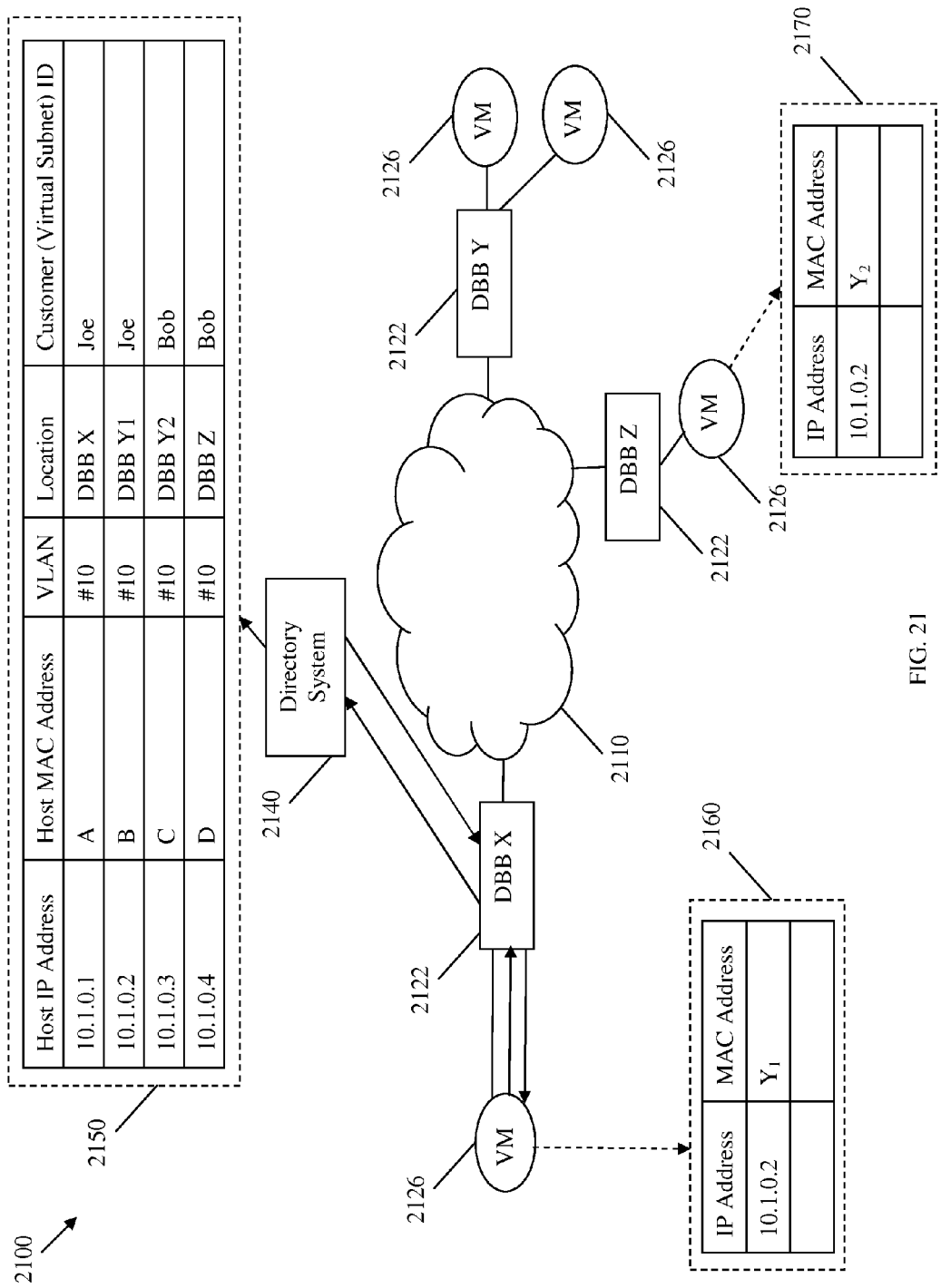
FIG. 21 is a schematic diagram of another embodiment of an ARP proxy scheme.

FIG. 21 illustrates an embodiment of an ARP proxy scheme 2100 that may be used for interconnected network districts in a Layer 2 bridged network. The Layer 2 bridged network may comprise a core district 2110, a plurality of DBBs 2122 or district boundary switches connected to the core district 2110, and a plurality of end-stations 2126 (e.g., VMs) connected to corresponding DBBs 2122 in their districts. The Layer 2 bridged network may also comprise a DS 2140 that may be connected to the DBBs 2122, e.g., via the core district 2110. The DBBs 2122 and end-stations 2126 may belong to a VLAN established in the Layer 2 bridged network. The components of the Layer 2 bridged network may be arranged as shown in FIG. 21.

Based on the ARP proxy scheme 2100, a first DBB 2122 (DBB X) may intercept an ARP request from a first end-station 2226 in its local district. The ARP request may be for a MAC address for a second end-station 2126 in another district. The ARP request may comprise the IP DA (10.1.0.2) of the second end-station 2126, and the IP SA (10.1.0.1) and MAC SA (A) of the first end-station 2126. The first end-station 2126 may maintain the IP addresses of the other end-stations 2122 in a VM ARP table 2160. DBB X may then forward a DS query to obtain a MAC address for the second end-station 2126 from the DS 2140. The DS query may comprise the IP address (10.1.0.2) of the second end-station 2126, and the IP SA (10.1.0.1) and MAC SA (A) of the first end-station 2126. The DS 2140 may maintain the IP addresses, MAC addresses, VLAN IDs or VIDs, customer (virtual subnet) IDs, and information about the associated DBBs 2122 or locations of the end-stations 2126 in a DS address table 2150.

The DS 2140 may use the MAC SA (A) in the DS query to determine which customer (virtual subnet) ID belongs to the requesting VM (first end-station 2126). For example, according to the DS address table 2150, the customer ID, Joe, corresponds to the MAC SA (A). The DS 2140 may then return to DBB X a DS response that comprises the IP address (10.1.0.2) of the second end-station 2126 and a delegate MAC address (Y1) of a second DBB 2126 (DBB Y) associated with the customer ID (Joe) of the first end-station 2126. In turn, DBB X may send an ARP response to the first end-station 2126 that comprises the IP DA (10.1.0.1) and MAC DA (A) of the first end-station 2126, the IP SA (10.1.0.2) of the second end-station 2126, and the delegate MAC address of DBB Y (Y1). The first end-station 2126 may then associate the delegate MAC address of DBB Y (Y1) with the IP address (10.1.0.2) of the second end-station 2126 in the VM ARP table 2160. The first end-station 2126 may use the delegate MAC address of DBB Y as the DA to forward frames that are intended for the second end-station 2126.

A third end-station 2126 in another district may also send an ARP request (for the second end-station 2126 to a corresponding local DBB 2122 (DBB Z) in the third end-station's district. DBB Z may then communicate with the DS 2140, as described above, and return accordingly to the third end-station 2126 an ARP response that comprises the IP DA (10.1.0.3) and MAC DA of the third end-station 2126, the IP SA (10.1.0.2) of the second end-station 2126, and a delegate MAC address of DBB Y (Y2) associated with the customer ID, Bob, of the third end-station 2126 in the DS address table 2150. The third end-station 2126 may then associate the delegate MAC address of DBB Y (Y2) with the IP address (10.1.0.2) of the second end-station 2126 in a VM ARP table 2170 of the third end-station 2126. The third end-station 2126 may use this delegate MAC address of DBB Y as the DA to forward frames that are intended for the second end-station 2126.

Table 6 illustrates an example of mapping a duplicated host IP address to corresponding delegate DBB MAC addresses in a VLAN in the interconnected districts. The duplicated host address may be used by a plurality of hosts for one intended application or host. The delegate MAC DBB addresses may be assigned for the different hosts that use the same application (or communicate with the same host). For each VLAN, a host IP address may be mapped to a plurality of delegate DBB MAC addresses (MAC-12, MAC-13, MAC-14, . . . ) for a plurality of hosts, e.g., associated with different subnets of the VLAN. The delegate DBB MAC addresses may also be associated with a base (original) DBB MAC address (MAC-11). The base and delegate DBB MAC addresses for the same IP may be different for different VLANs. When a VLAN does not have delegate addresses, the DBB base address may be used for the VLAN. If there are about 10 duplicated IP addresses within one VLAN, then about 10 columns (ten MAC addresses) in the table 6 may be used.

TABLE 6

MAT for Duplicated IP addresses.

| IP Address | DBB Base Address | DBB Delegate 1 | DBB Delegate 2 | DBB Delegate 3 | DBB Delegate 4 ... |
|---|---|---|---|---|---|
| 10.1.0.1 (VLAN#1) | MAC-11 | MAC-12 | MAC-13 | MAC-14 | |
| 10.1.0.1 (VLAN#2) | MAC-21 | MAC-22 | ... | | |
| 10.1.0.1 (VLAN#3) | MAC-31 | ... | | | |

Table 7 illustrates an example of mapping host IP addresses to a plurality of delegate MAC addresses, e.g., for multiple subnets. The mapping may be sent in a gratuitous group ARP by a DBB to announce its host IP addresses for each VLAN associated with the DBB. Each delegate MAC address (DBB-MAC1, DBB-MAC2, . . . ) may be mapped to a plurality of corresponding host IP addresses in a subnet. Each delegate DBB MAC address may be associated with a customer or virtual subnet ID for the host IP addresses. The host IP addresses for each delegate DBB MAC address may also correspond to a plurality of VLANs (VID-1, VID-2, VID-n, . . . ). The host IP addresses in each subnet may be different. Duplicated host IP addresses, which may be associated with the same VLANs but with different customer IDs, may be mapped to different delegate DBB MAC addresses.

TABLE 7

Information carried by Gratuitous Group ARP

| DBB | VLAN | Host |
|---|---|---|
| DBB-MAC1 | VID-1 | IP addresses of all hosts in this VLAN (IP Prefix) |
| | VID-2 | IP addresses of all hosts in this VLAN (IP Prefix) |
| | VID-n | IP addresses of all hosts in this VLAN (IP Prefix) |
| DBB-MAC2 | VID-1 | IP addresses of all hosts in this VLAN (IP Prefix) |
| | VID-2 | IP addresses of all hosts in this VLAN (IP Prefix) |
| | VID-n | IP addresses of all hosts in this VLAN (IP Prefix) |

Figure 22:
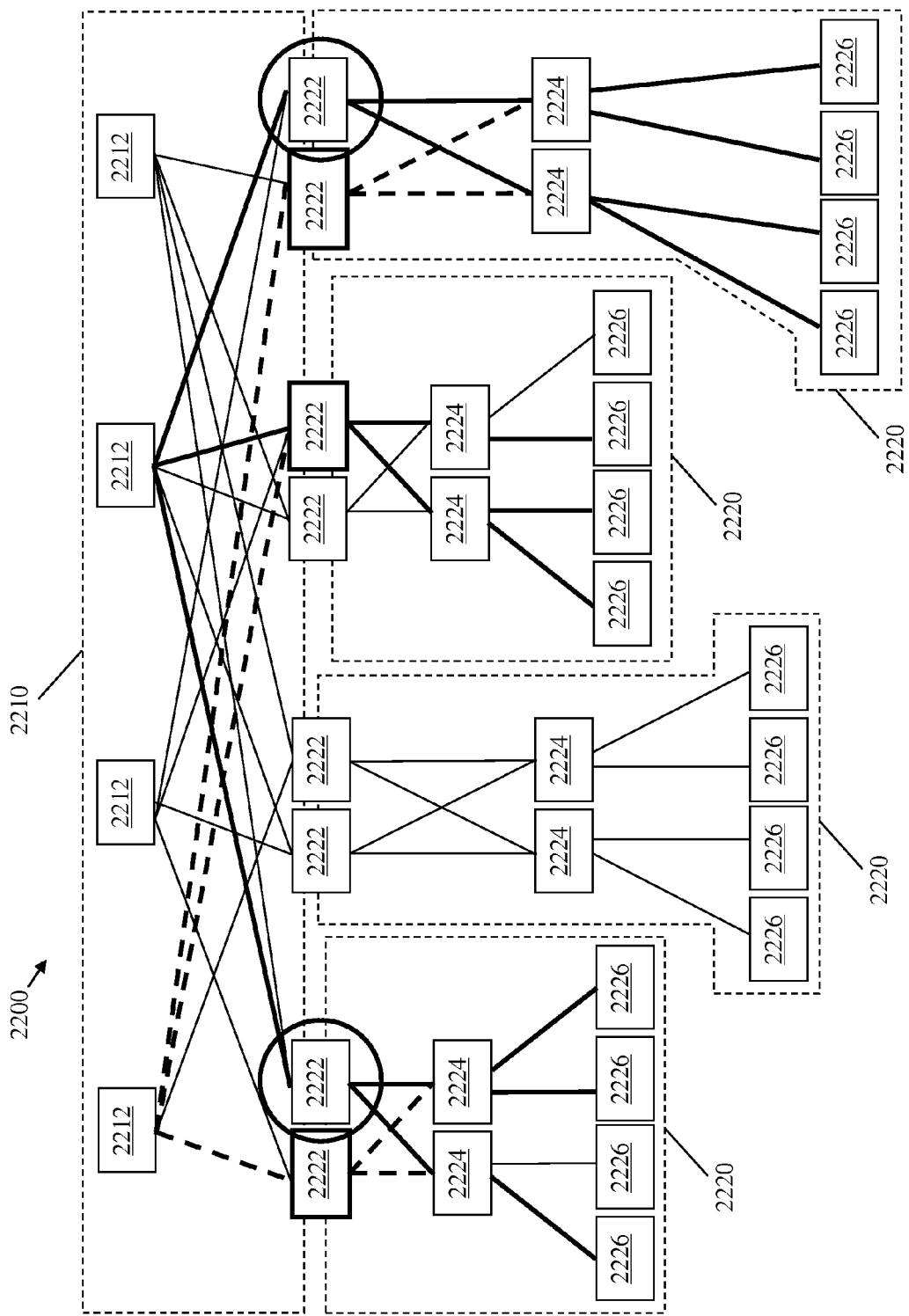
FIG. 22 is a schematic diagram of an embodiment of a fail-over scheme.

FIG. 22 illustrates an embodiment of a fail-over scheme 2200 that may be used for interconnected network districts in a Layer 2 bridged network. The fail-over scheme 2100 may be used in the case any of the DBBs (e.g., a ToR switch) in the interconnected districts fails. The Layer 2 bridged network may comprise a plurality of core bridges 2212 and a plurality of DBBs 2222 or district boundary switches in a core district 1810, and a plurality of districts 2220. The districts 2220 may comprise the DBBs 2222, a plurality of intermediate switches 2224, and a plurality of end-stations 2226, e.g., servers/VMs. The Layer 2 bridged network may also comprise a DS (not shown) that may be connected to the DBBs 2222, e.g., via the core district 2210. Some of the DBBs 2222, intermediate switches 2224, and end-stations 2226 may belong to a VLAN established in the Layer 2 bridged network. The components of the Layer 2 bridged network may be arranged as shown in FIG. 22.

When an active DBB 2222 fails in a VLAN, the VLAN may be established using one or more standby DBBs 2222. The standby DBBs 2222 may establish active connections with at least some of the intermediate switches 2224 that belong to the VLAN and possibly with a new core bridge 2212. This is indicated by the dashed lines in FIG. 22. As such, the paths to the end-stations 2226 of the VLAN may not be lost which allows the end-stations 2226 to communicate over the VLAN. When the DBB 2222 in the VLAN fails, the DS may be notified of the failure, for instance by sending an explicit message to the DS or using a keep-alive method. Thus, a DBB may replace the address information of the failed DBB and possibly other original DBBs 2222 in the VLAN in the entries of the DS address table with information of the new DBBs 2222 that were on standby and then used to replace the failed and other original DBBs 2222. A replaced failed and original DBB are indicated by circles in FIG. 22. Upon detecting the failed DBB 2222, a replacement DBB may send a LSA to the DS or the core district 2010 to indicate that the failed DBB's addresses, including all delegate addresses, are reachable by the replacement DBB 2222.

With server virtualization, a physical server may host more VMs, e.g., tens to hundreds of virtual end-stations or VMs. This may result in a substantial increase in the number of virtual hosts in a DC. For example, for a relatively large DC with about 50,000 severs, which may each support up to about 128 VMs, the total number of VMs in the DC may be equal to about 50,000×128 or about 6,400,000 VMs. To achieve dynamic allocation of resources across such large server pool, Ethernet-based Layer 2 networks may be used in DCs. Such a large Layer 2 network with potentially a substantial number of virtual hosts may pose new challenges to the underlying Ethernet technology. For instance, one issue may be MAC forwarding table scalability due to the flat MAC address space. Another issue may be handling a broadcast storm caused by ARP and other broadcast traffic.

One approach to reduce the size of the MAC forwarding table, also referred to herein as a FDB, in the core of the network may be using network address encapsulation, e.g., according to IEEE 802.1ah and TRILL. The network address encapsulations of 802.1ah and TRILL are described in IEEE P802.1ah/D4.2 standard and IETF draft draft-ietf-trill-rbridge-protol-12-txt, respectively, both of which are incorporated herein by reference. With network address encapsulation, the number of FDB entries in core switches may be reduced to the total number of switches (including edge and core) in the network, independent of the number of VMs. For example, with about 20 servers per edge switch, the number of edge switches in a network of about 50,000 servers may be equal to about 50,000/20 or about 2,500. However, with data path MAC address learning, the FDB size of edge switches (e.g., ToR switches in DCs) may be about the same as when network address encapsulation is not used, which may be substantially large.

Even with selective MAC learning at ToR switches, the FDB size may still be substantially large. For example, if a ToR switch has about 40 downstream ports, a pair of ToR switches may have up to about 40 dual-homed servers connected to the ToR switches. If a server supports up to about 128 VMs, a ToR switch may have about 128×40/2 or about 2,560 VMs connected to the ToR switch in normal operation, e.g., when the TOR switches handle about the same number of VMs. The number of VMs may increase to about 5,120 if one ToR switch fails. If each VM communicates on average with about 10 remote VMs simultaneously, the ToR switch FDB size (e.g., number of entries) may be at least proportional to about 2,560 (local VMs)+2,560×10 (remote VMs)+ 2,500 (ToR switches) or about 30,660 entries, which may be further doubled in the failure scenario.

The network address encapsulations in 802.1ah and TRILL may be symmetric. Specifically, the same switches, such as edge switches, may perform the address encapsulation. The problem with the symmetric network address encapsulations in 802.1ah and TRIL is that an edge switch needs to keep track of the remote VMs that communicate with local VMs. The number of the remote VMs may vary substantially. One solution proposed by A. Greenberg et al. in a paper entitled "Towards a Next Generation Data Center Architecture: Scalability and Commoditization", published in PRESTO 08, which is incorporated herein by reference, is to move the network address encapsulation procedure inside the VMs, thus reducing the switch FDB size to its minimum, which may be equal to the sum of the number of local VMs and the number of edge switches in the network (e.g., equal to about 2,560+2,500 or about 5,060 entries in the above example). A drawback of this approach is the change of guest operation system (OS) protocol stack.

Instead, moving the network address encapsulation to a virtual switch of a physical server (e.g., inside a hypervisor) may reduce the edge switch FDB size and avoid changing the guest OS protocol stack, as described further below. Such a network address encapsulation is referred to herein as asymmetric network address encapsulation since address decapsulation is still done elsewhere in edge switches. This mechanism of asymmetric network address encapsulation may reduce the amount of addresses maintained in the FDBs of intermediate/edge switches or routers.

The asymmetric network address encapsulation scheme may be implemented in a Layer 2 network that comprises edge and core switches, such as in the different network embodiments described above. For instance, the edge switches may correspond to ToR switches in DCs. Each edge switch may be assigned a unique ID, which may be a MAC address (as in 802.1ah), an about 16 bit nickname (as in TRILL), or an IP address. The network may be configured to forward a frame based on the destination edge switch ID carried in the header of the frame from an ingress edge switch to the egress edge switch. The frame may be forwarded inside the network using any transport technology. The asymmetric network address encapsulation scheme may be similar to the address encapsulation scheme in 802.1ah, also referred as MAC-in-MAC. MAC learning may be disabled in the network but enabled on the edge switch server facing ports. The terms server, end-station, and host may be used interchangeably herein. The terms virtual server, VM, virtual end-station, and virtual host may also be used interchangeably herein.

Figure 23:
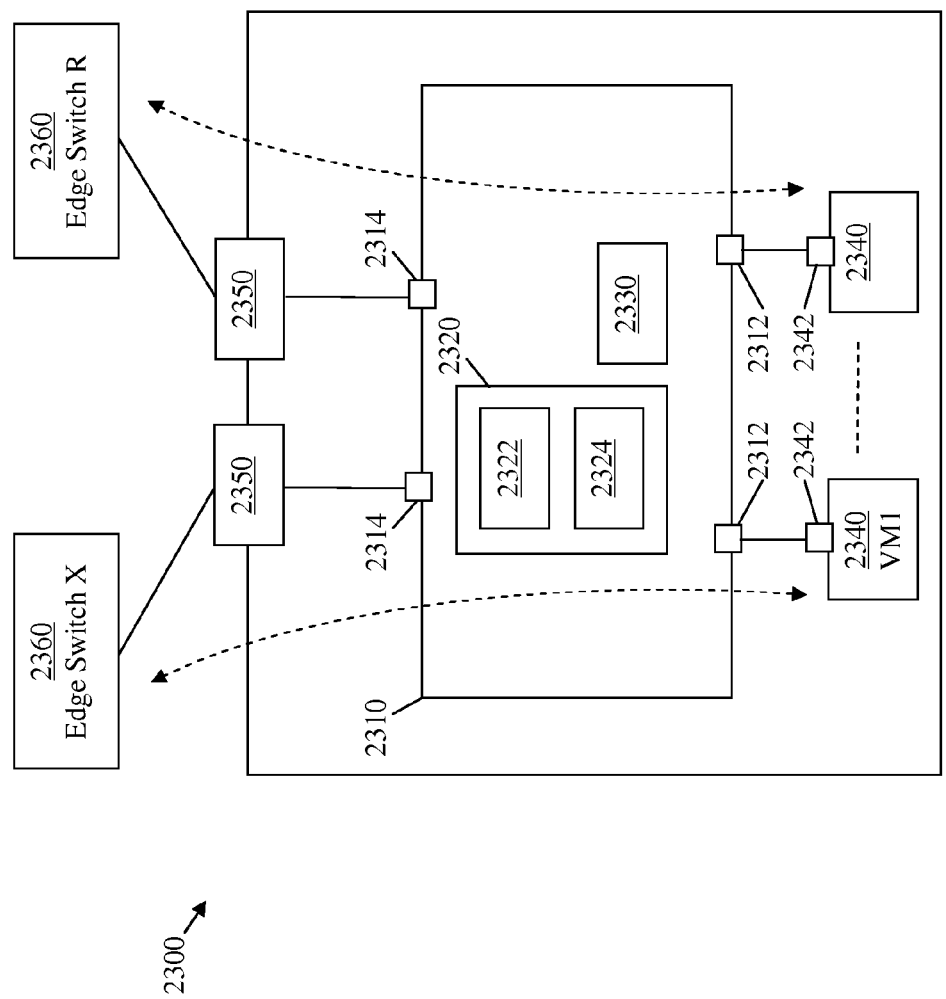
FIG. 23 is a schematic diagram of an embodiment of a physical server.

In MAC-in-MAC, there are two types of MAC addresses: the MAC addresses assigned to edge switches, also referred to as network addresses or backbone MAC (B-MAC) addresses, and the MAC addresses used by VMs, also referred to as customer MAC (C-MAC) addresses. FIG. 23 illustrates an embodiment of a typical physical server 2300, which may be a dual-homed server in a DC. The physical server 2300 may comprise a virtual switch 2310, a plurality of VMs 2340, and a plurality of physical Network Interface Cards (pNICs) 2350. The virtual switch 2310 may comprise an ARP proxy 2330 and a FDB 2320, which may comprise a local FDB 2322 and a remote FDB 2324. The virtual switch 2310 may be located inside a hypervisor of the physical server 2300. The virtual switch 2310 may be connected to the VMs via a plurality of corresponding virtual Network Interface Cards (NICs) 2342 of the VMs 2340 and a plurality of corresponding virtual switch ports 2312 of the virtual switch 2310. The virtual switch 2310 may also be connected to the pNICs 2350 via a plurality of corresponding virtual switch trunk ports 2314 of the virtual switch 2310. The pNICs 2350 may serve as uplinks or trunks for the virtual switch 2310. The physical server 2300 may be connected to a plurality of edge switches 2360 via corresponding pNICs 2350 of the physical server 2300. Thus, the edge switches 2360 may be connected via the components of the physical server 2300 (the pNICs 2350 and the virtual switch 2310) to the VMs 2340. The components of the physical server 2300 may be arranged as shown in FIG. 23.

For load balancing, traffic may be distributed to the trunks (pNICs 2350) based on the virtual port IDs or VM source C-MAC addresses of the traffic. Each VM 2340 may have a virtual NIC 2342 with a uniquely assigned C-MAC address. A VM 2340 may send traffic to an edge switch 2360 during normal operation. For example, a first VM 2340 (VM1) may send a plurality of frames intended to external VMs in other physical servers in the network (not shown) via a corresponding first edge switch 2350 (edge switch X). A second edge switch 2360 (edge switch R) may be a backup for edge switch X. When edge switch X becomes unreachable due to a failure (e.g., the corresponding pNIC 2350 fails, the link between the pNIC 2350 and edge switch X fails, or edge switch X fails), the virtual switch 2310 may then send the frames to edge switch R.

In the FDB 2320, the local FDB 2322 may correspond to the local VMs (VMs 2340) and may comprise a plurality of C-MAC destination addresses (C-MAC DAs), a plurality of VLAN IDs, and a plurality of associated virtual switch port IDs. The C-MAC DAs and VLAN IDs may be used to look up the local FDB 2322 to obtain the corresponding virtual switch port IDs. The remote FDB 2324 may correspond to external VMs (in other physical servers) and may comprise a plurality of B-MAC destination addresses (B-MAC DAs) and a plurality of C-MAC DAs associated with the B-MAC DAs. The C-MAC DAs may be used to look up the remote FDB 2324 by the local VMs to obtain the corresponding B-MAC DAs. The remote FDB 2324 may be populated by the ARP proxy 2330, as described below.

Based on the symmetric address encapsulation, an Ethernet frame from a VM 2340 may be untagged or tagged. If the frame is untagged, the VLAN ID assigned to the corresponding virtual switch port 2312 may be used. In the upstream direction from the VM 2340 to an edge switch 2360, the virtual switch 2310 may perform the following steps after receiving an Ethernet frame from the VM 2340:

Step 1: Use C-MAC DA and VLAN ID in the table lookup of the local FDB 2322. If a match is found, forward the frame to the virtual switch port 2312 that is specified in the matched FDB entry (by the virtual switch port ID). Else, go to step 2.

Step 2: Use C-MAC DA in the table lookup of the remote FDB 2324. If a match is found, perform a MAC-in-MAC encapsulation based asymmetric network address encapsulation (described below) and forward the frame to the virtual switch trunk port 2314 that is associated with the C-MAC SA in the frame. Else, go to step 3.

Step 3: Discard the frame and send an enhanced ARP request to an ARP server in the network (not shown).

Figure 24:
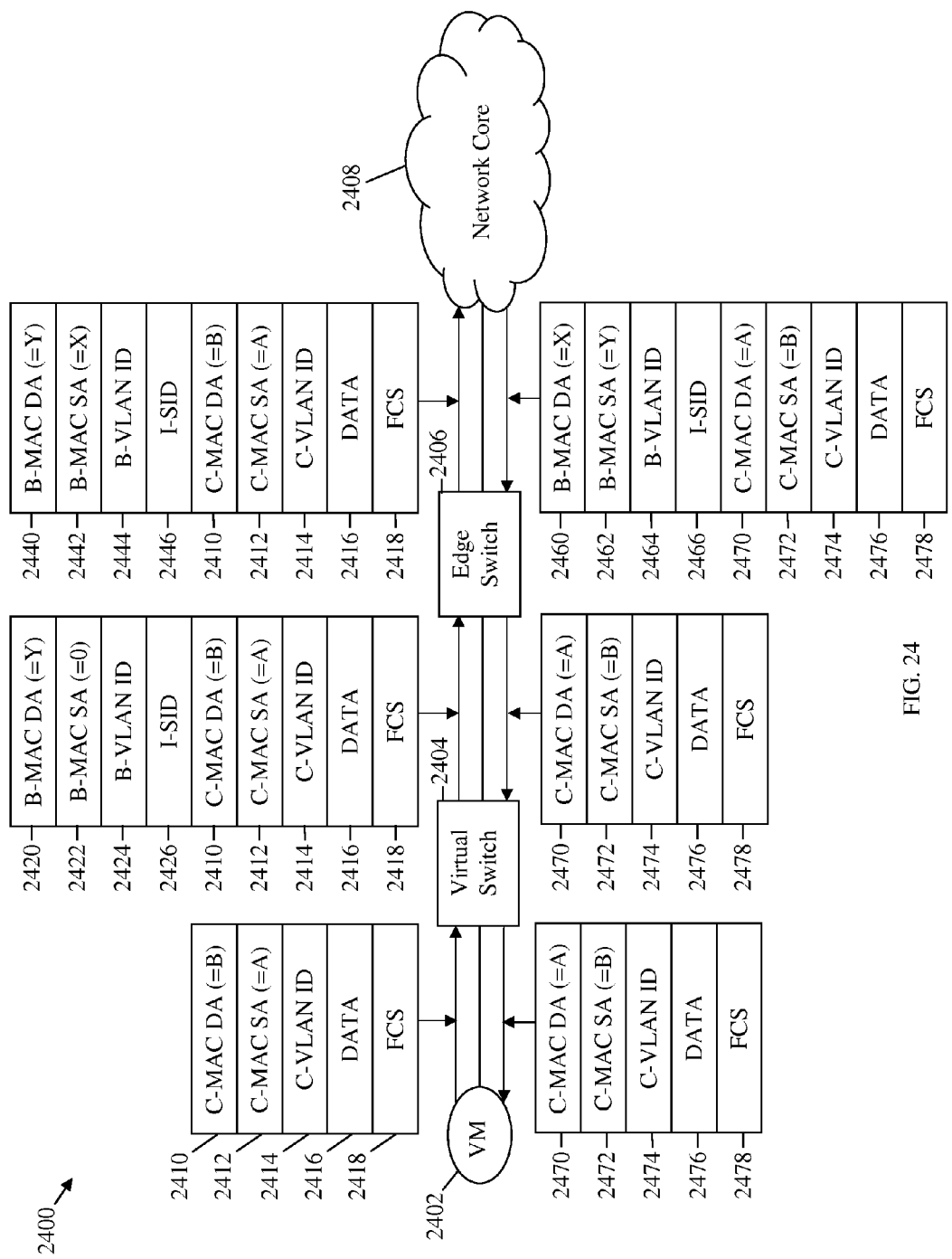
FIG. 24 is a schematic diagram of an embodiment of an asymmetric network address encapsulation scheme.

FIG. 24 illustrates an embodiment of an asymmetric network address encapsulation scheme 2400 that may be used in the physical server. Based on the asymmetric network address encapsulation scheme 2400, a VM 2402 may send, in the upstream direction, a frame intended to another external or remote VM in another physical server in the network (not shown). The frame may comprise a C-MAC DA (B) 2410 of the remote VM, a C-MAC SA (A) 2412 of the VM 2402, a C-VLAN ID 2414 for the VLAN of the VM 2402, data or payload 2416, and a Frame Check Sequence (FCS) 2418. The VM 2402 may send the frame to a virtual switch 2404.

The virtual switch 2404 (in the same physical server) may receive the frame from the VM 2402. The virtual switch 2404 may process the frame and add a header to the frame to obtain a MAC-in-MAC frame. The header may comprise a B-MAC DA (Y) 2420, a B-MAC SA (0) 2422, a B-VLAN ID 2424, and an Instance Service ID (I-SID) 2426. The B-MAC address (Y) may be associated with the C-MAC DA (B) 2410 in an edge switch 2406. The B-MAC address(Y) may indicate the location of the remote VM that has the C-MAC address (B). The B-MAC SA 2422 may be set to zero by the virtual switch 2404. The B-VLAN ID 2424 may be set to the C-VLAN ID 2414. The I-SID 2426 may be optional and may not be used in the header if the Ethernet frame is only sent to the C-MAC DA (B). The virtual switch 2404 may then send the MAC-in-MAC frame to the edge switch 2406.

The edge switch 2406 (connected to the physical server) may receive the MAC-in-MAC frame from the virtual switch 2404. The edge switch 2406 may process the header of the MAC-in-MAC frame to obtain a new header in the MAC-in-MAC frame. The new header may comprise a B-MAC DA (Y) 2440, a B-MAC SA (X) 2442, a B-VLAN ID 2444, and an I-SID 2446. The B-MAC SA (X) 2442 may be set to the B-MAC address (X) of the edge switch 2406. The B-VLAN ID 2444 may be changed if necessary to match a VLAN in the network. The remaining fields of the header may not be changed. The edge switch 2406 may then forward the new MAC-in-MAC frame based on the B-MAC DA (Y) 2442 and possibly the B-VAN ID 2444 via the network core 2408, e.g., a core network or a network core district.

In the downstream direction, the edge switch 2406 may receive a MAC-in-MAC frame from the network core 2408 and perform a frame decapsulation. The MAC-in-MAC frame may comprise a header and an original frame sent from the remote VM to the VM 2402. The header may comprise a B-MAC DA (X) 2460 for the edge switch 2406, a B-MAC SA (Y) 2462 that corresponds to remote VM and the edge switch 2406, a B-VLAN ID 2464 of the VLAN of the remote VM, and an I-SID 2466. The original frame for the remote VM may comprise a C-MAC DA (A) 2470 for the VM 2402, a C-MAC SA (B) 2472 of the remote VM, a C-VLAN ID 2474 associated with the VM 2402, data or payload 2476, and a FCS 2478. The edge switch 2406 may remove the header from the MAC-in-MAC frame and forward the remaining original frame to the virtual switch 2404. The edge switch 2406 may look up its forwarding table using C-MAC DA (A) 2470 and C-VLAN ID 2474 to get an outgoing switch port ID and forward the original frame out on the physical server facing or connected to the corresponding switch port. In turn, the virtual switch 2404 may forward the original frame to the VM 2402. The virtual switch 2404 may forward the original frame to the VM 2402 based on the C-MAC DA (A) 2470 and the C-VLAN ID 2474.

The forwarding tables in the edge switch 2406 may include a local FDB and a remote FDB. The local FDB may be used for forwarding frames for local VMs and may be populated via MAC learning and indexed by the C-MAC DA and C-VLAN ID in the received frame. The remote FDB may be used for forwarding frames to remote VMs and may be populated by a routing protocol or a centralized control/management plane and indexed by the B-MAC DA and possibly the B-VLAN ID in the received frame.

In the asymmetric address encapsulation scheme 2400, the MAC-in-MAC encapsulation may be performed at the virtual switch 2404, while the MAC-in-MAC de-capsulation may be performed at the edge switch 2406. As such, the FDB size in the edge switches may be substantially reduced and become more manageable even for a substantially large Layer 2 network, e.g., in a mega DC. The remote FDB size in the virtual switch 2404 may depend on the number of remote VMs in communication with the local VMs, e.g., the VM 2402. For example, if a virtual switch supports about 128 local VMs and each local VM on average communicates with about 10 remote VMs concurrently, the remote FDB may comprise about 128×10 or about 1,289 entries.

Figure 25:
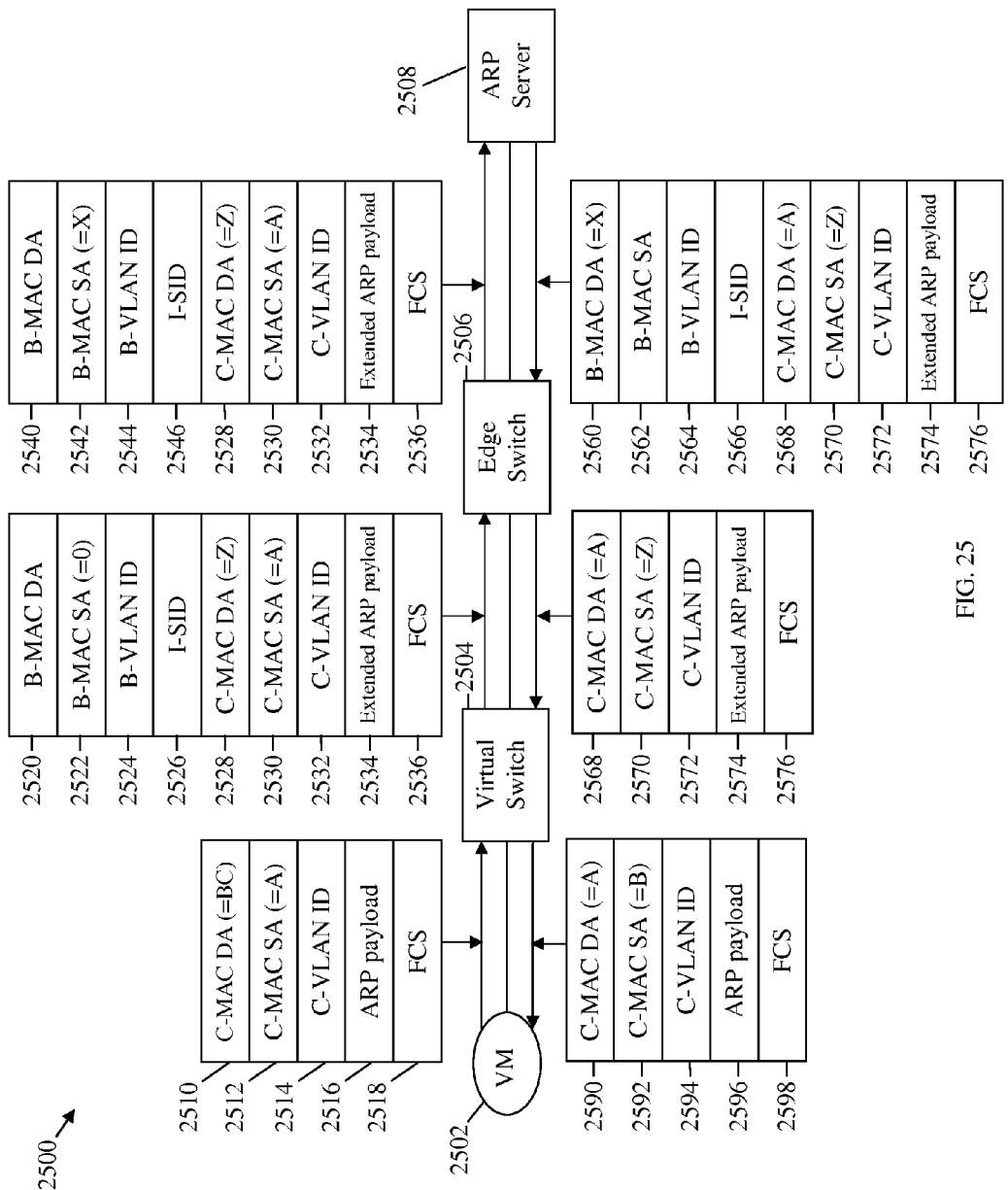
FIG. 25 is a schematic diagram of an embodiment of an ARP processing scheme.

FIG. 25 illustrates an embodiment of an ARP processing scheme 2500 that may be used in the physical server 2300. Based on the ARP processing scheme 2500, a VM 2502 may broadcast an ARP request for a remote VM. The ARP request may comprise a C-MAC DA (BC) 2510 that indicates a broadcast message, a C-MAC SA (A) 2512 of the VM 2502, a C-VLAN ID 2514 for the VLAN of the VM 2502, ARP payload 2516, and a FCS 2518.

A virtual switch 2504 (in the same physical server), which may be configured to intercept all ARP messages from local VMs, may intercept the ARP request for a remote VM. An ARP proxy in the virtual switch 2504 may process the ARP request and add a header to the frame to obtain a unicast extended ARP (ERAP) message. The frame may be encapsulated using MAC-in-MAC, e.g., similar to the asymmetric network address encapsulation scheme 2400. The header may comprise a B-MAC DA 2520, a B-MAC SA (0) 2522, a B-VLAN ID 2524, and an I-SID 2526. The B-MAC DA 2520 may be associated with an ARP server 2508 in the network. The B-VLAN ID 2524 may be set to the C-VLAN ID 2514. The I-SID 2526 may be optional and may not be used. The EARP message may also comprise a C-MAC DA (Z) 2528, a C-MAC SA (A) 2530, a C-VLAN ID 2532, an EARP payload 2534, and a FCS 2536. The ARP proxy may replace the C-MAC DA (BC) 2510 and the ARP payload 2516 in the received frame with the C-MAC DA (Z) 2528 for the remote VM and the EARP payload 2534, respectively, in the EARP message. The virtual switch 2504 may then send the EARP message to the edge switch 2506.

The edge switch 2506 may process the header in the EARP message to obtain a new header. The new header may comprise a B-MAC DA (Y) 2540, a B-MAC SA (X) 2542, a B-VLAN ID 2544, and an I-SID 2546. The B-MAC SA (X) 2542 may be set to the B-MAC address (X) of the edge switch 2506. The B-VLAN ID 2544 may be changed if necessary to match a VLAN in the network. The remaining fields of the header may not be changed. The edge switch 2506 may then forward the new EARP message to the ARP server 2508 in the network.

The ARP server 2508 may process the received EARP message and return an EARP reply to the edge switch 2506. The EARP reply may comprise a header and an ARP frame. The header may comprise a B-MC DA (X) 2560 for the edge switch 2506, a B-MAS SA 2562 of the ARP server 2508, a B-VLAN ID 2564, and an I-SID 2566. The ARP frame may comprise a C-MAC DA (A) 2568 for the VM 2502, a C-MAC SA (Z) 2570 for the requested remote VM, a C-VLAN ID 2572, an EARP payload 2574, and a FCS 2576. The edge switch 2506 may decapsulate the EARP message by removing the header and then forward the ARP frame to the virtual switch 2504. The virtual switch 2504 may process the ARP frame and send an ARP reply accordingly to the VM 2502. The ARP reply may comprise a C-MAC DA (A) 2590 for the VM 2502, a C-MAC SA (B) 2592 associated with remote VM's location, a C-VLAN ID 2594, an ARP payload 2596, and a FCS 2598.

The ARP proxy in the virtual switch 2504 may also use the EARP message to populate the remote FDB in the edge switch 2506. The ARP proxy may populate an entry in the FDB table with a remote C-MAC and remote switch B-MAC pair, which may be found in the EARP payload 2574. The C-MAC and remote switch B-MAC may be found in a sender hardware address (SHA) field and a sender location address (SLA) field, respectively, in the EARP payload 2574.

A hypervisor in the physical server that comprises the virtual switch 2504 may also register a VM, e.g., the local VM 2502 or a remote VM, with the ARP server 2508 in a similar manner of the ARP processing scheme 2500. In this case, the virtual switch 2504 may send a unicast EARP frame to the ARP server 2508 with all the sender fields equal to all the target fields. Another way to register the VM is described in U.S. Provisional Patent Application No. 61/389,747 by Y. Xiong et al. entitled "A MAC Address Delegation Scheme for Scalable Ethernet Networks with Duplicated Host IP Addresses," which is incorporated herein by reference as if reproduced in its entirety. This scheme may handle the duplicated IP address scenario.

FIG. 26 illustrates an embodiment of an EARP payload 2600 that may be used in the ARP processing scheme 2500, such as the EARP payload 2574. The EARP payload 2600 may comprise a hardware type (HTYPE) 2610, a protocol type (PTYPE) 2612, a hardware address length (HLEN) 2614, a protocol address length (PLEN) 2616, an operation field (OPER) 2618, a SHA 2620, a sender protocol address (SPA) 2622, a target hardware address (THA) 2624, and a target protocol address (TPA) 2626, which may be elements of a typical ARP message. Additionally, the EARP payload 2600 may comprise a SLA 2628 and a target location address (TLA) 2630. FIG. 6 also shows the bit offset for each field in the EARP payload 2600, which also indicates the size of each field in bits.

One issue with using the ARP server (e.g., the ARP server 2508) and disabling MAC learning in the network is the case where a VM becomes unreachable due to a failure of its edge switch or the link connecting the ARP server to the edge switch. In this case, it may take some time for the virtual switch to know the new location of a new or replacement edge switch for the VM. For example, if the edge switch X in the physical server 2300 becomes unreachable, the virtual switch 2310 may forward frames from VM1 to the edge switch R, which may become the new location for VM1.

To reduce the time for updating the remote FDB in a virtual switch 2310 about the new location of a VM, a gratuitous EARP message may be used. The virtual switch 2310 may first send a gratuitous EARP message to the edge switch R in a MAC-in-MAC encapsulation frame, including a B-MAC DA set to broadcast address (BC). In the gratuitous EARP message, the SHA (e.g., SHA 2620) may be set equal to the THA (e.g., THA 2624), the SPA (e.g., SPA 2622) may be set equal to the TPA (e.g., TPA 2626), and the SLA (e.g., SLA 2628) may be set equal to TLA (e.g., TLA 2630). The edge switch R may then send the gratuitous EARP message to a plurality of or to all other edge switches in the network, e.g., via a distribution tree. When an edge switch receives the gratuitous EARP message, the edge switch may decapsulate the message and send the message out on the edge switch's server facing ports. When a virtual switch then receives the gratuitous EARP message, the virtual switch may update its remote FDB if the SHA already exists in the remote FDB. The ARP server in the network may update the new location of the affected VM in the same way.

The asymmetric network address encapsulation scheme described above may use the MAC-in-MAC encapsulation in one embodiment. Alternatively, this scheme may be extended to other encapsulation methods. If TRILL is supported and used in a network, where an edge switch is identified by an about 16 bit nickname, the TRILL encapsulation may be used in the asymmetric network address encapsulation scheme. Alternatively, an IP-in-IP encapsulation may be used if an edge switch is identified by an IP address. Further, network address encapsulation may be performed at the virtual switch level and the network address de-capsulation may be performed at the edge switch level. In general, the network address encapsulation scheme may be applied at any level or any of the network components as long as the encapsulation and de-capsulation are kept at different levels or components.

In a bridged network that is partitioned into districts, such as in the interconnected network districts 1800, a DBB may be a bridge participating in multiple districts. The DBB's address may be referred to herein as a network address to differentiate the DBB's address from the C-MAC addresses of the VMs in each district. Using the asymmetric address encapsulation scheme above, the encapsulation of the network address may be performed at the switch closer to hosts or the virtual switch closer to virtual hosts. For example, the intermediate switches 1824, e.g., ToR switches, may perform the network address encapsulation. The intermediate switches 1824 may encapsulate the data frames coming from the subsets of hosts and that comprise a target DBB address. However, the intermediate switches 1824 may not alter data frames incoming from the network side, e.g., the DBBs 1822 in the core district 1810. The target DBB 1822, which is one level above the intermediate switch 1824, may decapsulate the data frames from network side (core district 1810) and forward the decapsulated data frame towards hosts within its district.

In an embodiment, a virtual switch insider a physical server (e.g., an end-station 1826) may perform the network address encapsulation, while the target DBB 1822 may perform the network address decapsulation. In this case, the DBB 1822 that performs the decapsulation may be two levels above the virtual switch (in the end-station 1826) that performs the encapsulation.

The bridged network connected to the DBB 1822 (e.g., the core district 1810) may be IP based. The core network (or district) that interconnects the DBBs may be a L3 Virtual Private Network (VPN), a L2 VPN, or standard IP networks. In such scenarios, the DBB may encapsulate the MAC data frames from its local district with a proper target DBB address, which may be an IP or MPLS header.

Figure 27:
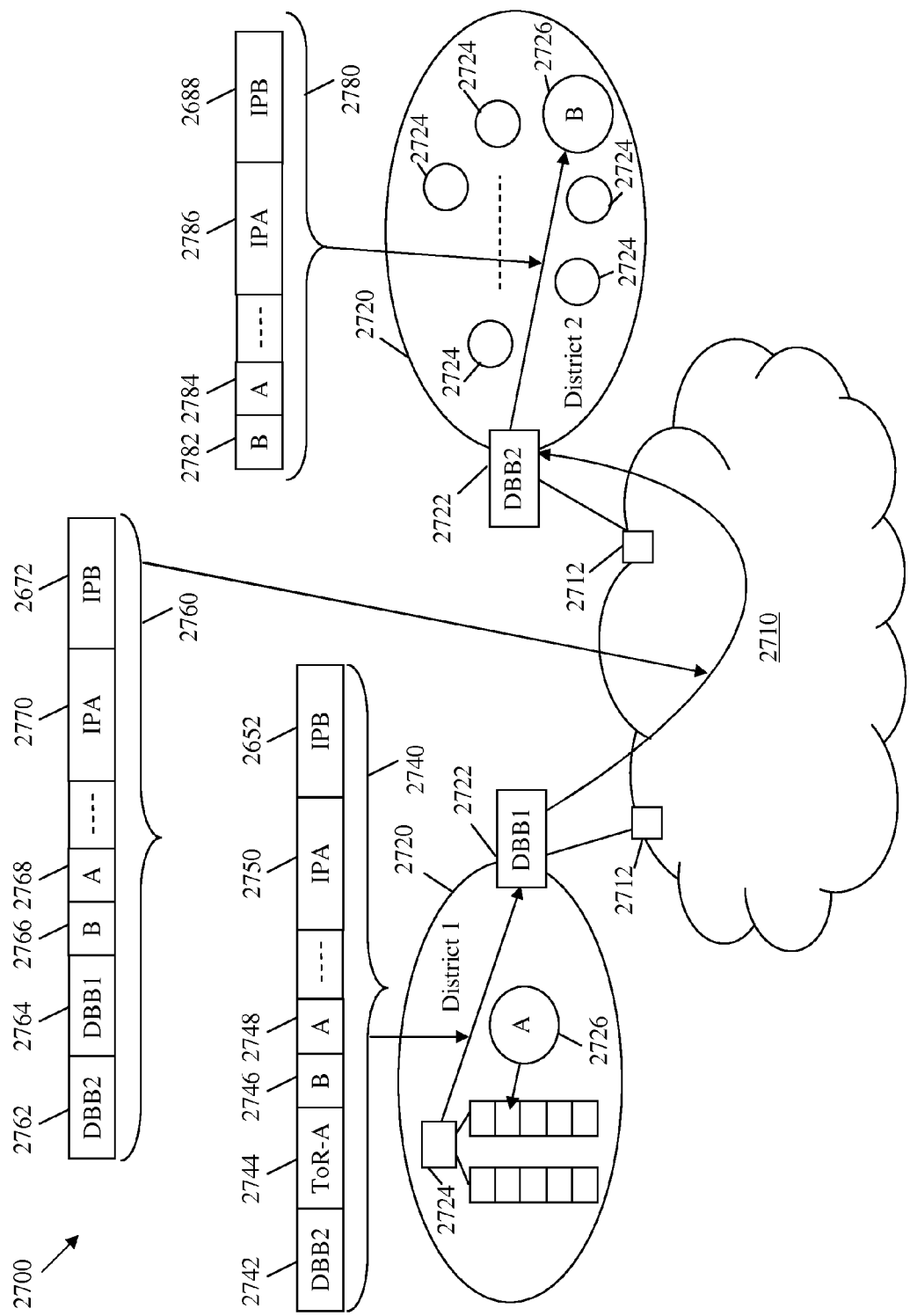
FIG. 27 is a schematic diagram of an embodiment of another data frame forwarding scheme.

FIG. 27 illustrates an embodiment of a data frame forwarding scheme 2700 that may be used in a Layer 2 bridged network, such as for the interconnected network districts 1800. The data frame forwarding scheme 2700 may also implement the asymmetric network address encapsulation scheme above. The Layer 2 bridged network may comprise a core district 2710, a plurality of DBBs 2722 or district boundary switches in a plurality of districts 2720 connected to the core district 2710, and a plurality of intermediate or edge switches 2724 and physical servers 2726 connected to corresponding DBBs 2022 in their districts 2720. The physical servers 2726 may comprise a plurality of VMs and virtual switches (not shown). Some of the DBBs 2722, intermediate/ edge switches 2724, and physical servers 2726 across the districts 2720 may belong to a VLAN established in the Layer 2 bridged network and associated with a VLAN ID. The components of the Layer 2 bridged network may be arranged as shown in FIG. 27.

According to the asymmetric network address encapsulation scheme, an intermediate/edge switch 2724 may receive a frame 2740, e.g., an Ethernet frame, from a first VM (host A) in a physical server 2726 in a first district (district 1). The frame 2040 may be intended for a second VM (host B) in a second physical server 2726 in a second district (district 2). The frame 2040 may comprise a B-MAC DA 2742 for a second DBB (DBB2) in district 2, a B-MAC SA 2744 for host A (ToR A), a C-MAC DA 2746 for host B (B), a C-MAC SA 2748 for host A (A), an IP-SA 2750 for host A (A), an IP-DA 2752 for host B (B), and payload. The intermediate/edge switch 2724 may forward the frame 2040 to a first DBB 2722 (DBB1) in district 1. DBB1 may receive and process the frame 2740 to obtain an inner frame 2760. The inner frame 2760 may comprise a B-MAC DA 2762 for DBB2, a B-MAC SA 2764 for DBB1, a C-MAC DA 2766 for host B (B), a C-MAC SA 2768 for host A (A), an IP-SA 2770 for host A (A), an IP-DA 2752 for host B (B), and payload. DBB1 may then forward the inner frame 2760 to district 2 via the core district 2710.

DBB2 in district 2 may receive and decapsulate the inner frame 2740 to obtain a second frame 2780. DBB2 may remove B-MAC DA 2762 for DBB2 and a B-MAC SA 2764 from the inner frame 2760 to obtain the second frame 2780. Thus, the second frame 2780 may comprise a C-MAC DA 2782 for host B (B), a C-MAC SA 2784 for host A (A), an IP-SA 2786 for host A (A), an IP-DA 2788 for host B (B), and payload. DBB2 may send the second frame 2780 to host B in district 2.

In the data frame forwarding scheme 2700, the intermediate/edge switch 2724 may not perform the MAC-in-MAC function for frames received from local physical servers 2724 connected to the intermediate/edge switch 2724. In another embodiment, the encapsulation procedure of the first frame 2740 may be performed by a virtual switch in the physical server 2726 instead of the intermediate/edge switch 2724, which may forward the first frame 2740 without processing from the physical server 2726 to the corresponding DBB 2722.

Figure 28:
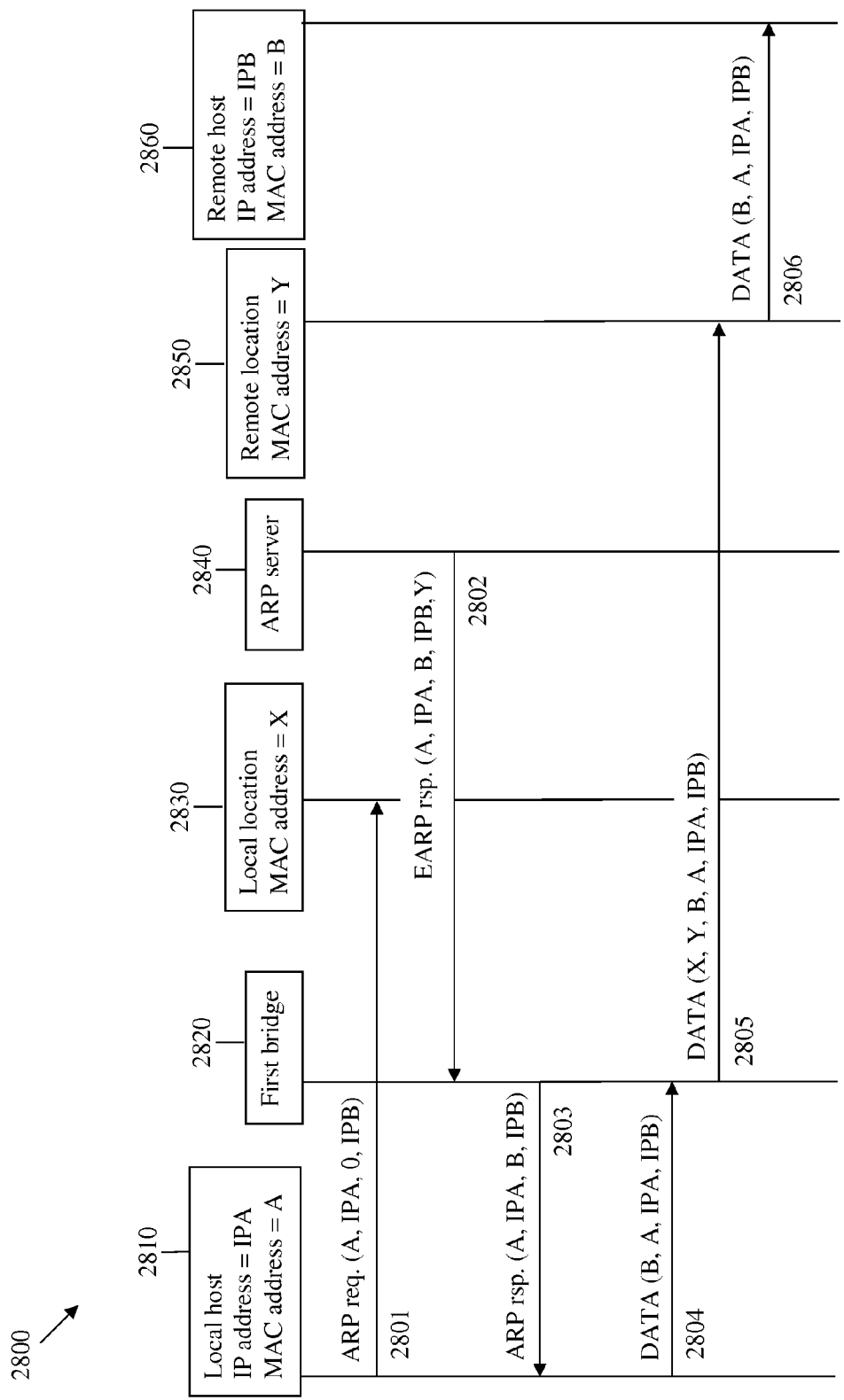
FIG. 28 is a protocol diagram of an embodiment of an enhanced ARP processing method.

FIG. 28 illustrates an embodiment of an enhanced ARP processing method 2800 that may be used in a Layer 2 bridged network, such as for the interconnected network districts 1800. The enhanced ARP processing method 2800 may begin at step 2801, where a local host 2810 may send an ARP request to a local location 2830 via a first bridge 2820, e.g., a local DBB. The local location 2830 may correspond to the same location or district as the local host 2810. The ARP request may be sent to obtain a MAC address associated with a remote host 2860. The local host 2810 may be assigned an IP address IPA and a MAC address A. The remote host 2860 may be assigned an IP address IPB and a MAC address B. The ARP request may comprise a SA MAC address A and A SA IP address IPA for the local host 2810. The ARP request may also comprise a DA MAC address set to zero and a DA IP address IPB for the remote host 2860. The local location 2830 may forward the ARP request to an ARP server 2840 in the network.

At step 2802, the ARP server 2840 may send an EARP response to the first bridge 2820. The EARP response may comprise a SA MAC address A and a SA IP address IPA for the local host 2810, a DA MAC address B and a DA IP address IPB for the remote host 2860, and a MAC address for a second bridge in a remote location 2850 of the remote host 2860. At step 2803, the first bridge 2820 may process/decapsulate the EARP response and send an ARP response to the local host 2810. The ARP response may comprise the MAC address A and IP address IPA for the local host 2810, and the MAC address B and the IP address IPB for the remote host 2860. Thus, the local host 2810 may become aware of the MAC address B of the remote host 2860. The first bridge 2820 may also associate (in a local table) the MAC address Y of the remote bridge in the remote location 2850 with the IP address IPB of the remote host 2860. The first bridge 2820 may not need to store the MAC address B of the remote host 2860.

At step 2804, the local host 2810 may send a data frame intended for the remote host 2860 to the first bridge 2820. The data frame may comprise a SA MAC address and SA IP address of the local host 2810, and the DA MAC address and DA IP address of the remote host 2860. At step 2805, the first bridge 2820 may receive and process/encapsulate the data frame to obtain an inner frame. The inner frame may comprise a SA MAC address X of the first bridge 2820, a DA MAC address Y of the remote bridge, a DA MAC address B and a DA IP address IPB of the remote host 2860, and a SA MAC address A and a SA IP address IPA of the local host 2810. At step 2806, the remote bridge in the remote location 2850 may receive the inner frame and process/decapsulate the inner frame to obtain a second frame by removing the SA MAC address X of the first bridge 2820 and the DA MAC address Y of the remote bridge. Thus, the second frame may be similar to the initial frame sent from the local host 2810. The remote bridge may then send the second frame to the remote host 2860. The method 2800 may then end.

In the enhanced ARP processing method 2800, the core network may use 802.1aq or TRILL for topology discovery. If the core network uses 802.1aq for topology discovery, then the first bridge 2820 may not encapsulate the frame sent form the local host 2810 and may forward the frame to the remote location 2850 without processing. Further, the frame forwarded through the core network may be flooded only in the second location 2850 and only when the outbound port indicated in the frame has not been learned.

In an embodiment, an extended address resolution scheme may be implemented by district gateways or gateway nodes that may be TRILL edge nodes, MAC-in-MAC edge nodes, or any other type of overlay network edge nodes. The extended address resolution scheme may be based on the ARP proxy scheme implemented by a DBB in a plurality of districts in a Layer 2 bridged network, such as the ARP proxy scheme 1900. For example, the intermediate/edge nodes 2724 that may be connected to a plurality of physical servers and/or VMs may implement an extended address resolution scheme similar to the ARP proxy scheme described above. The gateway node may use the DS server in the ARP proxy scheme to resolve mapping between a target destination (e.g., host) and an egress edge node. The egress edge node may be a target district gateway, a TRILL egress node, a MAC-in-MAC edge node, or any other type of overlay network edge node. The reply from the DS may also be an EARP reply as described above.

The extended address resolution scheme may be used to scale DC networks with a substantial number of hosts. The overlay network (e.g., bridged network) may be a MAC-in-MAC, TRILL, or other types of Layer 3 or Layer 2 over Ethernet networks. The overlay network edge may be a network switch, such as an access switch (or ToR switch) or an aggregation switch (or EoR switch). The overlay network edge may also correspond to a virtual switch in a server. There may be two scenarios for overlay networks for using the extended address resolution scheme. The first scenario corresponds to a symmetric scheme, such as for TRILL or MAC-in-MAC networks. In this scenario, the overlay edge node may perform both the encapsulation and decapsulation parts. The second scenario corresponds to an asymmetric scheme, where the overlay network may implement the asymmetric network address encapsulation scheme above.

Figure 29:
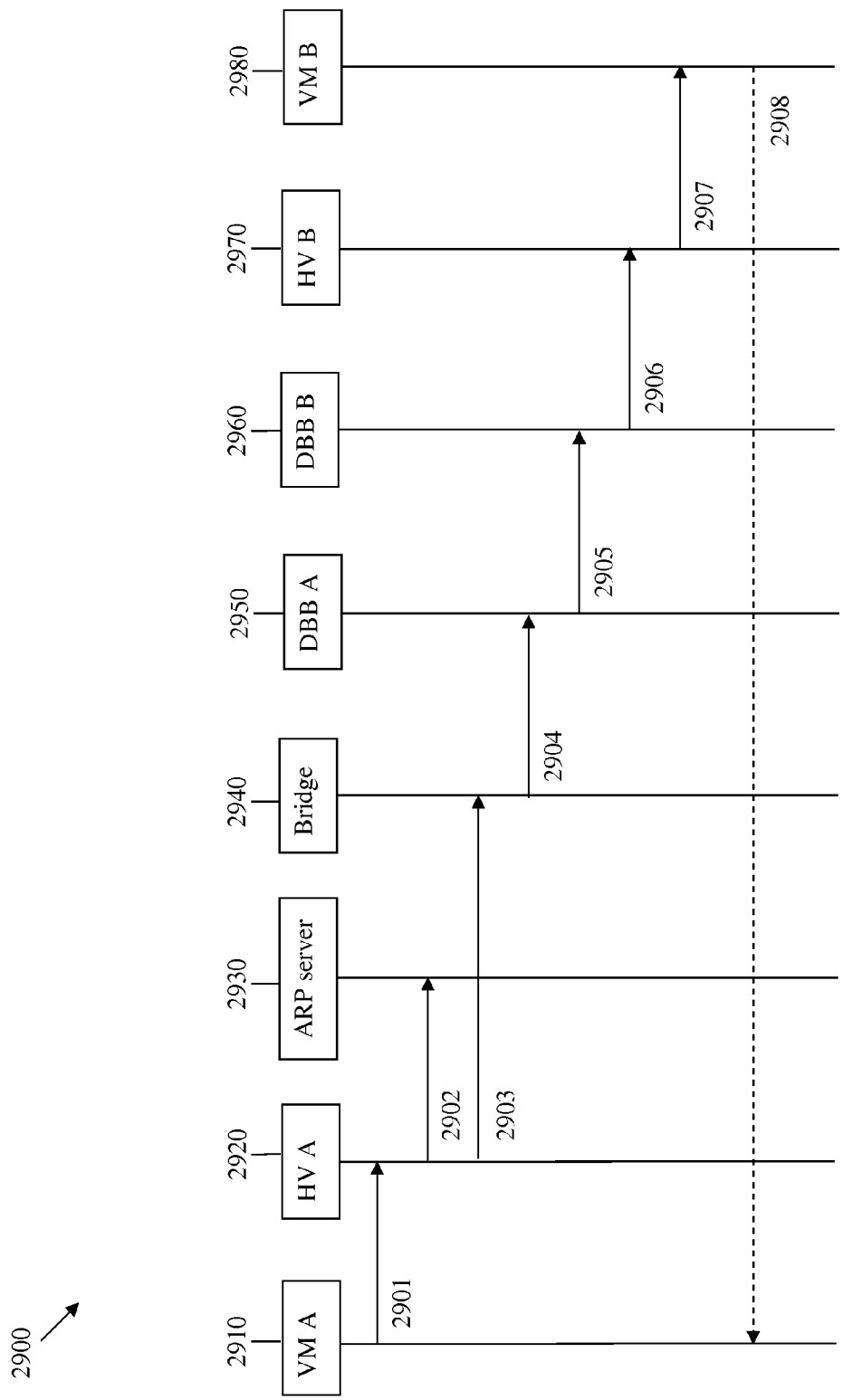
FIG. 29 is a protocol diagram of an embodiment of an extended address resolution method.

FIG. 29 illustrates an embodiment of an extended address resolution method 2900 that may be implemented in an overlay network. The extended address resolution method 2900 may begin at step 2901, where a first VM 2910 (VM A) may send a frame or packet addressed for a second VM 2980 (VM B) to a first hypervisor (HV) 2920 (HV A). VM A and VM B may be end hosts in different districts. VM A may be connected to HV A in a first district and VM B may be connected to a second HV 2970 (HV B) in a second district. The HV may be an overlay network node configured to encapsulate or add the overlay network address header on a data frame or packet. In the symmetric scheme scenario, the HV may be a DBB, a TRILL edge node, or a MAC-in-MAC edge node. In the asymmetric scheme scenario, the HV may be a virtual switch within a hypervisor or an access switch.

At step 2902, HV A may send an address resolution (AR) request to an ARP server 2930 to retrieve mapping from VM B IP address to a VM B MAC address and HV B MAC address pair, in the case of the symmetric scheme. The ARP server may comprise or correspond to a DS server, such as the DS 1940. In the asymmetric scheme, the mapping may be from VM B IP address to a VM B MAC address and second DBB 2960 (DBB B) MAC address pair. DBB B may be a remote DBB in the same district of VM B.

HV A may also be configured to intercept (broadcasted) ARP requests from local VMs and forward the ARP requests to the DS server. HV A may then retrieve EARP replies from the DS server and cache the mappings between target addresses and target gateway addresses (as indicated by the EARP replies). The target gateway address may also be referred to herein as a target location address. In another embodiment, instead of intercepting ARP requests by HV A, the DS server may send consolidated mapping information to HV A on regular or periodic basis or when VMs move or migrate between districts. The consolidated mapping information may comprise the same information exchanged with L2GWs in the virtual Layer 2 networks described above. For instance, the consolidated mapping information may be formatted as gratuitous group announcements, as described above.

At step 2903, HV A may create an inner address header that comprise (SA: VM A MAC, DA: VM B MAC) and an outer header that comprises (SA: HV A MAC, DA: HV B MAC), in the case of the symmetric scheme. In the asymmetric scheme, the outer header may comprise (SA: HV A MAC, DA: DBB B MAC). HV A may add the inner header and outer header to the frame received from VM A and send the resulting frame to a bridge 2940 connected to HV A in the same district. Within the district, the DA of the outer header, which may be HV B MAC or DBB B MAC, may not be known.

At step 2904, the frame may be forwarded from the bridge 2940 to a first DBB 2950 (DBB A) in the district. At DBB A, the DA HV B MAC or DBB B MAC may be known since the core may be operating on routed forwarding (e.g., 802.1aq SPBM or TRILL) and learning may be disabled in the core. At step 2905, DBB A may forward the frame to DBB B.

At step 2906, DBB B may forward the frame to HV B since DBB may know all HV addresses from the routing subsystem, in the case of the symmetric scheme. In the asymmetric scheme, DBB may remove the outer header comprising (DA: DBB MAC) and forward the frame to VM B MAC in the remaining header, since addresses local to the district may be registered and known within the district.

At step 2907, HV B may receive the frame, remove the outer header comprising (DA: HV B MAC), and forward the resulting frame to VM B MAC in the remaining header, since addresses local to the server are known to HV B, in the case of the symmetric scheme. Additionally, HV B may learn the mapping from VM A MAC (SA in the remaining header) to HV A MAC (SA in the removed header), which may be subsequently used in reply frames from VM B to VM A. In the asymmetric scheme, in addition to forwarding the frame to VM B, HV B may send an ARP message to the ARP (or DS) server 2930 to retrieve the mapping from VM A MAC (SA in the remaining header) to DBB A MAC, which may be subsequently used in reply frames from VM B to VM A.

VM B may then send frames addressed to VM A (IP destination address). At step 2908, HV B may create an inner address header that comprises (SA: VM B MAC, DA: VM A MAC) and an outer header that comprises (SA: HV B MAC, DA: HV A MAC) to a frame, in the case of the symmetric scheme. HV B may maintain VM A IP to VM A MAC mapping and VM A MAC to HV A MAC mapping from a previously received message or AR response. In the asymmetric scheme, the outer header may comprise (SA: HV B MAC, DA: DBB A MAC). HV B may maintain VM A MAC to DBB A MAC mapping from a previously received AR response. Alternatively, HV B may send an ARP message to the ARP (or DS) server to retrieve the mapping when needed. The frame may then be forwarded from VM B to VM A in the same manner described in the steps above (e.g., in the reverse direction). The method 2900 may then end.

Figure 30:
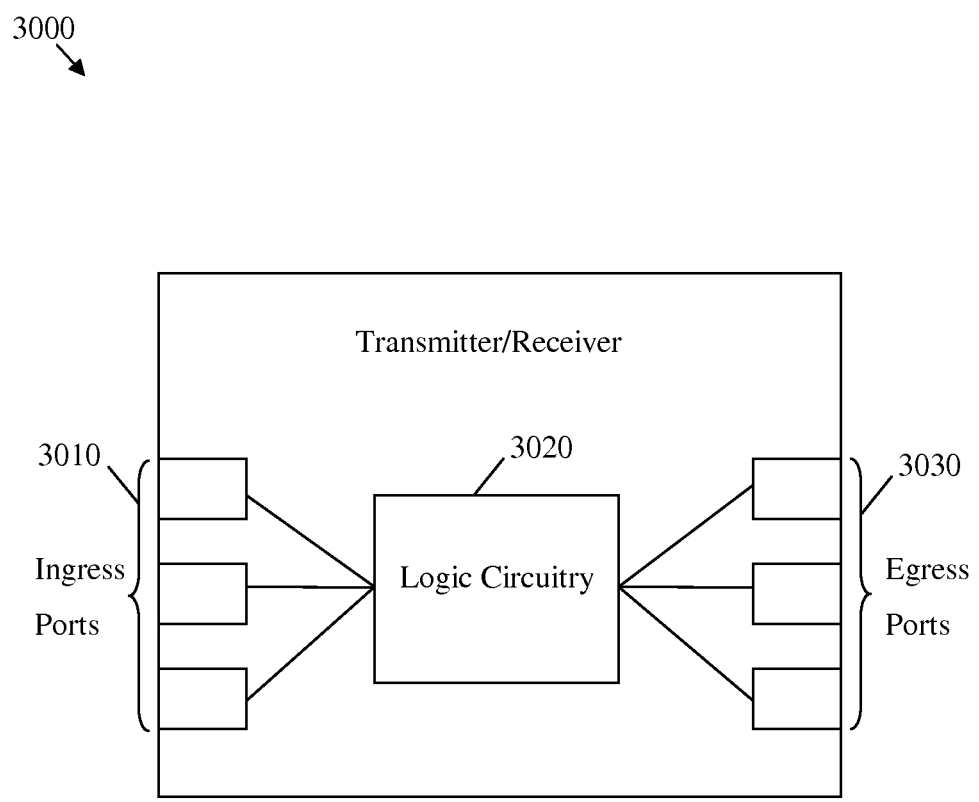
FIG. 30 is a schematic diagram of an embodiment of a network component unit.

FIG. 30 illustrates an embodiment of a network component unit 3000, which may be any device that sends/receives packets through a network. For instance, the network component unit 3000 may be located at the L2GWs across the different locations/domains in the virtual/pseudo Layer 2 networks. The network component unit 3000 may comprise one or more ingress ports or units 3010 for receiving packets, objects, or TLVs from other network components, logic circuitry 3020 to determine which network components to send the packets to, and one or more egress ports or units 3030 for transmitting frames to the other network components.

Figure 31:
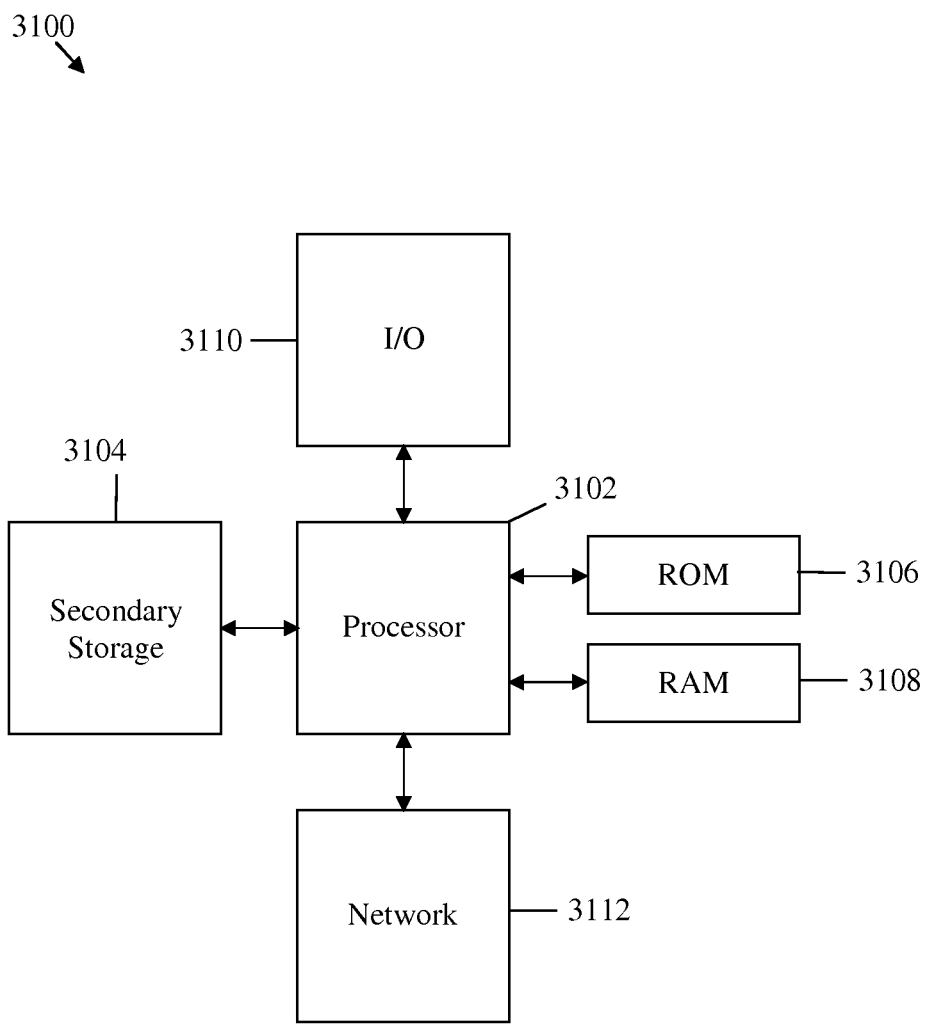
FIG. 31 is a schematic diagram of an embodiment of a general-purpose computer system.

The network components described above may be implemented on any general-purpose network component, such as a computer system or network component with sufficient processing power, memory resources, and network throughput capability to handle the necessary workload placed upon it. FIG. 31 illustrates a typical, general-purpose computer system 3100 suitable for implementing one or more embodiments of the components disclosed herein. The general-purpose computer system 3100 includes a processor 3102 (which may be referred to as a CPU) that is in communication with memory devices including second storage 3104, read only memory (ROM) 3106, random access memory (RAM) 3108, input/output (I/O) devices 3110, and network connectivity devices 3112. The processor 3102 may be implemented as one or more CPU chips, or may be part of one or more application specific integrated circuits (ASICs).

The second storage 3104 is typically comprised of one or more disk drives or tape drives and is used for non-volatile storage of data and as an over-flow data storage device if RAM 3108 is not large enough to hold all working data. Second storage 3104 may be used to store programs that are loaded into RAM 3108 when such programs are selected for execution. The ROM 3106 is used to store instructions and perhaps data that are read during program execution. ROM 3106 is a non-volatile memory device that typically has a small memory capacity relative to the larger memory capacity of second storage 3104. The RAM 3108 is used to store volatile data and perhaps to store instructions. Access to both ROM 3106 and RAM 3108 is typically faster than to second storage 3104.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. In a network component, a method comprising:
receiving a frame from a first host in a first site of a Layer 2 network that is intended for a target host in a second site of the same Layer 2 network;
mapping a Layer 3 destination address (DA) for the target host in the frame to an address of a Layer 2 Gateway (L2GW) in the second site of the Layer 2 network;
not maintaining a Layer 2 DA for the target host and a plurality of other Layer 2 DA for a plurality of other hosts in the second site of the same Layer 2 network,
using the address of the L2GW in the frame as a DA for the target host; and
sending the frame as a second frame using the address of the L2GW,
wherein the second frame is sent towards the L2GW in the second site of the Layer 2 network via a service network connected to the first site of the Layer 2 network and the second site of the Layer 2 network,
wherein the frame is received in the first site of the Layer 2 network, and
wherein the frame received from the first host comprises a DA field that references an address of the network component or the address of the L2GW.

2. The method of claim 1, wherein the frame received from the first host further comprises a source address (SA) for the first host, the Layer 3 DA for the target host, and an Internet Protocol (IP) SA for the first host, and wherein the second frame comprises a DA for the L2GW, a SA for the network component, the Layer 3 DA for the target host, and the IP SA for the first host.

3. The method of claim 1, wherein the service network is an Internet Protocol (IP)/Multiple Label Protocol Label Switching (MPLS) network, and wherein the frame further comprises a source address (SA) for the first host, a Layer 3 DA for the target host, and an IP SA for the first host, and wherein the second frame comprises an IP DA for the L2GW, an IP SA for the network component, the Layer 3 for the target host, and an IP SA for the first host.

4. The method of claim 3, further comprising encapsulating the IP DA for the L2GW and the IP SA for the network component as an additional IP header to the frame to form the second frame and replacing the SA for the first host within the frame with a SA for the network component to form the second frame.

5. The method of claim 3, further comprising replacing the DA address for the network component or the L2GW with the IP DA for the L2GW and replacing the SA for the first host with the IP SA for the network component.

6. The method of claim 1, wherein the second frame comprise the address of the L2GW and the Layer 3 DA address for the target host, wherein the L2GW in the second site of the Layer 2 network receives the second frame and translates the address of the L2GW to the Layer 2 DA for the target host based on the Layer 3 DA address for the target host.

7. The method of claim 1, wherein the DA field within the frame received from the first host references the address of the network component when the first host is not exposed to a Layer 2 address of the L2GW.

8. The method of claim 1, wherein the DA field within the frame received from the first host references the address of the L2GW when the first host learns a Layer 2 address of the L2GW.

9. The method of claim 1, wherein the frame received from the first host comprises a SA field that references a Layer 2 address of the first host, and wherein the method further comprises filtering out the frame when the DA field references the address of the L2GW and replacing the Layer 2 address of the first host within the SA field with the address of the network component to form the second frame.

10. The method of claim 1, wherein the DA field references the address of the network component, and wherein the method further comprises replacing the address of the network component within the DA field of the frame with the address of the L2GW to form the second frame.

11. The method of claim 1, wherein a plurality of hosts in the first site of the Layer 2 network are unaware of a plurality of target hosts in a plurality of sites within the Layer 2 network.

12. The method of claim 1, further comprising receiving an update message for a second layer 2 gateway (L2GW2) in a third site of the same Layer 2 network when the target host is moved from the second site of the Layer 2 network to the third site and updating that the Layer 3 DA for the target host maps to an address of the L2GW.

13. A network component comprising:
a memory;
a processor coupled to the memory, wherein the memory includes instructions that when executed by the processor cause the network component to perform the following:
receive a frame originating from a local host in a local domain of a Layer 2 network, wherein the frame comprises an Internet Protocol (IP) destination address (DA) for a destination host in an external domain of the Layer 2 network and a gateway (GW) DA that references an address of the network component or an address of a GW;
maintain a table that maps the IP DA of the destination host to the address of the GW in the same external domain of the Layer 2 network as the destination host; and
forward the frame as a second frame based on the address of the GW,
wherein the second frame is sent towards the GW in the external domain via a service network connected between local domain and the external domain,
wherein the network component is in the local domain, and wherein the network component is unaware of the media access control (MAC) DA for the destination host and a plurality of other hosts in the external domain.

14. The network component of claim 13, wherein the GW DA within the frame references the address of the network component and not the address of the GW, wherein the instructions, when executed by the processor, cause the apparatus to translate the GW DA to reference the address of the GW to form the second frame, and wherein the address of the GW is at least one of the following: a Layer 2 address of the GW and a Layer 3 address of the GW.

15. The network component of claim 14, wherein the local host is moved from the local domain to a second external domain, and wherein the instructions, when executed by the processor, cause the apparatus to receive the frame originating from the local host from a second GW in the second external domain and translate a DA field within the frame that references the network component with the address of the GW to form the second frame.

16. The network component of claim 15, wherein the frame comprises a SA field that references the second GW, and wherein the SA field for the second frame references the second GW.

17. The network component of claim 13, wherein the GW DA within the frame references the address of the GW and not the network component, and wherein the instructions, when executed by the processor, cause the apparatus to filter out the frame and replace a source address (SA) field within the frame that references the local host with the address of the network component to form the second frame.

18. The network component of claim 13, wherein the table comprises the IP addresses of all of the hosts in the Layer 2 network, wherein the instructions, when executed by the processor, cause the apparatus to receive the IP address of the destination host and the IP addresses of the other hosts from the GW, and wherein the MAC address of the destination host and the IP address of the other hosts are not received from the L2GW.

19. The network component of claim 13, wherein the destination host is moved from the external domain to a second external domain, and wherein the instructions, when executed by the processor, cause the apparatus to:
receive an update message from a second GW that the destination host has moved to the second external domain; and
update the table to map the IP DA of the destination host to an address of the second GW; and
send a second update message that the destination host has been removed from the external domain.

20. The network component of claim 13, wherein the instructions, when executed by the processor, cause the apparatus to receive a second frame that comprises an unknown DA and forward the second frame to a designated broadcast server using a rooted-multipoint (RMP) virtual local area network (VLAN) configuration.

21. The network component of claim 13, wherein the table provides IP address to MAC address mapping for the local host and a plurality of other local hosts in the local domain, and wherein the instructions, when executed by the processor, cause the apparatus to receive an address resolution protocol (ARP)/Neighbor Discovery (ND) request from a local joining host that joins the Layer 2 network in the local domain and update the table after receiving the ARP/ND request.

22. A network component comprising:
a receiver configured to receive a frame from a source host in a local domain of a Layer 2 network, wherein the frame comprises an Internet Protocol (IP) destination address (DA) for a destination host in an external domain of the Layer 2 network and a gateway DA that is either an address of the network component or an address of a Layer 2 Gateway (L2GW);
a logic circuit configured to maintain a table that maps the IP DA of the destination host to the address of the L2GW; and
a transmitter configured to forward the frame as a second frame based on the address of the L2GW,
wherein the L2GW is in the external domain of the Layer 2 network,
wherein the second frame is sent towards the L2GW in the external domain via a service network connected between local domain and the external domain,
wherein the network component is in the local domain, and wherein the network component is unaware of the media access control (MAC) DA for the destination host and a plurality of other hosts in the external domain.

23. The network component of claim 22, wherein the logic circuit is configured to replace the address of the network component with the address of the L2GW to form the second frame as the gateway DA when the gateway DA is the address of the network component in the frame, and wherein the address of the L2GW is at least one of the following: a Layer 2 address of the L2GW and a Layer 3 address of the L2GW.

24. The network component of claim 22, wherein the logic circuit is configured to filter out the frame when the gateway DA is the address of the L2GW in the frame and replace a source address (SA) field within the frame that references the local host with the address of the network component to form the second frame when the gateway DA is the address of the L2GW.

25. The network component of claim 22, the receiver is further configured to receive the IP address of the destination host and the IP addresses of the other hosts from the L2GW, and wherein the MAC address of the destination host and the IP address of the other hosts are not received from the L2GW.

26. The network component of claim 22, wherein the destination host is moved from the external domain to a second external domain, wherein the receiver is further configured to receive an update message from a second Layer 2 Gateway (L2GW2) that the destination host has moved to the second external domain; wherein the logic circuit is further configured to update the table to map the IP DA of the destination host to an address of the L2GW2, and wherein that transmitter is further configured to send a second update message that the destination host has been removed from the external domain.

* * * * *

UNITED STATES PATENT AND TRADEMARK OFFICE
CERTIFICATE OF CORRECTION

PATENT NO. : 9,014,054 B2
APPLICATION NO. : 13/172554
DATED : April 21, 2015
INVENTOR(S) : Dunbar et al.

It is certified that error appears in the above-identified patent and that said Letters Patent is hereby corrected as shown below:

In the claims:

Column 45, Lines 51-59, Claim 14, should read:

The network component of claim 13, wherein the GW DA within the frame references the address of the network component and not the address of the GW, wherein the instructions, when executed by the processor, cause the network component to translate the GW DA to reference the address of the GW to form the second frame, and wherein the address of the GW is at least one of the following: a Layer 2 address of the GW and a Layer 3 address of the GW.

Column 45, Lines 60-67, Claim 15, should read:

The network component of claim 14, wherein the local host is moved from the local domain to a second external domain, and wherein the instructions, when executed by the processor, cause the network component to receive the frame originating from the local host from a second GW in the second external domain and translate a DA field within the frame that references the network component with the address of the GW to form the second frame.

Column 46, Lines 5-11, Claim 17, should read:

The network component of claim 13, wherein the GW DA within the frame references the address of the GW and not the network component, and wherein the instructions, when executed by the processor, cause the network component to filter out the frame and replace a source address (SA) field within the frame that references the local host with the address of the network component to form the second frame.

Signed and Sealed this
First Day of December, 2015

Michelle K. Lee
*Director of the United States Patent and Trademark Office*

CERTIFICATE OF CORRECTION (continued)
U.S. Pat. No. 9,014,054 B2

In the claims:

Column 46, Lines 12-20, Claim 18, should read:

The network component of claim 13, wherein the table comprises the IP addresses of all of the hosts in the Layer 2 network, wherein the instructions, when executed by the processor, cause the network component to receive the IP address of the destination host and the IP addresses of the other hosts from the GW, and wherein the MAC address of the destination host and the IP address of the other hosts are not received from the L2GW.

Column 46, Lines 21-31, Claim 19, should read:

The network component of claim 13, wherein the destination host is moved from the external domain to a second external domain, and wherein the instructions, when executed by the processor, cause the network component to:
    receive an update message from a second GW that the destination host has moved to the second external domain; and
    update the table to map the IP DA of the destination host to an address of the second GW; and
    send a second update message that the destination host has been removed from the external domain.

Column 46, Lines 32-37, Claim 20, should read:

The network component of claim 13, wherein the instructions, when executed by the processor, cause the network component to receive a second frame that comprises an unknown DA and forward the second frame to a designated broadcast server using a rooted-multipoint (RMP) virtual local area network (VLAN) configuration.

Column 46, Lines 38-45, Claim 21, should read:

The network component of claim 13, wherein the table provides IP address to MAC address mapping for the local host and a plurality of other local hosts in the local domain, and wherein the instructions, when executed by the processor, cause the network component to receive an address resolution protocol (ARP)/Neighbor Discovery (ND) request from a local joining host that joins the Layer 2 network in the local domain and update the table after receiving the ARP/ND request.